United States Patent [19]

Bhattacharya

[11] Patent Number: 5,371,880
[45] Date of Patent: Dec. 6, 1994

[54] BUS SYNCHRONIZATION APPARATUS AND METHOD

[75] Inventor: Dipankar Bhattacharya, Santa Clara, Calif.

[73] Assignee: OPTi, Inc., Santa Clara, Calif.

[21] Appl. No.: 882,648

[22] Filed: May 13, 1992

[51] Int. Cl.⁵ .......................... G06F 13/00; G06F 1/12
[52] U.S. Cl. ........................................ 395/550; 395/275
[58] Field of Search ................... 395/550, 325, 275

[56] References Cited

U.S. PATENT DOCUMENTS

| | | | |
|---|---|---|---|
| 5,191,657 | 3/1993 | Ludwig et al. | 395/325 |
| 5,199,106 | 3/1993 | Bourke et al. | 395/275 |
| 5,276,814 | 1/1994 | Bourke et al. | 395/275 |

OTHER PUBLICATIONS

Intel Corp, 82350 DT Eisa Chipp Set Sep. 1991.
Intel Corp, 82350 Eisa Chip Set Peripheral Components Data Book Jul. 1990.
Texas Instruments Corp, TACT 84500 Eisa Chip Set--Preview Bulletin 1991.
Opti Inc., Opti-386 WB PC/AT Chipset Data Book Mar. 28, 1991.
Opti. Inc, HID 386 AT Chip set High Integration Direct Mapped Cache AT Nov. 1989.

*Primary Examiner*—Robert L. Richardson
*Attorney, Agent, or Firm*—Fliesler, Dubb, Meyer & Lovejoy

[57] ABSTRACT

Several techniques are used to optimize the transmission of signals or events from one bus to the other. In one aspect, the user of a chipset is permitted to choose whether the originating events (i.e. the events in response to which a destination event is to be generated on a destination bus) are to be generated synchronously or asynchronously with the clock signal on the destination bus. Whether synchronous or asynchronous generation is chosen, the chipset may perform a synchronization function in response to an originating bus predictor signal. The number of destination clock cycles to delay before generating the desired destination bus event is responsive to the relative frequencies of the clock signals on the two buses, thereby accommodating a wide variety of such relative frequencies. In another aspect, for events to be generated on a destination bus synchronously with a clock signal which is by specification stretchable, the destination bus event is generated promptly in response to the originating event and then the destination bus clock signal is stretched to make the destination bus event synchronous with the destination bus clock signal. The length of the stretch is responsive to the relative frequencies of the originating bus and destination bus clock frequencies. A synchronizer is used to generate the destination bus event synchronously with the destination bus clock signal. The user of the chipset can select which formula is to be applied.

82 Claims, 13 Drawing Sheets

BUS SYNCHRONIZATION APPARATUS AND METHOD

BACKGROUND OF THE INVENTION

1. Field of the Invention

The invention relates to computer architectures having two buses operating asynchronously with respect to each other, and more particularly, to techniques for generating a signal on one bus which is synchronous with signals on that bus, in response to an event occurring on the other bus which may be asynchronous with signals occurring on the first bus.

2. Description of Related Art

The IBM PC AT computer architecture has become industry standard architecture for personal computers, and is typically built around a CPU such as an 80286, 80386SX, 80386DX, or 80486 microprocessor manufactured by Intel Corporation. The CPU is coupled to a host or local bus, capable of performing memory accesses and data transfers at high rates of speed (i.e., on the order of 10-50 MHz). The host bus includes 16 or 32 data lines, a plurality of address lines, and various control lines. The typical IBM PC AT-compatible platform also includes DRAM main memory, and in many cases cache memory, both coupled to the local bus.

The typical IBM PC AT-compatible computer also includes an I/O bus which is separate and distinct from the local bus. The I/O bus is coupled to the host bus via certain interface circuitry. The I/O bus includes 8, 16 or 32 data lines, a plurality of I/O address lines, as well as control lines. The I/O address space is logically distinct from the memory address space and if the CPU desires to access an I/O address, it does so by activating an MIO# signal to indicate that this is an access to the I/O address space. The interface circuitry recognizes the I/O signals thereby generated by the CPU, performs the desired operation over the I/O bus, and if appropriate, returns results to the CPU over the host bus.

In practice, some I/O addresses may reside physically on the host bus and some memory addresses may reside physically on the I/O bus. The interface circuitry is responsible for recognizing that a memory or I/O address access must be emulated by an access to the other bus, and is responsible for doing such emulation.

In addition to the above elements, a keyboard controller typically is also coupled to the I/O bus, as is a video display controller. A typical IBM PC AT-compatible system may also include a DMA controller which permits peripheral devices on the I/O bus to read or write directly to or from memory, as well as an interrupt controller for transmitting interrupts from various add-on cards to the CPU. The add-on cards are cards which may be plugged into slot connectors coupled to the I/O bus to increase the capabilities of the system.

General information on the various forms of IBM PC AT-compatible computers can be found in IBM, "PC/AT Technical Reference Manual", in Sanchez, "IBM Microcomputers: A Programmer's Handbook" (McGraw-Hill: 1990) and Solari, "AT Bus Design" (San Diego: Annabooks, 1990). See also the various data books and data sheets published by Intel Corporation concerning the structure and use of the iAPX-86 family of microprocessors, including the "i486 Microprocessor Hardware Reference Manual", published by Intel Corporation, copyright date 1990, "386 SX Microprocessor", data sheet, published by Intel Corporation (1990), and "386 DX Microprocessor", data sheet, published by Intel Corporation (1990). All the above references are incorporated herein by reference.

The original IBM PC-AT computer architecture has spawned several architectural variations which themselves have become standards in the microcomputer industry. As explained in the Solari book, above, these standards include ISA ("Industry Standard Architecture") and EISA ("Extended Industry Standard Architecture"). The EISA architecture is intended to be upward compatible from the ISA architecture, meaning that an add-on card built for ISA should work properly if used in an EISA computer.

The host bus in the various PC-AT compatible architectures includes a plurality of address lines and a plurality of data lines, as well as a number of control lines and power and ground. The exact set of lines which make up the host bus is well known in the industry, and may be determined from various sources, including the references cited above. For present purposes, it is sufficient to identify the following signal lines on the local bus ("#" indicates active low):

| | |
|---|---|
| HA(23:1) or HA(31:2) | Address lines. For the 80286 and 80386SX, 24 bits of address are provided. The high order 23 bits are provided on HA(23:1). For the 80386DX and 80486, 32 bits of address are available. The high order 30 bits are provided on HA(31:2). |
| HBHE# & HBLE# or HBE#(3:0) | Host Byte High Enable and Host Byte Low Enable, or Host Byte Enables (3:0). For the 80286 and 80386SX, HBLE# can be thought of as equivalent to HA(0) and HBHE# = IBLE#. For the 80386DX and 80486, HBE#(3:0) carries a 1-or-4 decode of the 2 low order address bits. |
| HD(15:0) or HD(31:0) | Data lines. The 80286 and 80386SX operate with a 16-bit external data bus, and the 80386DX and 80486 operate with a 32-bit data bus. |
| HM/IO# | Memory/IO control line. When asserted low by the CPU, indicates that the address on HA is an I/O address as opposed to a main memory address. |
| HREADY# | Acknowledgment to CPU that a current request has been serviced and CPU can start a new cycle. |
| CLK2, CLK or HCLK | CPU clock signal. |
| HW/R# | Distinguishes host write cycles from host read cycles. |
| HD/C# | Distinguishes host data cycles, either memory or I/O, from host control cycles which are: interrupt acknowledge, halt, and instruction fetching. |
| HADS# | Indicates that a valid bus cycle definition and address (HW/R#, HD/C#, HM/IO#, HBE0#, HBE1#, HBE2#, HBE3# (or HBHE# and HBLE#) and HA) are being driven on the host bus. HADS# is asserted synchronously with a rising edge of CLK and both stamped and withdrawn synchronously with the next rising edge of CLK. |
| HOLD | Bus hold request. Allows another bus master complete control of the CPU bus. In response to HOLD going active the CPU will float most of its output and input/ output pins. HLDA will be asserted after completing the curreng bus cycle, burst cycle or sequence of locked cycles. The CPU will remain in this state until HOLD is de-asserted. |
| HLDA | Hold acknowledge. Goes active in response to a hold request presented on the HOLD signal pin. HLDA indicates that the CPU has given the bus to another local bus master. HLDA is driven active in the same clock that the CPU floats its bus. HLDA is driven |

| | |
|---|---|
| | inactive when leaving bus hold. HLDA is active HIGH and remains driven during bus hold. |

In addition, the 80486 microprocessor has an internal cache memory. In order to maintain cache consistency in view of memory writes which an external host bus master may perform, the host bus for an 80486-based PC-AT compatible microcomputer includes the following additional control lines:

| | |
|---|---|
| EADS# | Asserted by an extrenal host master to indicate that a valid external address has been driven onto the HA address lines and that a cache invalidation cycle should be performed. |
| FLUSH# | Cache flush input. Forces the 486 microprocessor to flush its entire internal cache. FLUSH# is active low and need only be asserted for one clock. FLUSH# is asynchronous bup setup and hold times must be met for recognition in any specific clock. |

The various signals on the I/O bus are also well specified and well known in the industry. They are described in BCPR Services, Inc., "EISA Specification", ver. 3.11 (1990). For present purposes, only the following signals are important:

| | |
|---|---|
| SA(19:0) | 20 address lines. Sufficient to address 1MB of memory. Only SA(15:0) are used to address the 64k I/O address space, and only SA(9:0) are used to address the basic 1k AT I/O address space. |
| LA(31:2) | Additional address lines for addressing a 16MB memory address space on the I/O bus. The LA lines are valid earlier in an I/O bus cycle, but must be latched if needed later in the cycle. The SA lines are not valid as early as the LA lines, but remain valid longer. |
| SD(31:0) | 32 data lines. |
| BCLK | I/O bus clock signal. 6-8.33 MHz signal. Usually a square wave, but the EISA standard specification states that a BCLK cycle can be stretched in certain situations in order to ensure that a desired edge of an EISA bus signal occurs synchronously with a desired edge of BCLK. |
| OSC | 14.318 MHz square wave. |
| START# | Start a bus cycle. Interface chipset or EISA master activates START# when the address lines LA(31:2) and M/IO are valid. START# terminates in response to the rising edge of BCLK which occurs at least one full BCLK cycle after it was asserted. Sampled on the rising edge of BCLK if necessary. |
| CMD# | Indicates when data is valid on the SD lines for write cycles. The leading (falling) edge of CMD# must be synchronous with a rising edge of BCLK and occurs at the same time as the trailing edge of START#. It remains active until the end of the cycle and usually, but not always, terminates synchronously with a rising edge of BCLK. |
| MSBURST# | Master Burst. Asserted by an EISA bust master if both the master and the slave are capable of supporting the next cycle as a burst cycle. Sampled on rising edge of BCLK. |
| EXRDY | EISA Ready. De-asserted by an EISA slave when it is not ready to terminate an EISA cycle. Sampled on the falling edge of BCLK after CMD# becomes active. If EXRDY is inactive at that time, EXRDY is sampled again on each BCLK falling edge thereafter. CMD# remains active for at least one-half of a BCLK cycle after EXRDY is sampled active, so this signal is useful for generating an "early ready" signal to the CPU. |
| CHRDY | ISA Channel Ready. De-asserted by an ISA slave before a falling edge of BCLK if the salve will not be ready to terminate and ISA cycle on the next BCLK rising edge. Sampled on the falling edge of BCLK just prior the BCLK rising edge on which the ISA cycle would otherwise terminate. If CHRDY is low at that time, it is sampled again on each BCLK falling edge thereafter. CMD# remains active for at least one-half BCLK cycle after CHRDY is sampled active, so like EXRDY, CHRDY is useful for logic which generates an "early ready" signal to the CPU. |
| NOWS# | ISA No Wait State slave. Asserted by an ISA slave before a BCLK falling edge to shorten default-length ISA cycles. Sampled on BCLK falling edge and if active at that time, will cause CMD# to go inactive on the immediately following BCLK rising edge. If HRDY is low at the time NOWS# is sample active, termination of the cycle is delayed. CMD# will remain active for at least one-half BCLK cycle after NOWS# is sample active, and so NOWS# can be used in logic to generate an "early ready" signal to the CPU. |

Recently, efforts have been made to reduce the size and improve the manufacturability of PC AT-compatible computers. Specifically, several manufacturers have developed "PC AT chipsets", which integrate a large amount of the I/O interface circuitry and other circuitry onto only a few chips. An example of such a chipset for ISA microcomputers is the 386WB PC/AT chipset manufactured by OPTi, Inc., Santa Clara, Calif. Examples of such a chipset for EISA microcomputers are described in Intel, "82350 EISA Chip Set" (1990) and in Intel, "82350DT EISA Chip Set" (1992), both available from Intel Corp., Santa Clara, Calif., and incorporated by reference herein. Another example of such a chipset for EISA microcomputers is described in Buchanan, "A Highly Integrated VLSI Chip Set For EISA System Design", Silicon Valley Personal Computer Design Conference Proceedings, Jul. 9-10, 1991, pp. 293-306.

In the original IBM PC AT computer manufactured by IBM Corp., the I/O bus operated with a data rate of 8 MHz (BCLK=8 MHz). This was an appropriate data rate at that time since it was approximately equivalent to the highest data rates which the CPUs of that era could operate with on the local bus. Numerous third party vendors have since developed peripheral devices and controller cards which are intended to be plugged into an AT, ISA or EISA slot on the I/O bus, and which rely upon the 8 MHz maximum data rate.

In the years since the IBM PC AT was originally introduced, technology has improved dramatically to the point where local buses on typical high-end PC AT-compatible computers can operate on the order of 50 MHz. Despite these advances, however, such computers are still manufactured with an I/O bus operating at around 8 MHz because of the need to maintain compatibility with previously designed peripheral devices. These devices were designed in reliance upon the 8 MHz data rate, and many such devices are not capable of operating faster. Even modern designs for AT bus peripherals often rely on the 8 MHz maximum data rate, even though very little additional effort or cost would be involved to design them to operate faster. The modern EISA bus also operates only at about 8 MHz because of the need to maintain compatibility with add-on cards designed for AT and ISA platforms. Accordingly, efforts to further enhance the performance of EISA bus systems must rely on techniques other than increased BCLK frequencies.

One of the problems that PC-AT-compatible designs encounter arises because an event which occurs on the I/O bus, and which must cause a responsive event on the host bus, must cause such host bus event synchronously with the host bus CLK signal. Otherwise the system risks violating the setup and hold requirements of the CPU input lead. As used herein, a signal or event is considered synchronous with a clock signal if it occurs in response to an edge transition in the clock signal. A signal or event is asynchronous with a clock signal if it is not generated in coordination with any edge transition in the clock signal. An example of a synchronization problem occurs at the end of a CPU read access to an address which is located physically on the EISA bus. At the end of such an EISA read cycle, interface circuitry deactivates the EISA bus CMD# signal in response to a BCLK rising edge. After terminating CMD#, the interface circuitry must assert HREADY# to the CPU synchronously with a rising edge of the host CLK signal. HREADY# is sampled on the following rising edge of CLK, and the interface circuitry withdraws HREADY# at that time as well. Assuming CLK and BCLK operate asynchronously with eath other, in which case the end of CMD# will not occur synchronously with CLK, the interface circuitry must perform a synchronizing function when it asserts HREADY# in response to the termination of CMD# in order to minimize the risk of violating the setup-and-hold requirements of the CPU's RDY# input.

Synchronizers are well known in the art, and a typical synchronizer is depicted in FIG. 1. As shown in FIG. 1, it includes two D flip-flops 102 and 104, each with a D input, a Q output, and a clock input. The Q output of flip-flop 102 is connected to the D input of flip-flop 104. The synchronous output signal is provided on the Q output of flip-flop 104, and the clock signal with which it is synchronized is connected via a line 106 to the clock inputs of both flip-flops 102 and 104. The input signal in response to which the synchronous output signal is generated, is provided to the D input of flip-flop 102. In operation, if the input signal reaches the D input of flip-flop 102 later than one "hold" time $t_{hold}$ after a rising edge of the clock signal on line 106, and before a "setup" time $t_{setup}$ prior to the next rising edge of the clock signal on line 106, then the operation of the synchronizer is straightforward. The input signal is loaded into D flip-flop 102 in response to the first clock rising edge which reaches flip-flop 102 after the input signal reaches the D input of flip-flop 102, and appears on the Q output of flip-flop 102 shortly thereafter. It then reaches the D input of flip-flop 104 well before the next rising edge of the clock signal, thereby certainly meeting all setup and hold requirements of flip-flop 104. In response to the second rising edge of the clock signal, the input signal is loaded into flip-flop 104.

If instead the input signal were to reach the D input of flip-flop 102 too close to a rising edge of the clock signal on line 106, however, then the flip-flop 102 may enter a metastable state in which the Q output of flip-flop 102 may either oscillate or approach a stable state only very slowly. The time from $t_{setup}$ prior to a rising edge, through $t_{hold}$ after the rising edge, is sometimes called a metastability window and has a duration dependent upon the fabrication technology and the design of the flip-flops. Assuming the timing of the input signal is uncorrelated with the destination clock signal (which would normally be the case when the host clock and BCLK signals are generated asynchronously), each input event to be synchronized has a finite probability, defined by the length of the metastability window divided by the period of a BCLK cycle, of placing flip-flop 102 into a metastable state. If the output of a synchronizer were to be taken from the Q output of flip-flop 102, the synchronizer would not be very reliable due to the relatively large probability of metastable output states. Usually, however, metastable states do become stable after some period of time. The metastable output of flip-flop 102 therefore usually will reach a stable state at the D input of flip-flop 104 before the next clock rising edge arrives at the clock input of flip-flop 104. There is still a possibility that this signal will not settle sufficiently by that time, and that flip-flop 104 will also enter a metastable state, but that probability is significantly less than the probability of a metastable state after only one flip-flop.

Accordingly, the inclusion of the second flip-flop 104 significantly improves the reliability of the synchronizer of FIG. 1. It is known that the longer the time delay between the triggering of flip-flop 102 and the triggering of flip-flop 104, the more reliable the synchronizer. It is also known that the two flip-flops of the synchronizer may be triggered in response to opposite polarity edge transitions in the clock signal on line 106, if the time delay between such opposite polarity edges is long enough, given the design of the flip-flops, to permit most metastable states of the first flip-flop to settle. It is also known that the addition of a third series flip-flop would further improve reliability as would each additional series flip-flop. However, it is generally considered that two series flip-flops are sufficient. Accordingly, it is generally considered that at least two flip-flops and two clock edges of the destination bus clock are required to reliably provide an output signal which is synchronous with the destination bus clock signal in response to an input signal occurring asynchronously with respect to the destination bus clock signal.

Returning to the example in which the interface circuitry generates HREADY# synchronously with a rising edge of CLK in response to the termination of CMD#, if BCLK is generated completely asynchronously with CLK, then the interface circuitry synchronization function requires at least two edges of CLK before HREADY# can be asserted. Since CLK frequencies are high enough that the two edges used for synchronization should be of the same polarity, the synchronizer in the interface circuitry is not able to assert HREADY# until between one and two full CLK cycles after the withdrawal of CMD# reaches the first flip-flop of the synchronizer, depending on whether it does so early or late in the CLK cycle. To improve the throughput of EISA systems, therefore, it is desirable to reduce or eliminate the synchronization delay.

The Intel 82350 chipset, instead of using a BCLK generated asynchronously with the host CLK signal, generates BCLK synchronously with CLK by dividing the CLK signal down. For example, if CLK operates at 25 MHz (40 nS period), the chipset generates BCLK by dividing CLK by 3. If CLK operates at 33 MHz (30 nS), then the chipset generates BCLK by dividing CLK by 4. In both cases, the resulting BCLK frequency is 8.33 MHz (120 nS). Generating BCLK synchronously with CLK avoids the need for synchronization delays in the transmission of signals from one bus to the other, but only if certain other restrictions are satisfied. For example, an EISA bus signal generated synchronously with BCLK may be transmitted directly to the host bus without a synchronization circuit only if the signal will reach the CPU prior to the setup time before the CLK edge on which the signal will be sampled. Thus the total time delay from a rising edge of CLK, through the frequency divider to a rising edge of BCLK, plus the time delay inserted by the internal interface chipset circuitry (as in the case of CMD#), from the BCLK rising edge to the time it asserts the signal to be transmitted to the host bus, plus the CPU setup time for the signal, must all total less than the period of one CLK cycle. For a host CLK frequency of 33 MHz (30 nS), this restriction can impose a severe limitation on the design of EISA system board circuitry. For host clocks operating at 50 MHz (20 nS), the restriction can be impossible to satisfy.

For some signals to be transmitted from the EISA bus to the host bus, it may be possible to relax the restriction by having the interface circuitry generate the host bus signal in response to a different signal occurring either on the EISA bus or internally to the chipset, which predicts the occurrence of the particular signal half or one BCLK cycle later. For example, it is believed that the Intel 82350 chipset generates HREADY# at the end of an EISA read cycle in response to the detection by the chipset of the EISA bus EXRDY signal sampled active on a falling edge of BCLK after CMD# became active. (With reference to ISA cycles, it is believed that the Intel 82350 chipset generates HREADY# at the end of an ISA read cycle in response to CMD# and CHRDY both sampled active on a BCLK falling edge after the minimum CMD# width is satisfied, and also in response to NOWS#, CMD# and CHRDY all sampled active on a BCLK falling edge whether or not the minimum CMD# width has been satisfied.) EISA slave devices keep EXRDY asserted, and withdraw the signal prior to a BCLK falling edge only if the device does not expect to be able to terminate the cycle in response to the immediately following BCLK rising edge. Therefore, EXRDY sampled active on a falling edge of BCLK after CMD# has become active, predicts that CMD# will be withdrawn in response to the immediately following BCLK rising edge. Accordingly, it is believed that the 82350 chipset generates HREADY# by detecting EXRDY active in response to a BCLK falling edge while CMD# is active, then asserts HREADY# in response to the second host CLK rising edge thereafter. Whether the CLK signal operates at 25 MHz or 33 MHz, a two CLK delay assures that HREADY# will be asserted no earlier than the time that CMD# is withdrawn. The EXRDY-sampling-to-HREADY# delay in the 83250 chipset is believed to be fixed at two CLK cycles, regardless of the CLK clock frequency.

This solution may relieve the timing restrictions on CMD#, but merely reapplies them to the generation of BCLK falling edges. That is, although the time delay restrictions for CMD# no longer apply since withdrawal of CMD# is no longer used to generate HREADY#, new timing restrictions are placed on the BCLK falling edge similar to those which previously applied to CMD#. These restrictions BCLK are not required necessarily for accurate generation of HREADY#, since the two CLK period delay essentially creates a de-facto synchronizer. However, early availability of EXRDY makes it desirable to generate an "early ready" signal for the host bus in case the host bus circuitry inserts a clocked delay before the host bus cycle can be terminated. It has in fact become nearly a market requirement that I/O interface chipsets have an "early ready" signal available. Early ready is asserted only one CLK cycle following detection of EXRDY sampled active with CMD# active in the Intel 82350 chipset, thereby permitting only a one cycle synchronization delay. As previously explained, a single flip-flop is generally considered insufficient for reliable synchronization with minimal probability of metastability. Accordingly, the specification for the Intel 82350 chipset still mandates that BCLK falling edges, as provided to the BCLK input of the chipset from the BCLK output of the chipset, occur no more than 15 nS after a CLK rising edge. Since the chipset requires all 15 nS to generate the BCLK falling edges, and since no discrepancy is permitted between the BCLK signal as provided to the BCLK input and the BCLK signal as actually used on the bus, this imposes a severe restriction indeed on board layout and routing of the BCLK signal.

For signals being transmitted from the host bus to the I/O bus, a similar synchronization problem exists. If an event must occur on the EISA bus in response to an event on the host bus, the I/O interface circuitry must take steps to ensure that the EISA bus event will be synchronous with an edge of BCLK; otherwise the system risks violating the setup and hold requirements of EISA bus devices.

When the CPU issues a memory or I/O read access to an address which is present physically on the EISA bus, it does so by setting up the address and cycle definition control lines on the host bus, and then asserting the host bus HADS# signal synchronously with a rising edge of the host clock signal. HADS# remains active for one full CLK cycle, and then terminates synchronously with the next rising edge of CLK, the edge on which ADS# is intended to be sampled. The interface circuitry recognizes that the access is to an address physically present on the EISA bus. The interface circuitry sets up appropriate cycle definition signals on the EISA bus, and then asserts START# to start the EISA read cycle. START# is specified to be sampled on a rising edge of BCLK. The EISA specification also calls for START# to terminate synchronously with the BCLK rising edge on which it is sampled. The EISA specification further requires START# to remain asserted for at least 120 nS (approximately one BCLK cycle time). Essentially, therefore, assuming no alteration of the BCLK signal itself, START# must be asserted synchronously with one rising edge of BCLK and withdrawn synchronously with the next rising edge of BCLK. The interface circuitry therefore must take steps to ensure that START# will be asserted and withdrawn synchronously with BCLK.

Assuming BCLK is generated asynchronously with CLK, then the interface circuitry synchronization function requires at least two edges of BCLK before START# could be asserted. The period of the BCLK signal is long enough such that these two edges can be opposite polarity edges of BCLK, but even so, the delay from detection of ADS# to assertion of START# can still be significant. Assuming a 120 nS BCLK period (8.33 MHz), this delay can be anywhere from 60 nS (if ADS# reaches the input of the first synchronizer flip-flop just before a falling edge of BCLK) to 180 nS (if the ADS# signal reaches the first synchronizer flip-flop just after a falling edge of BCLK. Such a delay can significantly affect a system-level throughput.

The Intel 82350 chipset avoids this delay for signals being transmitted from the host bus to the EISA bus since, as mentioned above, it generates BCLK synchronously with the host CLK signal. For these situations, for certain signals, other techniques are known for improving system throughput. For example, the Intel 82350 chipset uses a BCLK stretching technique (contemplated by the EISA standards committee) for the generation of START# at the beginning of an EISA cycle. The technique takes advantage of the fact that with a synchronously generated BCLK, there are only three or four possible cases of the relationship of HADS# to BCLK, depending on whether the CLK is divided by four or three, respectively, to generate BCLK. In this technique, HADS# is sampled active on a rising edge of CLK. On the next rising edge of CLK, regardless of the state of BCLK, the chipset asserts START#. It de-asserts START# in response to the fourth (or third) CLK rising edge thereafter, depending on the CLK frequency, thereby ensuring that START# has remained active for at least the required 120 nS. Then, in order to preclude any BCLK rising edge prior to the CLK edge in response to which START# is de-asserted, the following algorithm is followed: (1) If BCLK is high after START# is asserted, BCLK is maintained high until half a BCLK time before START# will end. The BCLK signal is then allowed to go low and continue normally. (2) If BCLK is low following the assertion of START#, then BCLK is maintained low until the end of START#. In all cases, BCLK has its first rising edge, after START# is asserted, in response to the same CLK rising edge to which the de-assertion of START# is responsive. The technique thereby keeps the START# to its minimum time period and thereby enhances throughput. It can be seen that BCLK stretching can be used only where the chipset generates BCLK, such as where the chipset generates BCLK synchronously with CLK.

The 80386-compatible and 80486-compatible CPUs, which are the most appropriate CPUs for use with an EISA architecture, are available operating at frequencies of at least 20 MHz, 25 MHz, 33 MHz, 40 MHz and 50 MHz. The EISA bus specification permits BCLK frequencies of up to 8.33 MHz (120 nS), and it is naturally advantageous to operate the EISA bus at the highest permitted frequency. Although a BCLK of 8.33 MHz is easily derived from CLK frequencies of 25 MHz or 50 MHz, by dividing by 3 or 6, respectively, the closest one can come by simple division of a 33 MHz signal is 8.25 MHz (division by 4). Similarly, the closest one can come by simple division of a 40 MHz signal is 8.0 MHz (division by 5). And for CLK frequencies of 20 MHz, the closest one can come to 8.33 MHz by simple division can deviate significantly from that maximum. Accordingly, for this host CLK frequency, an asynchronously generated BCLK may actually have higher system throughput than a synchronously generated BCLK signal even after synchronization delay requirements are considered.

SUMMARY OF THE INVENTION

According to the invention, several techniques are used to optimize the transmission of signals or events from one bus to the other. In one aspect, the user of a chipset is permitted to choose whether the originating events (i.e. the events in response to which a destination event is to be generated on a destination bus) are to be generated synchronously or asynchronously with the clock signal on the destination bus. Whether synchronous or asynchronous generation is chosen, the chipset may perform a synchronization function in response to an originating bus predictor signal. The number of destination clock cycles to delay before generating the desired destination bus event is responsive to the relative frequencies of the clock signals on the two buses, thereby accommodating a wide variety of such relative frequencies.

In another aspect, for events to be generated on a destination bus synchronously with a clock signal which is by specification stretchable, a chipset can follow either of two formulas for generating the destination bus event. In the first formula, useful where the destination bus clock signal is generated by the chipset (e.g. by dividing down the source bus clock signal), the destination bus event is generated promptly in response to the originating event and then the destination bus clock signal is stretched to make the destination bus event synchronous with the destination bus clock signal. The length of the stretch is responsive to the relative frequencies of the originating bus and destination bus clock frequencies. In the second formula, most useful where the destination bus clock signal is not generated by the chipset, a synchronizer is used to generate the destination bus event synchronously with the destination bus clock signal. The user of the chipset can select which formula is to be applied.

BRIEF DESCRIPTION OF THE DRAWINGS

The invention will be described with respect to particular embodiments thereof, and reference will be made to the drawings, in which:

FIGS. 8, 9A, 9B, 9C, 9D and 9E are timing diagrams illustrating the operation of the circuitry of FIGS. 6 and 7;

DETAILED DESCRIPTION

System Overview

Figure 2:
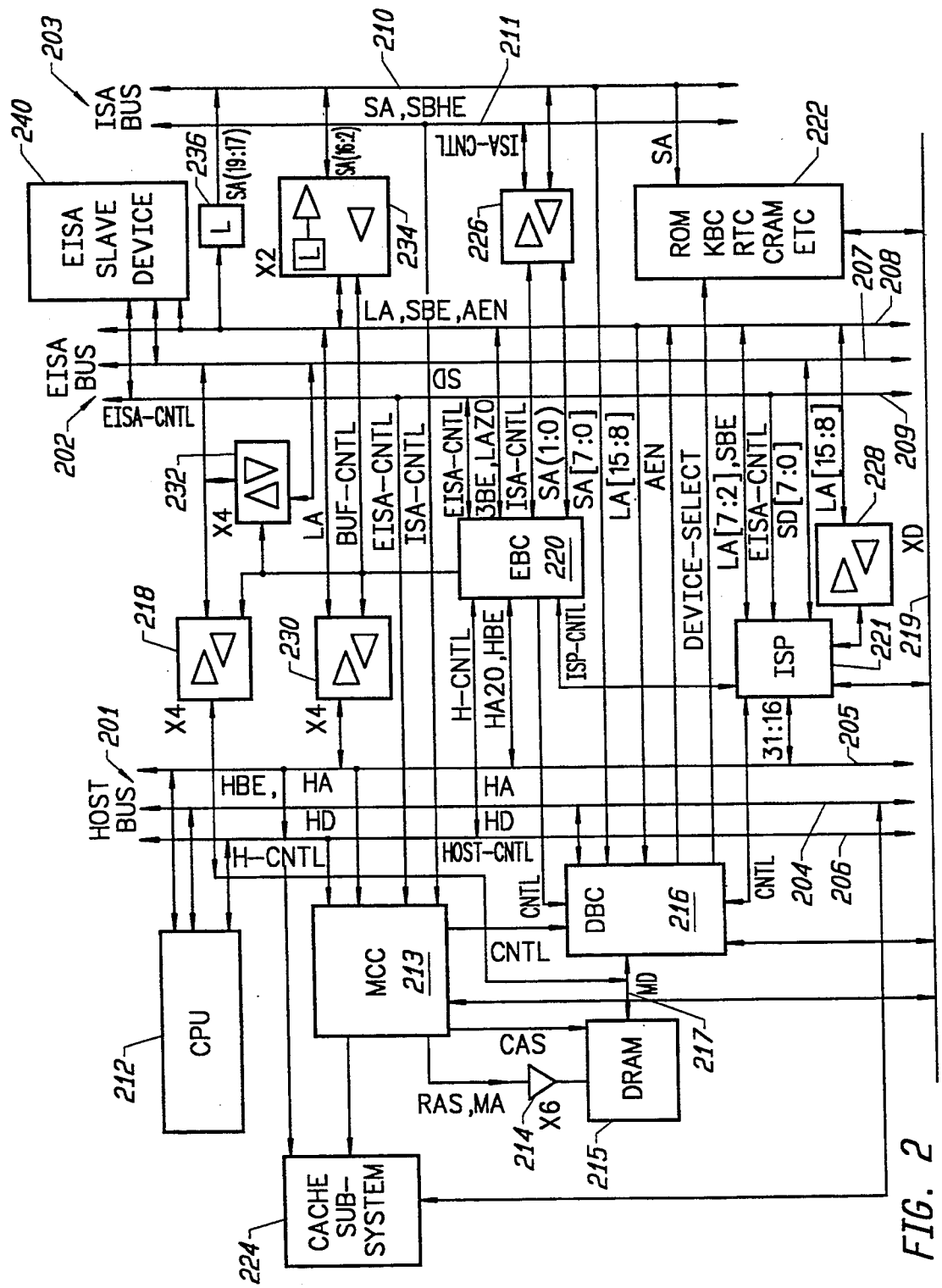
FIG. 2 is a simplified block diagram of a computer system which may incorporate the invention.

FIG. 2 is a block diagram of important features of an EISA-based microcomputer system which may incorporate the invention. It comprises a host bus 201, an EISA bus 202, and an ISA bus 203. The host bus 201 includes HD data lines 204, HA and HBE address lines 205, and a plurality of control lines 206. The EISA bus 202 includes SD data lines 207, LA, SBE and AEN address lines 208, as well as EISA control lines 209, and the ISA bus 203 includes SA address lines 210 and ISA control lines 211. The ISA bus 203 does not include any data lines since such lines would be duplicative of the SD lines 207 on EISA bus 202.

A CPU 212, such as an Intel 80486, as well as an optional numeric coprocessor (not shown), are coupled to the address, data and control lines of host bus 201. The address and control lines of host bus 201 are also connected to a memory/cache controller (MCC) 213, which is also connected to the EISA control lines 209 and to the ISA control lines 211. The MCC 213 provides memory address and RAS information via buffers 214 to a DRAM array (host memory) 215, as well as providing CAS information to DRAM 215. The data lines of DRAM 215 are coupled over an MD bus 217 to a data bus controller (DBC) 216, which is also coupled via bi-directional buffers 218 to the SD data lines 207 of EISA bus 202. The DBC 216 is also connected to the HD data lines 204 of host bus 201 bi-directionally, and is connected to receive SA(7:0) from the address lines 210 of the ISA bus 203 and LA(15:8) from the address lines 208 of EISA bus 202. DBC 216 generates eight AEN signals for EISA bus 202. Both the MCC 213 and the DBC 216 communicate bi-directionally with an 8-bit XD data bus 219. The DBC 216 receives control signals from the MCC 213, an EISA bus controller 220 (discussed below), and an integrated system peripheral 221 (discussed below). The DBC 216 also provides device select signals to a plurality 222 of 8-bit devices, the data lines of which are coupled to the XD bus 219. The plurality 222 can include a read-only memory (ROM), a keyboard controller (KBC), a realtime clock (RTC), CMOS RAM (CRAM), among other things. The system of FIG. 2 also includes a cache subsystem 224 which is coupled to the HA address lines 205 of host bus 201, to the MCC 213, and to the HD data lines 204 of host bus 201.

The system further includes the EISA bus controller (EBC) 220 mentioned above, which is further coupled to the host bus 201 control lines 206 and the HA20 and HBE address lines, and to the EISA bus 202 control lines 209 and LA20 and SBE address lines. The EBC 220 is also coupled via bi-directional buffers 226 to the ISA bus 203 control lines 211 and the SA(1:0) and SBHE address lines 210. The EBC 220 further provides and receives control signals to/from the integrated system peripheral 221.

The integrated system peripheral (ISP) 221 is coupled to host bus 201 address lines HA(31:16), XD data bus 219, and EISA bus 202 control lines 209, data lines SD(7:0), and address lines LA(7:2) and SBE. ISP 221 is further coupled via bi-directional buffers 228 to EISA bus 202 address lines LA(15:8).

The HA address lines 205 of host bus 201 are coupled via bi-directional buffers 230 to the LA address lines 208 of EISA bus 202. Bi-directional buffers 232 are coupled to SD data lines 207 of the EISA bus 202 for the purpose of swapping data bytes. The LA(16:2) address lines of EISA bus 202 are further coupled to provide information via a latch and buffer 234 to the SA(16:2) address lines of ISA bus 203, which in turn are coupled via a buffer in the latch/buffer 234 to provide information to the LA(16:2) address lines of EISA bus 202. An additional latch 236 couples the LA(19:17) address lines of EISA bus 202 to the SA(19:17) address lines 210 of ISA bus 203. The EBC 220 generates control signals for the buffers 218, 230 and 232 and latch/buffer 234. An EISA slave device 240 is also shown coupled to the address, data and control lines of EISA bus 202.

The EBC 220, MCC 213, ISP 221 and DBC 216 are, respectively, 82C681, 82C682, 82C686 and 82C687 chips available from OPTi, Inc., Santa Clara, Calif. These chips are incorporated by reference herein, as is the databook publication "OPTi-386/486 WB EISA Chipset" (1991) describing these chips. The chipset is designed for systems running at host CLK frequencies of up to 50 MHz. Details of the OPTi EISA chipset other than as set forth herein are generally not important to an understanding of the invention and therefore will not be described.

Table I describes the signal connection pins of MCC 213. In these tables, the second column indicates the directions of the pin as follows: I=input; 0=output; B=both; T=three-statable.

TABLE I

| CLOCK AND RESET | | |
|---|---|---|
| CLK | I | Host Clock. Master single-phase CPU clock driven from an external clock-generator circuit. In 486 based systems, it is the same signal that the CPU receives. In 386 systems, it is the single-phase version (half the frequency) of the CPU clock. |
| CLK2 | I | Clock2. This input is driven from an external oscillator circuit without any external division. In systems at or below 33 MHz, this clock signal input is twice the CPU's rated frequency. This is the same clock signal that drives the CPU in 386 systems. CLK2 is used for CAWE(3:0)# generation if the cache's Early Write Enable feature is turned on (Reg C31H<0> is set). |
| RST# | I | Reset. RST# is an input fromthe EBC that resets the MCC (this same reset signal is also connected to the ISP, DBC, and 8042). The EBC asserts this signal based on powergood and reset switch functions. ('#' indicates active low signal.) |
| Address/Status | | |
| HA(31:2) | I | Host Address Bus. Connected to the Host CPU A(31:2) bus. The MCC uses these 30 address lines for internal memory decoding and to generate the memory address bus (MA(11:0)).and the low order cache addresses (CAAd_(1:0), CAA2). The HA(31:2) bus is also used to determine all MCC internal register decodes. |
| GATEA20/TSEL | I | GATEA20 or Test Mode Select. This input pin serves two functions. Normally, it serves as the GATEA20 |

TABLE I-continued

| | | |
|---|---|---|
| | | input from the keyboard controller (Output P21 of the 8042). This input, along with the internal Fast GATEA20 register (Reg C30h<0>), is used to generate A20M#. The second function of this pin is to allow the MCC to enter its Tristate test mode. The MCC will enter this test mode when GATEA20/TSEL is sampled High AND GT1M#/TMOD# is sampled low at the trailing edge of RST#. |
| A20M# | O | A20 Mask. This output determines whether Host Address A20 should be forced low (to emulate the address wraparound at 1MB on the 8086). 486 based systems receive this signal directly (because of their internal cache). 386 systems require the masking to take place externally, so for these systems, A20M# is connected to the A20M# input of the EBC. |
| HBE(3:0)# | I | Host Byte Enables (3:0). Connected to Host CPU BE(3:0)#. These signals determine valid bytes during DRAM/cache writes and MCC internal register accesses. |
| HM/IO# | I | Host Memory / IO#. Connected to Host CPU M/IO#. This is sampled at the same time as HA(31:2). This signal is not used by ISA Masters. |
| HD/C# | I | Host Data / Control#. Connected to Host CPU D/C#. This is sampled at the same time as HA(31:2). |
| HW/R# | I | Host Write / Read#. Connected to ISP & Host CPU W/R#. This is sampled at the same time as HBE(3:0)# except for ISA masters, when it is not used. |
| Host Interface | | |
| 386/486# | I | CPU Select. Hardware strapping pin to distinguish between 386 and 486 systems. |
| HADS# | I | Host Address Status. Connected to Host CPU ADS#. This is sampled at the rising edge of CLK, and when active, indicates valid address/status on the host address bus. |
| BLAST#/ EBCRDY# | I | Burst Last or EBC 386Ready. The function of this pin is determined by the processor type. For 486 systems, this is the BLAST# signal from the CPU and is sampled on the rising edge of CLK except in T1 and the first T2. In 386 systems, this is connected to the HRDY0# signal from the EBC. The MCC internally OR's this signal along with any coprocessor ready signal to produce the BRDY# output, which is fed to the 386 CPU. |
| RDYI#/ 387RDY1# | I | 486 Ready In or 387 Ready1. The function of this pin is determined by the processor type. It is directly connected to the RDY# pin of the CPU for 486 systems and is used by other devices to indicate the end of the current cycle. In most 386 systems, RDYO# from the 387/3167 must be cascaded through the MCC. In this case, 387RDY1# is connected to READYO# from the numberic coprocessor. In all other 386 systems, this pin is left floating (a weak internal pull-up is provided). |
| 387RDY2# | B | 387 Ready2. This pin is unused and should be tied high in 486 systems. In most 386 systems, RDYO# from the 387/3167 is cascaded through the MCC via 387RDY1#. In this case, 387RDY2# should be pulled high. In the special case where the 387/3167 READYO sm is OR'D externally with the MCC's BRDY#, the READYO# from the coprocessor should be connected to 387RDY2# and 387RDY1# should be left unconnected. This second case is not recommended above 25 MHz. |
| BRDY# | B | Burst Ready. This signal is connected to the BRDY input of the 486 or to the READY# input of the 386. The MCC drive this line active (low) to indicate the end of a host CPU to local memory cycle. After being active, it is driven high (inactive) for one clock and then tristated. In 286 systems, it is also driven low for a CLK after EBCRDY# or 387RDY# is sampled active. |
| Arbiter | | |
| HHLDA | I | Host Hold Acknowledge. Connected to HHLDA from the host CPU. This indicates an EISA/ISA/DMA/Refresh access. |
| EMSTR16# | I | ISA Master. This input, from the ISP, indicates that an ISA master is in control of the Host/EISA bus. |
| MCCRDY | O | MCC Ready. This normally active (high) signal goes inactive (low) when a hidden refresh cycle is pending |

TABLE I-continued

| | | |
|---|---|---|
| | | and returns active when the refresh cycle is over. It is connected to the EBC MCCRDY input. |
| Bus Interface | | |
| BCLK | I | EISA BCLK. EISA system clock. Connected from BCLK of the EISA connectors. |
| START# | I | Start. This input indicates the beginning of an EISA/DMA/Refresh access and is connected to START# of the EISA connectors. |
| CMD# | I | Command. Provides timing control within an EISA cycle. Connected to CMD# of the EISA connectors. |
| MSBURST# | I | Master Burst. This input is sampled at the rising edge of BCLK and indicates that an EISA burst mode transfer should be carried out. It is connected to MSBURST# of the EISA connectors. |
| REFRESH# | I | Refresh. Connected to REFRESH# of the EISA connectors. The leading edge of MRDC# is interpreted as a request to perform hidden refresh when this signal is active. |
| MRDC# | I | Memory Read Command. The MCC uses this input to indicate a DRAM/Cache read from a master device (EMSTR16# active). Also, when REFRESH# is active, the leading edge of MRDC# is interpreted as a request to perform hidden refresh. Connected to MRDC# of the EISA connectors. |
| MWTC# | I | Memroy Write Command. When EMSTR16# is active, the leading edge of MWTC# is used to start a DRAM/cache write. Connected to MWTC# of the EISA connectors. |
| Decode | | |
| HKEN# | O | Host cache enable. Connected to the KEN# of the 486. It is based on a decode of HA(31:17) and will be active for cacheable regions of memory. This signal is forced active from the end of a CPU cycle to the end of the first T1. |
| HLOCM# | O | Host Local Memory. Inhibits EISA/ISA cycle if active during a local Host Master cycle. Connected to HLOCM# of the EBC. |
| GT1M#/TMOD# | B | Greater than 1MB or Test Mode. This pin serves two functions. This signal uses HA(31:20) and A20M# to decode memory accesses above 1MB (inactive for accesses in the 000XXXXXh range). It is connected to GT1M# of the EBC. The second function of this pin is to force the MCC into test mode. The MCC will enter its test mode when this pin is sampled low on the trailing edge of RST#. GATEA20/TSEL must bge high at this sample point for the Tristate test mode to be entered. A weak internal pull-up keeps GT1M#/TMOD high during RST# if no outside source/tester is driving it. |
| ROMCS0# | O | ROM Chip Select 0. During normal operation, it goes active when FFFFXXXXh or FXXXXh is decoded from HA(31:16). It is connected to CS# of the BIOS ROM. |
| ROMCS1# | O | ROM Chip Select 1. ROMCS1# decodes a 16K/32K/64K block in the range C0000h thru EFFFFh based on the value programmed into the MCC's ROM/Shadow RAM index registers (C36h-C3Fh). |
| DRAM Interface | | |
| MA(11:0) | O | Multiplexed DRAM addresses. This bus provides row and column address information to the DRAMs. External buffering is typically required. Note that for EISA master accesses, the HA bus should drive the MA through transparent latches. |
| RAS#(3:0) | O | Row Address Strobes. Each RAS output corresponds to one DRAM bank of four bytes. |
| CAS3#(3:0) CAS2#(3:0) CAS1#(3:0) CAS0#(3:0) | O | Column Address Strobes. CAS0#_(3:0) connects to byte lanes 3 thru 0 of DRAM bank-0. Similarly, each set of four CAS lines corresponds to a particular 4-byte bank. To guarantee EISA memory access timing, these CAS signals should be connected directly (without external buffering) to the local memory DRAMs. |
| WE# | O | Write Enable. This signal is externally buffered to drive the WE# input of the DRAM's. WE# transitions with similar timing to RAS(3:0)#. |
| Cache Interface | | |
| TAG27/18 TAG26/17 TAG25/16 TAG(24:19) | B | Cache Tag Data Bus. Connected to the tag SRAM data bus. The tag number corresponds to the Host address line that it will be compared against. The tag bus is always 9 bits wide. For CPU accesses, the tag bits are sampled at the falling edge of CLK in the |

TABLE I-continued

| | | |
|---|---|---|
| | | first T2. For EISA/DMA, they are sampled at the rising edge of BCLK30. For ISA masters, they are sampled at the leading edge of MRDC# or MWTC#. |
| TAGWE# | O | Tag Write Enable. Connected to tag SRAM WE#. This signal is active during CPU read-miss cycles when the cache gets updated. |
| DIRTY | B | Dirty bit. The dirty bit indicates whether the data in the cache has been modified. It is sampled on the rising edge of CLK on the first T2 of a CPU read miss cycle. It is connected to the data pin of the dirty-bit SRAM. |
| DIRTYWE# | O | Dirty bit Write Enable. This signal goes active when the host CPU writes into the cache. It is connected to the WE# pin of dirty-bit SRAM. |
| XCA30E# | O | External Cache address 3 Output Enable. Allows the CPU address lines HA2 and HA3 to drive the cache SRAM. Connected to the OE# of the buffer between HA2, HA3 and CAA3(1:0), and CAA2. |
| CAA31 | O | Cache Altered Address 3 (odd). Connected to cache bank-1 A3 for the 486 and to A3 of the entire cache for the 386. |
| CAA30 | O | Cache Altered Address 3 (even). Connected to cache bank-0 A3 for 486 systems. |
| CAA2 | O | Cache Altered Address 2. Connected to the cache addrss line A2. |
| HACALE | O | HA bus to CA bus Latch Enable. This output provides the proper control timing to the latches that create the cache address bus CA(18:4) from the HA bus. This normally active signal goes inactive at the end of a host write or EISA/DMA access to provide sufficient hold time on the CA bus. |
| CACS#(1:0) | O | Cache Memory Chip Selects. Connected to cache-memory CS# for odd & even banks respectively. These outputs are dependent upon the DRAM size, shadow -control, and cache mode bits. When the cache is interleaved (486), these normally active signals go inactive when there is a cache write to the opposite bank of cache. |
| CAOE# | O | Early Cache Output Enable. This signal functions as an output enable for the cache SRAMs with slightly earlier timing than CDOE# and with fewer decoding restrictions. It is typically unused. |
| CAWE(3:0)# | O | Cache Write Enables. Connected to cache-memory WE# pins for byte lanes 3 thru 0. These signals are derived from CLK2 if the MCC's Early Write Enable feature is set (Reg C31 <o> = 1). |
| Data/Parity | | |
| CDOE(1:0)# | O | Cache Data Output Enable. Used to enable data from the cache SRAM onto the local HD bus. For 486 systems, CDOE0# is always controls the low cache data SRAM bank and CDOE1# is used for the upper bank only when cache interleaving is selected (64k/256k cache size). For 386 systems, either signal can be used. In both cases, CDOE# will go high when HA31 is high. |
| XD(3:0) | B | X-Data Bus. The MCC uses the low order nibble of the XD bus to provide the programming data for its internal registers. The upper four bits are ignored during I/O programming cycles to the MCC. |
| MDHDOE# | O | Memory to Host Data Output Enable. This control signal enables instructs the DBC to enable data from the MD onto the HD bus for CPU DRAM reads. It is connected to MDHDOE0# of the DBC. |
| MDHDCLK | O | MD/HD Clock. This normally high signal is the clock used by the DBC's internal master-slave flip-flop between MD and HD busses. It is similarly used to clock the MP bits for parity checking. This signal should be connected to MDHDCLK of the DBC |
| HDMDLE# | O | HD/MD Latch Enable. This normally active signal goes inactive during cache write-back cycles for one CLK when CAS# goes acgive. It is connected to HDMDLE# of the DBC. |
| HDMDOE# | O | HD/MD Output Enable. This signal enables the HD bus onto the MD bus and is active for all CPU memory writes except cache hit cycles. It is connected to HDMDOE# of the DBC |
| PAREN# | O | Parity Enable. PAREN# provides a timing pulse to the DBC after valid DRAM data has been read into the DBC. This pulse is used as the timing strobe to check for parity errors. It is connected to PAREN# of the DBC. |
| EISA-Timing Signals | | |

TABLE I-continued

| | | |
|---|---|---|
| BCLK15 | I | BCLK-15. 15ns delayed version of BCLK from the external delay line. |
| BCLK30 | I | BCLK-30. 30nS delayed version of BCLK from the external delay line. |

The EBC 220 is capable of operation in both 386 and 486 mode. It generates the EISA bus clock (BCLK) as well as the keyboard clock while also providing board level and CPU/Coprocessor reset signals. In addition, the EBC controls the interface between the EISA bus and the Host bus and arbitrates between Host-/EISA/ISA Masters, DMA controllers, and Refresh requests for the EISA bus. It directs the steering logic of the DBC 216 and the ISP 221 and provides latch-/buffer controls for address/data byte lane translation/-swapping. Additionally, it provides the address translation between masters and slaves for addresses A20 and A(1:0).

If the CPU 212 is an 80386 compatible CPU, then the host bus 210 clock signal is dual phase (non-overlapping) and therefore operates at twice the specified frequency of the CPU 212. While a synchronous BCLK may be derived from either this dual phase version or a single phase version for purposes of the invention, the present embodiment operates on a single phase version of the host bus 210 clock signal. Accordingly, the single phase version of the host CPU clock drives the CLKIN input of EBC 220. This is the same frequency as an installed 486 CPU and half the frequency of the signal known as "CLK2" applied to a 386 host CPU.

The EBC 220 generates approximately an 8 MHz EISA bus clock signal BCLKOUT. The EBC 220 divides the CLKIN signal by an appropriate amount, (based on the external speed strapping pins SPEED1# and SPEED0#) to produce this BCLKOUT signal. BCLKOUT is buffered externally to provide the required drive of the BCLK line of EISA control lines 209. The EBC 220 also samples the actual EISA bus clock, BCLK, through its BCLKIN input in order to internally synchronize and drive the EISA bus logic. This mechanism allows the EBC 220 to always sample the actual EISA bus clock even if a separate externally generated signal has substituted for BCLKOUT in driving the EISA bus BCLK line. The input signals BCLK15 and BCLK30 are derived via an external delay element and are used by the EBC 220 (and the MCC 213) to help relax the EISA bus timing requirements.

Table II illustrates the relationship between CLKIN and BCLKOUT:

TABLE II

| SPEED(1:0)# | CLKIN (max) | DIVISOR | BCLKOUT |
|---|---|---|---|
| 11 | 25 MHz | 3 | 8.33 MHz |
| 10 | 33 MHz | 4 | 8.25MHz |
| 01 | 40 MHz | 5 | 8.00 MHz |
| 00 | 50 MHz | 6 | 8.33 MHz |

For each SPEED# strapping option, Table II indicates the maximum host clock (CLKIN) frequency which will permit the EBC 220 to properly synchronize signals between buses. A slower CLKIN than that specified in the Table may be used, in which case the BCLKOUT frequency will be reduced accordingly. As will be seen, for any strapping option, a separate oscillator may be used to generate BCLK asynchronously with CLKIN, in which case external circuitry will ignore BCLKOUT. Asynchronous generation of BCLK is recommended for CLKINs of 20 MHz since the smallest frequency divisor of which the EBC 220 is capable is 3 (SPEED(1:0)#=11). A CLKIN frequency of 20 MHz would therefore yield a synchronous BCLKOUT of 6.67 MHz, which is much below the EISA-specified maximum BCLK frequency of 8.33 MHz. An asynchronously generated BCLK may be set at 8.33 MHz independently of the slow CLKIN frequency.

The EBC interfaces directly with the local CPU 212 on the Host bus 201. This interface is used to track host bus cycles when the CPU 212 or other local device is the current master on the host bus 201, When a host cycle is initiated, the EBC 220 determines whether any local slave is responding. If a local device is not the target of the cycle, then the EBC 220 will activate its EISA/ISA interface logic to complete the instruction. The EBC 220 waits until the completion of the EISA/ISA portion of the cycle before terminating the cycle on the host bus 201.

The EISA/ISA interface of EBC 220 monitors cycles initiated by EISA or ISA masters and watches their corresponding busses to detect a slave response. The correct cycle will then be generated on the responding slave's bus (EISA or ISA). The EISA/ISA interface accepts cycles from the host interface and will run the appropriate cycles on the EISA or ISA bus 202 or 203. If necessary, the EISA/ISA interface will perform multiple cycles (assembly/disassembly) for a single host cycle. When the translation is completed, the host interface is informed to terminate the cycle on the local bus. This also informs the host interface that the host can change the address for the next cycle.

The EBC 220 also controls the data buffers 218 and 230 and provide the latching clocks and output enables used by the steering logic in the DBC 216 and the ISP 221.

The control lines CPY01#, CPY02#, CPY03#, CPY13#, and CPYUP are used in the data bus assembly/disassembly logic when a master and slave are different widths. These signals connect directly to external transceivers.

The LA/SA, and LA/HA address steering is accomplished with external buffers and latches. The EBC 220 provides the control signals to direct this address logic.

The EBC is responsible for generating EISA bus compatible cycles including bursting to and from the EISA bus. Bus cycle compatibility is maintained by controlling bus translations and address/data latching for the following cases as well as any cycle involving mismatched source and destination sizes: Host master to an EISA/ISA/ISP slave; EISA master to an ISA/ISP slave; 32-bit EISA master to a 16-bit EISA slave; ISA master to an EISA slave; DMA from EISA/ISA memory; Refresh to EISA/ISA memory; and EISA/ISA/DMA accesses to a Host slave.

Table III describes the external pin connections of the EBC 220.

TABLE III

Host Bus Interface

| Name | Direction | Description |
|---|---|---|
| 386/486# | I | CPU Select. Hardware strapping pin to distinguish between 386 and 486 Host CPUs. Tied high for a 386 Host and low for a 486 Host. |
| HADS# | I | Host Address Strobe. A host initiated bus cycle is started from the EBC after HADS# has been sampled low and then high. Connected to ADS# from the host CPU. |
| HD/C# | B | Host Data / Control. The CPU drives this signal during host originated cycles and EBC decodes HD/C# (along with HW/R# and HM/IO#) to determine the type of cycle in process. The EBC drives this line high during EISA/ISA/DMA master cycles. HD/C# is connected to the Host CPU D/C# pin. |
| HW/R# | B | Host Write / Read. The EBC treats this signal as an input during Host CPU and DMA cycles and decodes it (along with HD/C# and HW/R#) to determine the cycle type in process. HW/R# becomes an output during master cycles based on SW/R# for EISA masters and on MWTC# or IOWC# for ISA master cycles. This signal is connected to the ISP HW/R# pin and the CPU W/R# pin. |
| HM/IO# | B | Host Memory / IO. The CPU drives this signal during host originated cycles and the EBC decodes HM/IO# (along with HW/R# and HD/C#) to determine the type of cycle in process. The EBC drives line this during master cycles based on SM/IO# for EISA masters and bsed on IORC# or IOWC# for ISA masters. This signal is driven high during DMA cycles. HM/IO# is connected to the Host CPU's M/IO# pin. |
| HHOLD | O | Host Hold. This signal is driven active when synchronized DHOLD or SLOWH# are active. It is also driven high during normal refresh cycles when Hidden Refresh is disabled (Reg C11h<0> =0 or C30h<1> =0). HHOLD is connected to the Host CPU's HOLD input. |
| HHLDA | I | Host Hold Acknowledge. This is the acknowledgement from the CPU that is has given up the Host bus in response to HHOLD. The EBC uses this signal to generate RDHLDA to the ISP and the DBC. It is connected to the Host CPU's HLDA pin. |
| WCS# | I | Weitek Chip Select. Typically used to decode a local coprocessor such as the Weitek 3167 or 4167. If sampled active, the EBC assumes a local bus cycle is in process and inhibits the generation of EISA/ISA cycles. It is only sampled during Host initiated cycles. Typically connected to MCS# from the 3167/4167. |
| HLOCM# | I | Host Local Memory. This input tells the EBC that the accessed memory is local to the Host. During Host initiated memory access, this signal is sampled with the same timing as WCS# for 20/25/33 MHz systems and one CLKIN later otherwise. If active, the EBC inhibits the generation of an EISA/ISA memory cycle. During non Host initiated memory cycles, if HM/IO# is high, it is sampled at the same time as EX32# and the EBC assumes a 32-bit EISA memory access to the Host bus. HLOCM# is connected to the HLOCM# output of the MCC. |
| HLOCDEV# | I | Host Local Device. Local devices on the Host bus must drive this signal to inform the EBC that they are claiming the cycle in progress. During Host initiated cycles, this signal is sampled at the same time as HLOCM#. If active, the EBC assumes a local cycle and inhibits the generation of an EISA/ISA cycle. During all other memory or I/O cycles, HLOCDEV# is sampled at the same time as EX32# and if active, the EBC assumes a 32-bit EISA device on the Host data bus. It is connected to the decoding logic of any local device. |
| NPRDY# | I | Numeric Processor Ready. This input samples the numeric coprocessor's ready output pin and is tied directly to the 387/3167/4167/487SX READYO# pin. |
| LOCRDY# | I | Host Local Ready. An additional ready input for local devices in 486 mode. This pin has a weak internal pull-up and may be left unconnected. Its timing is similar to NPRDY#. |
| HRDYO# | O | Host Ready Out. For 486 systems, this pin is |

TABLE III-continued

| Host Bus Interface | | |
|---|---|---|
| Name | Direction | Description |
| | | connceted to the CPU's ready input. For 386 systems, this pin is connected to the MCC's readY input (BLAST#/EBCRDY#). The EBC drives this line low for one CLKIN at the end of all host-CPU cycles unless HLOCM#, WCS# or HLOCDEV# indicate a host-bus device. The EBC will also drive HRDYO# active (low) after NPRDY is sampled active as well as during 387 cycles when the coprocessor is not present. After driving HRDYO# low, the EBC will drive this signal high for one CLKIN cycle before tristating it to help the external pull-up resistor guarantee proper voltage levels to the CPU. |
| DELRDY | I | When tied low, this pin indicates standard HRDYO# timing. When tied high it indicates that HRDYO# is to be generated one CLKIN earlier than normal, where possible. |
| HLOCK# | I | Host Bus Lock. The CPU drives this pin to indicate that the current bus cycle is locked. This is used to generate SLOCK# for the EISA bus. HLOCK# is connected to the MCC HLOCK# pin and the CPU LOCK# output. |
| Host-Bus/Numeric Processor Interface | | |
| BREQ/HA31 | I | 486 Bus Request or 386 Host Address A31. The function of this pin is determined by the CPU installed. For 486 systems, it inidcates that the 486 is requesting control of the Host bus. The EBC uses this signal to generate CPUMISS#. In 386 systems, HA31 allows the EBC to decode 387 accesses at the top of I/O space. This signal is connected directly to the corresponding pin of the appropriate CPU. |
| HKEN#/ NPBUSY# | I | Host Cache Enable or Numeric Coprocessor Busy. The functin of this pin is determined by the CPU installed. For 486 systems, HKEN# is connected to the 486 KEN# pin and is sampled to override HBE(3:0)# during 486 reads. For 386 systems, NPBUSY# is connected directly from the coprocessor and is used to generate 386BUSY#, 386PEREQ and NPINT. Connected to 486 KEN# or 387 BUSY#. |
| NPERR | I | Numeric Coprocessor Error. For 486 systems, it is connected to the 486 or 487SX FERR# output and is used to generate IGERR# and NPINT. For 386 systems, this signal is connected the 387 ERROR# output and is used along with NPBUSY# to generate 386BUSY#, 386PEREQ and NPINT. It is also used to detect the presence of a 387 while the RSTCPU signal is active. This information is passed onto the processor via the 386ERR# signal. |
| WINT/NPPEREQ | I | Weitek Interrupt or Numeric Coprocessor Extension Request. In all 486 systems, and in those 386 systems with a 3167 or 4167 numeric coprocessor installed, this input is connected to the numeric coprocessor's interrupt signal (INTR). The EBC uses WINT in the logic that generates the numeric processor interrupt output (NPINT). In 386 systems with a 387 numeric coprocessor installed, the numeric coprocessor extension request signal (PEREQ) is connected to this pin on the EBC. NPPEREQ is used by the EBC to help generate the 386 processor extension request output (386PEREQ). |
| EADS# | O | External Address Status. EADS# is used by the 486 to monitor whether any external device has driven its address onto the Host bus. The CPU then will invalidate the corresponding internal cache line in order to maintain coherency. The EBC drives EADS# active for one CLKIN cycle, when the HA bus is stable, for every memory write by an EISA/ISA/DMA master. EADS# is not driven for read cycles. This output is connected to the 486 EADS# input and is not used for 386 systems. |
| 386PEREQ | O | 386 Processor Extension Request. This signal instructs the 386 that the 387 has operands ready to transfer. It is connected directly to the PEREQ input of the 386 and it is not used by 486 systems. |
| IGERR#/ 386ERR# | O | Ignore Numeric Processor Error or 386 Error. In 486 systems, IGERR# goes active when NPCS#and IOWC# are low and SA0 is high (write to port 0F1h) and stays active as long as NPERR# is active. It is |

TABLE III-continued

| Host Bus Interface Name | Direction | Description |
|---|---|---|
| | | connected to the IGNNE# input of the 486. For 386 systems this line reflects the 387 ERROR# status and is also used by the CPU to detect the presence of a 387. If a 387 is installed, this line will be driven low from the leading edge of RSTCPU until the first bus cycle. It is connected to the ERROR# input of the 386. |
| 386BUSY# | O | 386 Busy. This output is only used in 386 systems. 386BUSY# is active whenever the 387 is busy or when a coprocessor error condition has occurred. 386 BUSY# is also it is connected to the 386 BUSY# input. |
| NPINT | O | Numeric Coprocessor Interrupt. This output is connected to IRQ13 of the ISP. It goes active on coprocessor errors (NPERR#) and inactive when reset by an I/O write to port F0h (NPCS#, IOWC# and SA0 all low). |
| ISP/MCC Interface | | |
| DHOLD | I | Delayed Hold Request. This is a request for the Host and EISA bus, generated when the ISP wants to transfer control to an EISA/ISA/DMA master. DHOLD is used to generate HHOLD and will never be active at the same time as refresh request (REFRQ). It is connected to DHOLD from the ISP. |
| REFRQ | I | Refresh Request. It is never active along with DHOLD. If hidden refresh is disabled (Reg C11h<1> =0 (default) or RegC30h<1> =0 (default)), this input is used in the same way as DHOLD to request control of the Host and EISA busses during a refresh cycle. However, if Hidden refresh is enabled (Reg C11h<1> =1 AND C30h<1> =1) then the EBC generates RDHLDA at the end of any ongoing CPU cycle. Hidden refresh to the EISA bus will then be performed in parallel with ongoing CPU activity and any new CPU cycle to the EISA bus will be kept waiting until the bus refresh is over. This input is connected to REFRQ from the ISP. |
| SLOWH# | I | Slowdown Hold Request. This is one of several inputs that cause the EBC to generate HHOLD. Since 486 systems are intolerant of frequency changes, this signal provides an alternate method of making the CPU appear to slow down. SLOWH# is generated by the ISP in order to reduce the CPU band width so that it is compatible with older software. SLOWH# will toggle on and off depending on the rate that the ISP chooses to slow down the system. The method also works with 386 systems. This input is connected to the SLOWH# output of the ISP. |
| MCCRDY | I | MCC Ready. This input indicates that the MCC is ready to accept a new cycle. This normally active (high) input goes inactive (low) when a hidden refresh cycle is pending and returns active when the refresh cycle is over. RDHLDA is not allowed to make low to high transitions while MCCRDY is inactive. It is connected to the MCCRDY output of the MCC. |
| RDHLDA | O | Refresh or Delayed Hold Acknowledge. RDHLDA is driven active in response HHLDA from the CPU based oneither DHOLD or REFRQ if hidden refresh is disabled. It remains active as long as DHOLD is active. Also, when hidden refresh is enabled, (RegC11h<1> =1 AND RegC30h<1> =1), REFRQ will cause this output ot go active as soon as any pending cycle to the EISA bus is completed. In this case, RDHLDA will remain active as long as REFRQ is active. This output is connected to RDHLDA of the ISP and the DBC |
| CPUMISS#/ TMOD# | B | CPU Miss or Test Mode. This pin serves two functins. Normally, CPUMISS# indicates that a host access (HLOCDEV#, WCS# and HLOCM# are inactive) to the EISA bus is pending during a hidden refresh cycle. It is only driven active during RDHLDA. It is also active in response to HHOLD or BREQ and is connected to the CPUMISS# input of the ISP. The second function of this pin is to force the EBC into test mode. The EBC will enter its tristate test mode when this pin is sampled low on the trailing edge of |

TABLE III-continued

| Host Bus Interface Name | Direction | Description |
|---|---|---|
| | | PWRGD or RESETSW# and IO16#/TSEL is high. CPUMISS#/TMOD# is tristated when PWRGD or RESETSW# is low and a weak internal pull-up keeps it high when no outside source is driving it. |
| ST(3:0) | B | Inter-Chip Status bus. Inter-chip communication bus between the EBC and the ISP to reflect EISA/ISA/DMA control information. Connected to ST(3:0) of the ISP. |
| DRDY | B | Delayed Ready. DRDY is active during DMA or refresh cycles. It works in conjunction with ST(3:0) and is connected to DRDY of the ISP. |
| EXMASTER# | I | EISA Master. This indicates that an EISA master is in control of the bus. Connected to EXMASTER# from the ISP. |
| EMSTR16# | I | ISA Master. This indicates that an ISA master is in control the bus. Connected to EMSTR16# from the ISP. |
| ISA Bus Interface | | |
| BALE | O | Buffered Address Latch Enable. Externally buffered (such as by a 74F244) to drive BALE of the EISA connectors and the latch enable signal for the SA(19:17) latch. It is driven high during the second half of START# for Host/EISA master cycles and is always high during DMA/ISA/Refresh cycles. |
| CHRDY | B | EISA Channel Ready. Connected to CHRDY of the |
| CHRDYA | T | EISA connectors. The EBC pulls this line low for ISA master I/O cycle or access to EISA memory with the leading edge of ISACMD (MRDC#, MWTC#, IORC# or IOWC#). |
| GT16M# | I | Greater than 16 MB. The ISP drives this line active for DMA addresses greater than 16 MB. For compatible DMA cycles, the ISA memory commands are inhibited if an EISA memory resource responds when GT16M# is active. It is inactive during refresh and is connected to the GT16M# output from the ISP. |
| M16# | B | ISA 16-bit Memory Capability. The EBC pulls both |
| M16A# | T | M16# and M16A# low during ISA master cycles based on HLOCM#, EX16# or EX32#. It samples this line during Host/EISA/DMA access to ISA memory to determine the data width and default cycle time. These pins are connected M16# on the EISA connectors. |
| IO16#/TSEL | I | ISA 16-bit I/O. This pin serves two functions. Normally, the EBC samples this line during Host/EISA accesses to ISA I/O in order to determine the data-width and default cycle time. It is connected to IO16# of the EISA connectors. The second function of IO16#/TSEL is to force the EBC into test mode. The EBC will enter its tristate test mode when this pin is sampled high on the trailing edge of PWRGD or RESETSW# AND CPUMISS#/TMOD# is low. |
| NOWS# | I | No Wait State. The EBC samples this for Host/EISA(DMA) cycles to ISA-slaves (memories) on the falling edge of BCLKIN to shorten default cycles if CHRDY is high. It is connected to NOWS# of the EISA connectors. |
| MRDC# | B | Memory Read Command. This is an output of the EBC during Host/EISA/DMA and refresh cycles. This signal is driven active for all these memory reads except during Burst DMA reads or when EX16# or EX32# are sampled active. The EBC also drives MRDC190 active during all Compatible DMA reads when GT16M# is inactive. MRDC# is an input during ISA master cycles. It is connected to MRDC# of the EISA connectors through a 74F245 transceiver. |
| MWTC# | B | Memory Write Command. This is an output of the EBC during Host/EISA/DMA and refresh cycles. It drives this signal active for all memory writes except Burst DMA or when EX16# or EX32# are sampled active. The EBC also drive MWTC# active during all Compatible DMA writes when HGT16M# is inactive. MWTC# is an input during ISA master cycles. It is connected to MWTC# of the EISA connectros through a 74F245 transceiver. |
| IORC# | B | I/O Read Command. This signal is an output during Host/EISA/DMA/Refresh master cycles and is |

TABLE III-continued

| Host Bus Interface Name | Direction | Description |
|---|---|---|
| | | driven active during I/O reads. It is an input for ISA master cycles. IORC# is connected to IORC# of the EISAA connectors through a 74F245 transceiver. |
| IOWC# | B | I/O Write Command. This signal is an output during Host/EISA/DMA/Refresh master cycles and is driven active during I/O writes. It is an input for ISA master cycles. IOWC# is connected to IOWC# of the EISA connectors through a 74F245 transceiver. |
| GT1M# | I | Greater than 1MB. GT1M# goes active for addresses greater then 1MB. This signal is used to generate SMEMR# and SMEMW#. It is connected to GT1M# from the MCC. |
| SMEMR# | O | System Board Memory Read. Goes active for memory reads to addresses below 1MB (GT1M# is inactive) when MRDC# is active or REFRESH# is active. Buffered to drive SMEMR# of the EISA connectors. |
| SMEMW# | O | Systsem Board Memory Write. Goes active for memory writes to addresses below 1MB (GT1M# is inactive) when MRDC# is active or REFRESH# is active. Buffered to drive SMEMW# of the EISA connectors. |
| REFRESH# | I | Refresh. It indicates that a refresh cycle is in progress. Connected to REFRESH# of the EISA connectors and to the ISP. |
| MASTER16# | I | 16-bit Master. It indicates that a 16-bit EISA/ISA master is in control of the bus. For EISA masters, if it is sampled low at the BCLKIN rising edge where command goes active (after being sampled high one BCLKIN earlier), the EBC assumes a downshifting master and aborts all copying and assembly / disassembly for 16-bit burst slaves. It is connected to MASTER16# of the EISA connectors. |
| EISA-Bus Interface | | |
| SM/IO# | B | System Memory / IO. The EBC drives these lines |
| SM/IOA# | T | during Host master cycles (based on HM/IO#), ISA master cycles (based on IORC# or IOWC#) and DMA /Refresh (always high). They are connected to M/IO# of the EISA connectors. |
| SW/R# | B | System Write /Read. The EBC drives these lines |
| SW/RA# | T | during Host/DMA master cycles (based on HW/R#), ISA master cycles (based on MWTC# or IOWC#) and Refresh (always low). They are connected to W/R# of the EISA connectors. |
| SLOCK# | B | Bus Lock. The host or bus master asserts LOCK# to |
| SLOCKA# | T | guarantee exclusive memory access during the time LOCK# is asserted. This is an output from the EBC during host master cycles. It is driven active from the BCLKIN falling edge during START# to the BCLKIN falling edge after CMD# going inactive during Host cycles for which HLOCK# is asserted. It is connected to LOCK# of the EISA connectors. |
| START# | B | Cycle Start. START is an output for Host/ISA/DMA/ |
| STARTA# | T | Refresh masters. It is driven active to indicate the beginnig of an EISA cycle for all these cases except for Host master cycles when HLOCM#, WCS# or HLOCDEV# has indicated a host-bus device has been decoded on the local bus. It is also an output for assembly/disassembly cycles of an EISA master and is driven active to indicate the beginning of such cycles. For host generated back-to-back I/O cycles (or INTA) to ISA devices (including assembly/disassembly cycles), extra delay is inserted between the trailing edge of the last IORC#/IOWC# and the leading edge of the next START#. The EBC's I/O delay register (C12h<3:0>) determines the number of BCLK delays to be inserted between such cycles. Delays are programmed based on 8-bit and 16-bit accesses. START# and STARTA# are connected to START# of the EISA connectors. |
| CMD# | O | Command. CMD# provides timing control within a cycle. It is driven active from the BCLKIN rising edge when START# is low to the BCLKIN rising edge when MSBURST# is sampled high after EXRDY is sampled high. CMD# may be wider during DMA cycles and the trailing edge occurs with the BCLKIN falling edge for DMA reads. It is buffered to drive CMD# of the EISA connectors. |

TABLE III-continued

Host Bus Interface

| Name | Direction | Description |
|---|---|---|
| EXRDY<br>EXRDYA | B<br>T | EISA Bus Ready. It is sampled on the falling edge of BCLKIN when CMD# is active if EX16# or EX32# is also active and used to insert wait-states. Connected to EXRDY of the EISA connectors. |
| MSBURST#<br>MSBURSTA# | B<br>T | Master Burst Capability. This is an output for Host master cycles to indicate to the slave device that the CPU can provide burst cycles. For DMA cycles, this signal is asserted if SLBURST# is active (ie: the EBC will burst if the slave supports it). MSBURST# becomes an input and is sampled by the EBC to terminate EISA CMD# at the end of Burst EISA transfers. Connected to MSBURST# of the EISA Connectors. |
| SLBURST#<br>SLBURSTA# | B<br>T | Slave Burst Capability. SLBURST# is sampled during DMA (burst) master cycles. It is driven active for EISA/DMA cycles if HLOCM# is active (ie: local memory can burst to the EISA bus). Connected to SLBURST# of the EISA connectors. |
| EX32#<br>EX32A# | B<br>T | 32-bit EISA Capability. . The EBC samples EX32# to determine whether a slave supports 32-bit transfers for Host EISA cycles. The EBC drives EX32# low during EISA master cycles based on HLOCM# (ie: local memory supports 32-bit transfers across the EISA bus). Connected to EX32# of the EISA connectors |
| EX16#<br>EX16A# | B<br>T | 16-bit EISA Capability. The EBC samples EX16# to determine whether a slave supporst 16-bit transfers for Host EISA cycles. The EBC drives this line low on the BCLKIN falling edge at the end of assembly/disassembly cycles for 16-bit EISA masters. Connected to EX16# of the EISA connectors. |

Clocks

| Name | Direction | Description |
|---|---|---|
| CLKIN | I | Clock Input. Master single-phase CPU clock driven from an external clock-generator circuit. For 486 systems, this is the same as the CPU clock. For 386 systems, this is the single-phase version of the CPU CLK2 (half the frequency of the CPU clock). |
| SPEED(1:0)# | I | CPU Speed. These two pins indicate the CPU frequency as follows:<br>SPEED(1:0)#    FREQUENCY (Maximum)<br>11                       25 MHz<br>10                       33 MHz<br>01                       40 MHz<br>00                       50 MHz |
| BCLKOUT | O | Bus Clock Output. This BCLK output of the EBC is connected to an external buffer which drives the EISA connectors, ISP and MCC for non-20 MHz systems (20 MHz systems require an external, asynchronous BCLKOUT). The EBC derives this signal by appropriately dividing CLKIN based on the SPEED(1:0)# strapping inputs to generate a frequency of approximately 8 MHz. BCLKOUT can be stretched at the beginning of Host Master cycles when START# is asserted by enabling the Asynchronous BCLK stretch option in Reg C11h<2>. |
| BCLKIN | I | EISA Bus Clock Input. This input directly samples BCLK from the EISA bus connectors and is used to internally sample and drive all EISA/ISA synchronous signals. |
| BCLK15 | I | Bus Clock delayed by 15ns. Delayed version of BCLKIN from the external delay line. |
| BCLK30 | I | Bus Clock delayed by 30ns. Delayed version of BCLKIN from the external delay line. |
| CLKKB | O | Keyboard Clock X1. Drives the 8042/8742 XTAL1. Unstretched 8/10 MHz signal generated by dividing CLKIN. |
| CLKKB# | O | Keyboard Clock X2. Drives the 8042/8742 XTAL2. Unstretched 8/10 MHz signal generated by dividing CLKIN. |

Reset Control

| Name | Direction | Description |
|---|---|---|
| PWRGD | I | Power Good. Connected to PWRGD from the Power Supply. This is used to indicate that the supply voltage has stabilized at an acceptable level and when low, it forces RST#, RSTCPU and RST387 active. |
| RESETSW# | I | Reset Switch. Connected to an external reset switch. This is used to force RST#, RSTCPU and RST387 |

TABLE III-continued

Host Bus Interface

| Name | Direction | Description |
|------|-----------|-------------|
| | | active. |
| ARMRC# | I | Arm the Reset CPU Logic. This is used by the EBC to arm the logic that generates the RSTCPU signal upon the detection of the next halt cycle. Connected to ARMRC# from the DBC. |
| RST# | O | System Reset. Drives the reset signal, RST#, to the ISP, MCC, DSC and 8042. It is asserted whenever PWRGD or RESETSW# go low and is de-asserted at the same time as RSTCPU. |
| RSTCPU | O | CPU Reset. The EBC drives a reset signal to the host CPU for the following conditions: when RST# is active, when a host master shutdown cycle is decoded, or when ARMRC# was previously asserted and a halt cycle is decoded. RSTCPU is active for a minimum of 64 CLKINs and its trailing edge is synchronized with CLKIN's falling edge. |
| RST387 | O | 387 Reset. This signal goes active with RST# as well as when NPCS#, IOWC# and SA0 are asserted (I/O write to port F1). It is connected to the reset input of the 80387. |
| MDLE(2:0)# | O | Memory Data Latch Enable. These signals are normally inactive. For Host/EISA/DMA master reads, MDLE(2:0)# are active at the same time as CMD#. For EISA/DMA master writes to host devices, MDLE(2:0)# are active from the BCLKIN falling edge during START# until the BCLKIN falling edge after CMD# goes inactive. For ISA master writes, these signals remain active for the duration of MWTC# or from the time IOWC# goes active until the BCLKIN falling edge following IOWC# inactive. In all these cases, MDLE(2:0) are selectively disabled depending upon the master data width, the byte accessed (based on SBE(3:0)#, SA(1:0) or SBHE#), and whether it is a local slave. Connected MDLE(2:0)# of the DBC. |
| MDHDOE1# | O | Memory Data to Host Data Output Enable. This normally inactive signal, goes active as soon as a Host master read cycle from a EISA/ISA slave is detected, and remains active until the end of the cycle (determined by HRDYO# and DRDY). Connected to MDHDOE1# of the DBC. |
| LDMDOE# | O | Local Data to Memory Data Output Enable. This is a normally inactive signal. For EISA/DMA read assembly cycles, it goes active on the BCLK30 rising edge after the last CMD# goes inactive. For EISA/DMA write disassembly cycles, it goes active at the BCLK15 rising edge and remains active until the BCLKIN falling edge after the last CMD# goes inactive. Connected to LDMDOE# of the DBC. |
| MDSDOE2# MDSDOE1# MDSDOE0# | O | Memory Data to System Data Output Enables. MDSDOE2# controls SD(31:16), MDSDOE1# controls SD(15:8) and MDSDOE0# controls SD(7:0). Connected to T/R# input of the transceivers between the SD and MD busses. |
| SDOE(2:0) | O | System Data Output Enables. SDOE2# controls SD(31:16), SDOE1# controls SD(15:8) and SDOE0# controls SD(7:0). Connected to OE# of the transceivers between the SD and MD busses. |
| CPYO1# | O | Copy 01. This is enabled for 8-bit ISA slaves if SA0 is 1 for 16-bit masters or if SA(1:0) is 01b for 32-bit masters. It is also enabled for 8-bit non-compatible DMA is SA0 is 1 for 16-bit memory or if SA(1:0) is 01b for 32-bit memory. Connected to OE# of the transceiver between SD(7:0) & SD(15:8). |
| CPY02# | O | Copy 02. This is enabled for 8/16-bit slaves accessed by 32 bit masters if SA(1:0) is 10b. It is also enabled for 32-bit slave access by 16-bit masters or 8-bit non-compatible DMA when SA(1:0) is 10b. Connected to OE# of the transceiver between SD(7:0) & SD(23:16). |
| CPY03# | O | Copy 03. This is enabled for 8-bit ISA slave access by 32-bit masters and for 32-bit EISA slave access by 8-bit non-compatible DMA when SA(1:0) is 11b. Connected to OE# of the tranceiver between SD(7:0) & SD(31:24). |
| CPY13# | O | Copy 13. This is enabled for 16-bit slaves accessed by 32 bit masters when SA1,SBHE# is 10b. It is also enabled for 32-bit slave accesses from 16-bit masters when SA1,SBHE# is 10b. Connected to OE# of the |

TABLE III-continued

| Host Bus Interface | | |
|---|---|---|
| Name | Direction | Description |
| | | transceiver between SD(15:*) & SD(31:16). |
| CPYUP | O | Copy Up. This normally ghigh signal goes low during reads when the master (I/O for DMA) width is less than the slave width and during writes when the master (I/O for DMA) width is greater than the slave width. Connected to the direction control of the SD transceivers. |
| Address Control | | |
| ISAMSTR# | O | ISA Master. This is active during EMSTR16# or REFRESH. Connected to OE# of the buffer driving LA(16:2) from SA(16:2). |
| ISAMSTR | O | ISA Master. Connected to OE# of the latch driving SA(19:2) from LA(19:2). This is the active high version of ISAMSTR#. ISAMSTR and ISAMSTR# are also used to control the T/R# of the transceiver that drives MRDC#, MWTC#, IORC#, IOWC#, SA(1:0) and SBHE#. |
| HALAOE# | O | HA bus to LA bus Output Enable. This normally active signal is inactive when REFRESH# is active. It is also inactive when DHOLD is inactive and HHLDA is active. Connected to OE# of the F640/F245 transceivers between LA(31:2) and HA(15:2). |
| LAHARD | O | LA bus to HA bus Read. This signal sets the direction between the LA bus and the HA bus. Connected to DIR of the F640/F245 transceivers between HA(31:21,19:16) and LA(31:24)#, LA(23:21,19:16). |
| LASALE# | O | LA Synchronous Address Latch Enable This signal is the active low version of BALE. It is connected to the corresponding pin of the DBC and LE# of the latch driving SA(16:2) from LA(16:2). |
| AENLE# | O | AEN Latch Enable. For Host /EISA masters, this normally active signal goes high for accesses to ISA I/O at the BCLKIN rising edge when CMD# goes active. It is connected to AENLE# of the DBC. |
| HBE(3:0) | B | Host Byte Enables. The EBC drives these signals during EISA/ISA/DMA master cycles (from SBE(3:0)#) and ISA master cycles from SA(1:0) and SBHE#). They are inputs during Host master cycles and are connected to Host CPU BE(3:0)#. |
| SBE(3:0)# | B | System Byte Enables. The EBC drives these signals |
| SBE(3:0)A# | T | during Host master cycles (based on HBE(3:0)# and HKEN#), during ISA master cycles (from SA(1:0) and SBHE#) and from an internal counter during assembly/disassembly cycles. Connected to BE(3:0)# of the EISA connectors. |
| SA(1:0) | B | Systesm Address 0 and 1. The EBC drives these lines for Host master cycles (based on HBE(3:0)# and HKEN#), for EISA/DMA/Refresh master cycles (based on SBE(3:0)# and from an internal counter for assembly/disassembly cycles). They are connected to SA(1:0) of the EISA connectors through a 74F245 transceiver. |
| SBHE# | B | System Byte High Enable. The EBC drives this line for Host master cycles (based on HBE(3:0)# and KEN#), for EISA/DMA/Refresh master cycles (based on SBE(3:0)# and from an internal counter during assembly/disassembly instructions). Connected to SBHE# of the EISA connectors through a 74F245 transceiver. |
| HA20 | B | Host Address 20. The Host master drives this signal into the EBC except during EISA/ISA master cycles when it is based on LA20. HA20 is connected to Host CPU A20. |
| A20M# | I | Address A20 Mask. For 386 systems, this is an input from the MCC's A20M# pin and is used to mask Host address A20. For 486 systems, the CPU takes care of the masking (it receives A20M# directly from the MCC) so this pin must be tied high. |
| LA20 | B | LA Bus Address A20. The EBC drives this line for |
| LA20A | T | Host master and DMA cycles (from HA20 & A20M#). It is an input for EISA/ISA master cycles. Connected to LA20 of the EISA connectors. |
| Register Access | | |
| NPCS# | I | Numeric Coprocessor Chip Select. Chip select decode for numeric coprocessor access. Active when SA(15:3) decodes to 111X0XXXb and AEN# is inactive. The EBC internally qualifies this during I/O |

TABLE III-continued

| Host Bus Interface Name | Direction | Description |
|---|---|---|
| | | cycles in its coprocessor/387RESET logic. Connected to NPCS# from the DSC. |
| EBCCS# | I | EBC Chip Select. Active for EBC Internal regisiter access. This signal goes active when SA(15:2) decodes to C10:C13h and AEN# is inactive. It is connected to EBCCS# from the DBC. |
| XD(3:0) | B | XD Bus Low Nibble. These four bits provide data to/from the EBC during its internal register access. They are connected to XD(3:0) of the ISP. |

The ISP 221 is an integrated system peripheral chip which integrates two timers, EISA NMI/Time-out logic, two modified 8259-type interrupt controllers, the EISA DMA/Refresh :controller, and the EISA system arbiter. It also integrates the logic required to create the local peripheral bus (XD-bus 219) by providing internal buffering between SD(7:0) on EISA bus 202 and XD(7:0). Also, data read from internal ISP 221 registers is presented directly on the SD bus. Other features of the ISP 221 are not important to an understanding of the invention. Table IV describes the signal connections to the ISP 221.

TABLE IV

| Bus Interface | | |
|---|---|---|
| HA(31:16) | O | Host Address Bus. Driven during DMA with memory address. Connected to Host CPU A(31:16). |
| IA(15:8) | B | Intermediate Address Bus. Driven during DMA/Refresh with memory address. Connected to LA(15:8) of the EISA connectors thru a transceiver. |
| LA(7:2) | B | EISA Latched Address Bus. Driven during DMA/Refresh with memory address. Connected to LA(7:2) of the EISA connectors. |
| LASALE# | I | LA Bus to SA Bus Latch Enable. Latch enable control for LA-SA buffer. Connected to LASALE# from the EBC. |
| IALAOE | O | IA Bus to LA Bus Output Enable. Direction control for IA-LA transceiver. It is connected to an external transceiver. |
| SBE(3:0)# | B | System Byte Enables. These are sampled/used in the same way as IA(15:8). Connected to SBE(3:0)# of the EISA connectors. |
| HW/R# | O | Host Write / Read. Driven during DMA indicating data direction to memory. Connected to Host CPU W/R#. |
| START# | I | START. Used to Start an EISA cycle. Connected to START# of the EISA connectors. |
| IORC# | I | I/O Read Command. Used to read ISP internal registers onto the SD bus. Connected to IORC# of the EISA connectors. |
| IOWC# | I | I/O Write Command. Used to write to the ISP internal registers. Connected to IOWC# of the EISA connectors. |
| SD(7:0) | B | System Data Bus. Data lines used for programming the ISP and for buffering XD(7:0). Connected to XD(7:0) of DBC. |
| XD(7:0) | B | Peripheral Data Bus. Data lines that connect to SD(7:0) thru the integrated transceiver. These lines are driven when XDEN# is active and XDRD# inactive. Connected to XD(7:0) |
| XDEN# | I | XD Bus Enable. Enables the XD output buffer. Connected to XDEN# from the DSC |
| XDRD# | I | XD Bus Read. Controls the direction of data on the XD bus. Connected to XDRD# from the DSC. |
| ST(3:0) | B | Inter-Chip Status Bus. Connected to ST(3:0) of the EBC. During DMA/Refresh, the ISP drives these lines.<br>a) ST(3:2) encodes the DMA requester width as follows:<br>    ST(3:2) REQUESTER WIDTH<br>      00    8-bit<br>      01    16-bit<br>      10    32-bit<br>      11    idle<br>(b) ST(1:0) encodes the DMA cycle timing as follows:<br>    ST(1:0) CYCLE TIMING<br>      00    Compatible<br>      01    Type-A<br>      10    Type-B<br>      11    Burst (only for 16/32bit) |
| DRDY | B | DMA Ready. The EBC drives this line during DMA or Refresh. Connected to DRDY of the EBC. |

TABLE IV-continued

| | | |
|---|---|---|
| BCLK | I | EISA Bus Clock. Connected to BCLK of the EISA connectors. |
| Timer | | |
| OSC | I | Timer Oscillator. This is the main clock used by the internal 8254 timers. Connected to 14.31818 MHz oscillator. |
| SPKR | O | Speaker Tone. Used to drive the system-board speaker. This signal is derived from the Timer-0 Counter-2 and a Port-B bit. |
| SLOWH# | O | Slowdown Hold Request. Used to make the CPU appear to "slow down" shen necessary for compatibility reasons. Driven from the output of Timer-1 Counter-2. |
| NMI/Timeout logic | | |
| PARITY# | I | Parity Error Strobe. The falling edge of this signal indicates a host DRAM parity failure. Connected to PARITY# from the DSC. |
| IOCHK# | I | I/O Channel Check. An EISA/ISA device signals a fatal error by driving this line low. Connected to IOCHK# of the EISA connectors. |
| NMI | O | Non-Maskable-Interrupt. NMI is generated in response to PARITY#, IOCHK#, slave timeout, fail-safe timer timeout, EISA master timeout or I/O writes to port 462h. Connected to the host CPU's NMI pin. |
| RST# | I | Motherboard Reset. It is driven active when PWRGD or RESETSW# is low. Connected to RST# from the EBC. |
| CMD# | I | EISA Bus Command. This is used to generate a slave timeout. It is connected to CMD# of the EISA connectors. |
| RSTDRV | O | Reset Drive. This is driven active during RST# or due to a software-reset or slave/EISA-master timeout. Connected to RSTDRV of the EISA connectors. |
| Interrupt | | |
| IRQ(15:9) | I | Interrupt Request Bus. Connected to IRQ(15:14) of the EISA connectors, NPINT from the EBC and IRQ(12:9) of the EISA connectors. |
| IRQ8#/TSEL | I | Interrupt Request 8 or Test Mode Select. This pin normally functions as the IRQ8 input and is connected to IRQ# from the RTC. The second function of IRQ8#/TSEL is to force the ISP into test mode. The ISP will enter its tristate test mode when this pin is sampled high on the trailing edge of RST# AND GT16M#/TMOD# is sampaled low. |
| IRQ(7:3),1 | I | Interrupt Request Bus. Connected to IRQ(7:3) of EISA connectors and IRQ1 from the Keyboard Controller. |
| INT | I | Interrupt. Connected to Host-CPU INT. |
| DMA/Refresh | | |
| DRQ(7:5) DRQ(3:0) | I | DMA Request Bus. Connected to DRQ(7:5),(3:0) of the EISA connectors. |
| DACK(7:5) DACK(3:0) | O | DMA Acknowledge Bus. Connected to DACK(7:5),(3:0) of the EISA connectors. |
| REFRESH# | B | Refresh. Refresh is driven low for non ISA master refresh cycles to the EISA bus. It is used as an asynchronous input for ISA master generated refresh and for ST(3:0) and DRDY direction control. Connected to REFRESH# of the EISA connectors. |
| EOP | B | End-of-Process. As an output, it indicates that the DMA channel's word count has reached terminal count. As an input, it indicates that a DMA slave wishes to stop the a DMA transfer. Connected to TC of the EISA connectors. |
| AEN# | O | Address Enable. Indicates that an address is being driven by the DMA controller and is used for the I/O decode and slot-specific generation of AENx. Connected to the corresponding pin of the DBC. |
| I/O Decodes | | |
| RTCAS | O | Real Time Clock AS. Active for 2 BCLK's from the leading edge of CMD# if address 111 X XX0b is decoded from LA(15:2), SBE(3:0)# and AEN#. It remains active from RST# until the first CMD#. Connected to AS of the RTC. |
| GT16M#/TMOD# | B | Greater Than 16M or Test Mode. This pin has two functions. Normally, it is driven active during DMA cycles when an address greater than 16M is presented on HA(31:24). The second function of this pin is to allow the ISP to enter its test mode. If sampled low at the trailing edge of reset (RST#), along with IRQ8#/TSEL being high, then the ISP enters its Tristate test mode. This signal is tristated |

TABLE IV-continued

| | | |
|---|---|---|
| | | during RST# and a weak internal pull-up keeps it high when no outside tester or source is driving it. |
| System Arbiter | | |
| MREQ(6:1)# | I | Slot Specific EISA Master Bus Request. Each slot provides an EISA bus master to have its own bus request line. Connected slot-specific MREQx# of the EISA connectors. |
| MACK(6:1)# | O | Slot Specific EISA Master Bus Request Acknowledge. Connected to slot-specific MACKx# of the EISA connectors. |
| CPUMISS# | I | CPU Miss. This signal tells the arbiter that the host CPU is waiting for the bus. This signal is asynchronous with BCLK. Connected to CPUMISS# from the EBC. |
| DHOLD | O | DMA Hold. This is a request for the Host and EISA bus, generated when the arbiter wants to transfer control to an EISA/ISA/DMA master. Connected to DHOLD of the EBC. |
| REFRQ | O | Refresh Request. . This is a request for the EISA bus, generated when the arbiter wants to transfer control to the Refresh controller. Connected to REFRQ of the EBC & MCC |
| RDHLDA | I | Refresh/DMA Hold Acknowledge. This is the acknowledgement to DHOLD or REFRQ, indicating that the requested bus/busses i/are free. RDHLDA's leading edge is asynchronous and the trailing edge is caused combinatorially from DHOLD or REFRQ. Connected to RDHLDA from the EBC. |
| EXMASTER# | O | EISA Master. This indicates that an EISA master is in control of the Host/EISA bus. Connected to EXMASTER# of the EBC. |
| EMSTR16# | O | ISA Master. This indicates that an ISA master is in control of the Host/EISA bus. Connected to EMSTR16# of the EBC and the MCC. |

The DBC 216 performs various steering logic and control/decode functions. It integrates data buffers and provides data buffer control, XD 219 bus control, AEN generation, parity generation/checking logic, decode logic for an external keyboard controller, real time clock control, system configuration RAM control as well as EISA ID register support and general purpose chip selects.

The DBC 216 performs data bus conversion when a system master accesses 8, 16, or 32-bit devices through 16-bit or 32-bit instructions. The DBC 216 also handles DMA and EISA bus master cycles that transfer data between local DRAM or cache memory and locations on the EISA bus 202. The DBC receives data buffer control signals from the EBC 220 and the ISP 221. It generates XD bus control signals XDEN# and XDRD#.

The DBC 216 also generates chip select signals for the keyboard controller, real time clock chip, configuration non-volatile-memory (NVM) and the configuration registers in EBC 220. It also generates control logic based on address decoding for numeric coprocessor error clearing, the EISA ID register, the real time clock chip, configuration NVM and Fast CPU warm resets. Other features of the DBC 216 are not important for an understanding of the invention and will not be described here. The external pin connections for DBC 216 are set forth in Table V.

TABLE V

| | | |
|---|---|---|
| Data Bus Interface | | |
| HD(31:0) | B | Host Data Bus. 32-bit local host bus connected to Host CPU D(31:0) |
| MD(31:0) | B | Memory Data Bus. 32-bit local DRAM data bus connected to DRAMs. |
| XD(7:0) | B | Motherboard Peripheral Data Bus. This 8-bit data bus supports motherboard I/O functions. It is connected to the ISP, MCC, 8042, RTC, Configuration RAM and BIOS ROM |
| Data Buffer Control | | |
| MDHDCLK | I | MD to HD Control Clock. The rising edge of this signal is used to clock data from the memory data bus (MD(31:0)) and the memory parity bus (MP(3:0)) into DSC's internal flip-flops. It is connected to MDHDCLK from the MCC. |
| MDLE(2:0)# | I | Memory Data Bus Latch Enables. These latch enables allows the DBC to sample data on the MD bus on a byte-by-byte basis. They are used for all EISA/ISA/DMA master writes and read assembly cycles. MDLE0# controls byte-lane 0, MDLE1# controls byte-lane 1 and MDLE2# controls byte-lane 3. Byte-lane 2 is enabled when MDLE2# is active AND SA(1:0) does NOT equal 11b. These signals are connected from the EBC's MDLE(2:0)# output pins. |
| MDHDOE1# MDHDOE0# | I | Memory Data to Host Data Output Enables. Both of these signals are normally inactive. When |

TABLE V-continued

| | | |
|---|---|---|
| | | MDHDOE0# is active, data from the MD bus flip-flops are driven onto the HD bus. When MDHDOE1# is active, data from the MD bus latches are driven onto the HD bus. MDHDOE0# is connected to MDHDOE# from the MCC while MDHDOE1# is connected to MDHDOE# from the EBC. |
| LDMDOE# | I | Latched Data to Memory Data Output Enable. When this signal goes active, data from the MD-bus latches are driven back onto the MD bus. LDMDOE# is connected to EBC. |
| HDMDLE# | I | Host Data to Memory Data Latch Enable. This signal enables data from the HD bus to the DBC's internal latches. It is connected to HDMDLE# from the MCC. |
| HDMDOE# | I | Host Data to Memory Data Output Enable. This signal enables data from the HD bus latches to the MD bus (MD(31:0)) and also enables the internally generated parity information onto the MP bus (MP(3:0)). It is connected to HDMDOE# from the MCC. |
| ROMCS# | I | ROM Chip Select. This input is used to qualify XDEN# and XDRD. It is connected to ROMCS0# from the MCC. |
| MRDC# | I | ISA Memory Read Command. This input is used to help decode and generate the XDRD# signal when ROMCS# is active. It is connected to MRDC# of the EISA bus. |
| RDHLDA | I | Refresh/DMA Hold Acknowledge. This input is used to qualify XDEN# and XDRD# during INTA cycles and manufacturer specific I/O decodes. It is connected to RDHLDA from the EBC. |
| ST2 | I | Inter-Chip Status bit-2. Connected to ST2 from the EBC. |
| XDEN# | O | X-Bus Data Enable. This control signal enables the transceiver between XD(7:0) and SD(7:0). |
| XDRD# | O | X-Bus Data Read. This control signal sets the direction of the transceiver from XD(7:0) to SD(7:0). |
| Parity and Control | | |
| MP(3:0) | B | Memory Parity Bus. 4-bit bus (one bit per byte) connected to DRAM parity bits. |
| PAREN# | I | Parity Enable. PAREN# provides the timing for generating PARITY# in the event of a parity failure. It is connected to PAREN# of the MCC. |
| PARITY# | O | Parity Error. This signal goes active if during a parity failure if parity is enabled (PAREN#). It is connected to PARITY# of the ISP. |
| I/O Address and Control | | |
| LA(15:2) | I | EISA/ISA Latched Address Bus. This bus is used for AEN(8:1) generation and other I/O decodes. Connected to LA(15:2) of the EISA connectors. |
| SM/IO# | I | EISA System Memory/IO. Used for AEN(8:1) decoding only. It is connected to SM/IO# of the EISA connectors. |
| SA(1:0) | I | EISA System Address Bus bits (1:0). These two low order address bits are used for I/O decodes and also to enable the proper byte-lane latches on the MD bus. Connected to SA(1:0) of the EISA connectors. |
| AENLE# | I | AEN Latch Enable. The low to high transition of this input latches the current state of AEN(8:1) and all I/O chip-select outputs. It is connected to AENLE# from the EBC. |
| LASALE# | I | LA Bus Latch Enable. The low to high transition of this input signal altches the current state of I/O decodes from the LA bus. It is connected to LASALE# from the EBC. |
| IORC# | I | EISA I/O Read Command. This input is used to generate RTCRD# and XDRD# as well as to enable internal register data onto the XD bus. It is connected to IORC# of the EISA connectors. |
| IOWC# | I | EISA I/O Write Command. This input is used to generate KBDWR#, RSTNERR#, NPRST# and to write to the internal configuration registers. It is connected to IOWC# of the EISA connectors. |
| AEN# | I | Address Enable. AEN indicates that the current address is being driven by the DMA controller. It is used to qualify AEN(8:1) as well as other I/O decodes. |
| RST# | I | Motherboard Reset. This reset input is active when powergrood (PWRGD) is low or when the reset switch is active (RESETSW#). It is connected to RST# from EBC and is used to reset the motherboard peripherals. |

TABLE V-continued

| Fast CPU Reset Control | | |
|---|---|---|
| ARMRC# | O | Arm CPU Reset. The DBC snoops accesses to I/O port 0110 X1X0b (64h) and generates ARMRC# if an F0h is written to this location. Warm reset cycle times are greatly reduced through this emulation. This signal is connected to ARMRC# input of the EBC where it is processed to create the CPURST signal. |
| I/O decode | | |
| AEN(8:1) | O | Slot Specific AEN Bus. Each EISA slot receives a unique AEN signal to indicate whether it can respond to addresses and I/O commands on the EISA bus. Each signal is connected to its corresponding slot-specific AENx on the EISA connectors. |
| CRAMOE#/ CRAMCS# | O | CMOS RAM Control. This signal is active when 08XXh is decoded from LA(15:8) and drives the output enable of the DS1488 and the chip enable (CE#) of the battery-backed CMOS SRAM. |
| KBDCS#/ TMOD# | B | Keyboard Chip Select or Test Mode. This pin has two functions. Normally, it serves as the keyboard chip select output which goes active when address 0110 XXX0b is decoded from LA bus and SA bus addresses. It is connected to the CS# input of the keyboard controller. The second function of this pin is to allow the DBC to enter it's test mode. If this signal is low on the trailing edge of RST# and PORT7/TSEL is high, then the DBC enters it Tristate Test mode. A weak internal pull-up on this signal keeps it high during RST# if no outside tester/source is driving it. |
| KBDWR# | O | Keyboard Write. KBDWR# goes active with IOWC# except when ARMRC# goes active. It is connected WR# of 8042/8742. |
| NPCS# | O | Numeric Coprocessor Chip Select. This output is used by the EBC in it coprocessore qualification logic. It is active for LA(15:3) decodes in the range of 111X 0XXXb when AEN# is inactive. It is connected to NPCS# of the EBC. |
| RTCDS# | O | Real Time Clock Select. This output is active when IORC# or IOWC# is active and 0111 XXX1b is decoded from LA and SA addresses. It is connected to the DS Input of the real time clock. |
| RTCWR# | O | Real Time Clock Read/Write. This signal is active when IOWC# is active and 0111 XXX1b is decoded from LA and SA addresses. It is connected to R/W# of the RTC. |
| EBCCS# | O | EBC Chip Select. This output goes active when the I/O address range (C10:C1F)h is decoded from LA(15:2) and AEN#. The EBC uses this signal as a chip select to qualify access to its internal configuration registers. It is connected to EBCCS# of the EBC. |
| IOCS0# | O | General purpose ISA I/O chip select 0. This pin can decode an I/O block of 1-128 byte located at any multiple of the block size. The address comaprison for IOCS0# is done with internal registers at I/O address (C03:C02)h. Additionally, when configuration register C06h<6:0> is set, the corresponding address bits of SA(6:0) are masked in the decoding. Configuration register C06h<7> determines whether XDEN# is active for this chip select (the default state is off for XDEN#). This output defaults to a one byte decode at I/O address 0. |
| IOCS1# | O | General purpose ISA I/O chip select 1. This pin can decode an I/O block of 1-128 bytes located at any multiple of the block size. The address comparison for IOCS0# is done with internal registers at I/O address (C05:C04)h. Additionally, when configuration register C07h<6:0> is set, the corresponding address bits of SA(6:0) are masked in the decoding. Configuration register C07h<7> determines whether XDEN# is active for this chip select (the default state is off for XDEN#). This output defaults to a 128 byte decode at I/O address 0. |
| Port Control | | |
| PORT0/TSEL | B | Port 0 or Test Mode Select. This pin functions as either a parallel I/O port or a test mode select input. When configuration register C00h<6> =0 (default, DS1488 support mode), this becomes a general purpose I/O port written and read at address C00h<0>. This bit is an input if C00h<4> =0 always an output and is connected to A11 of the |

TABLE V-continued

| | | |
|---|---|---|
| | | SRAM. PORT0/TSEL must be high on the trailing edge of RST# (and KBDCS#/TMOD# must be low) for the chip to enter its tristate test mode. This test mode forces all outputs and bi-directional pins into a tristate configuration. |
| AS1#/PORT1 | O | Address Strobe 1 or Port1. In DS1488 support mode, AS1# is connected to the corresponding AS1# pin of the DS1488 real time clock. In battery-backed SRAM mode, PORT1 is connected to A9 of the battery-backed CMOS SRAM. |
| AS0#/PORT2 | O | Address Strobe 0 or Port2. In DS1488 support mode, AS0# is connected to the corresponding AS0# pin of the DS1488 Real time clock. In battery-backed SRAM mode, PORT2 is connected to A10 of the battery-backed CMOS SRAM. |
| CRAMWE#/ PORT3 | O | CMOS RAM Write Enable or PORT3. In DS1488 support mode, CRAMWE# is connected to the WE# pin of the DS1488 real time clock. In battery-backed SRAM mode, PORT3 is connected to A11 of battery-backed CMOS SRAM. |

The Chipset in the system of FIG. 2 operates in response to a plurality of command and configuration registers which may be written to or read from by the CPU 212. These registers are directly addressable in the I/O address space. The actual method and circuitry for writing values to these registers is conventional and need not be described here. Most values are written once during the system power-on sequence in response to instructions in system BIOS ROM 222 (FIG. 2). The fields of the registers also are mostly not important to an understanding of the invention and may be determined from the above-mentioned OPTi databook. The EBC 220 has two register fields which are relevant, and these are described below in Table VI.

1 or pin 3, is connected to the input of a buffer 318, the output of which is connected to provide the EISA BCLK signal. Accordingly, by jumpering pins 1 and 2 of jumper block 314, the BCLK signal derives from oscillator 316 which is independent of, and asynchronous with, oscillator 302. Alternatively, by jumpering pins 2 and 3 of jumper block 314, the EISA BLK derives from BCLKOUT line 312 of EBC 220, which is generated synchronously with the oscillator 302.

Pin 2 of jumper block 314 is also connected to the input of a buffer 320, the output of which is connected to the BCLK input of MCC 213, to the BCLKIN of EBC 220, and to the BCLK input of ISP 221. The output of buffer 320 is also connected to the input of a

TABLE VI

| | | |
|---|---|---|
| EBC Control Register, IO Addr C11h, bit 2 | Asynchronous START#. If enabled, the leading edge of START# occurs with the CLKIN signal and BCLKOUT is stretched to provide the required width of START# | 1 = enable BCLKOUT stretching<br>0 = disable BCLKOUT stretching |
| EBC Revison-Number Register, IO Addr C13h, bits 3:2 | Reflects the configuration of the speed strapping option pins SPEED(1.0)# (read only) | 11 = 25 MHz<br>10 = 35 MHz<br>01 = 40 MHz<br>00 = 50 MHz |

Clock Organization

Figure 1:
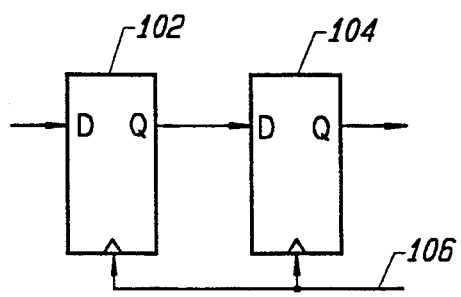
FIG. 1 is a logic diagram of a signal synchronizer.
Figure 3:
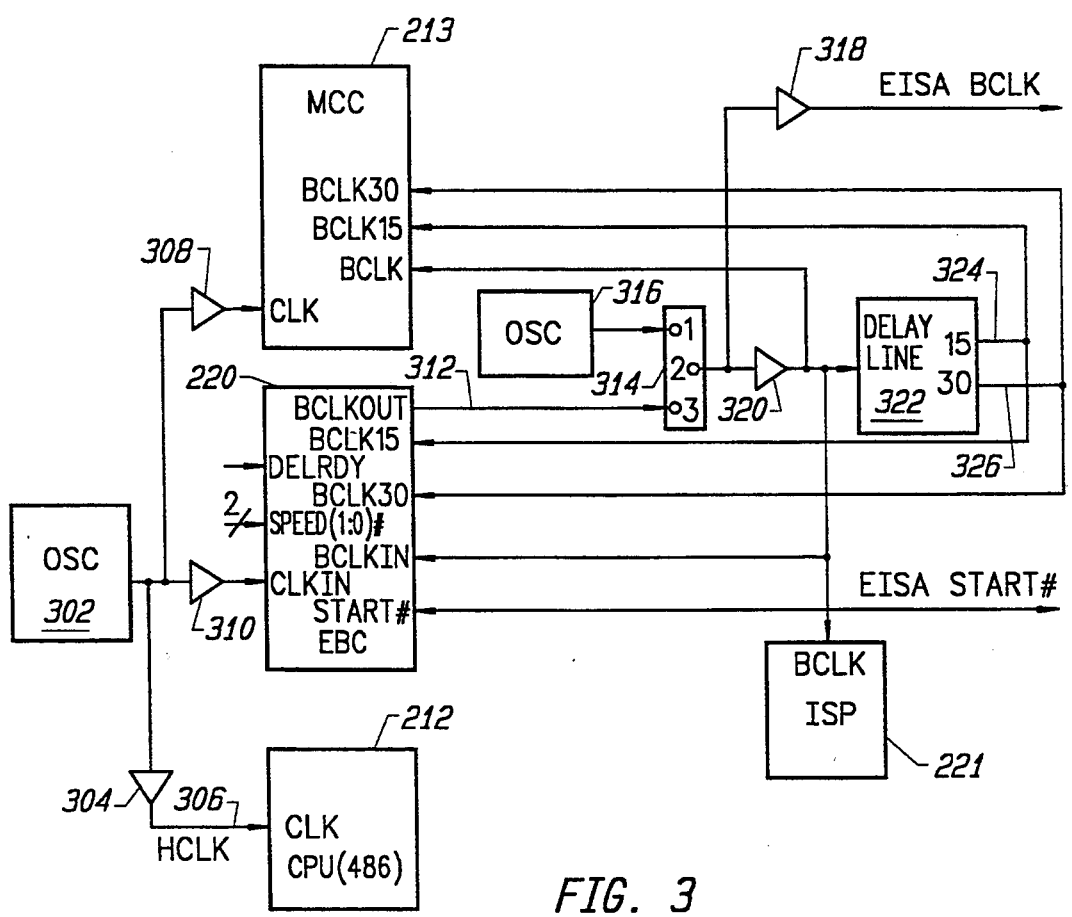
FIG. 3 is a simplified diagram of a clock generation and distribution scheme which may be used in the computer system of FIG. 2.

FIG. 3 depicts one arrangement of the significant clock signals in a computer system such as that shown in FIG. 2. It comprises an oscillator 302, which typically operates at 20, 25, 33, 40 or 50 MHz. The output of oscillator 302 is connected to the input of a driver 304, the output of which is connected to the host bus 201 CLK line 306. The host bus CLK line 306 is connected to the CLK input of the CPU 212 which, in the case of the embodiment of FIG. 3, is a 486-compatible CPU. The output of oscillator 302 is also connected via another buffer 308 to the CLK input of MCC 213, and through another buffer 310 to the CLKIN input of EBC 220.

The EBC 220 has a pair of input strapping pins SPEED(1:0)# which, as indicated in Table III above, specifies a frequency division for the generation of a synchronous BCLK output signal on the BCLKOUT lead 312 of EBC 220. The BCLKOUT line 312 is connected to pin 3 (also called lead 3) of a jumper block 314, pin 1 of which is connected to the output of an independent oscillator 316. Pin 2 of the jumper block 314, which by a jumper can be connected either to pin delay line 322, which may be a DS1005-75, manufactured by Dallas Semiconductor, Dallas, Tex. Two of the outputs 324 and 326 of the delay line 322 provide versions of the input signal delayed by 15 and 30 nS, respectively. The 15 nS delayed output 324 is connected to the BCLK15 inputs of the MCC 213 and EBC 220, and the 30 nS delayed output 326 is connected to the BCLK 30 inputs of MCC 213 and EBC 220. These signals are used internally by the MCC 213 and EBC 220 for purposes not important to an understanding of the invention.

It can be seen that the clock scheme of FIG. 3 permits the use of any frequency host clock signal (HCLK) up to 50 MHz by inserting an appropriate oscillator 302. The SPEED(1:0)# pins of EBC 220 should be strapped according to Table II to indicate a CLKIN frequency which is at least as high as the actual HCLK frequency. Furthermore, through the use of jumper block 314, the BCLK signal can be selected as the BCLKOUT output 312, which is synchronous with HCLK, or the output of oscillator 316, which is asynchronous with HCLK. Other clock configurations can also be used.

Generation of Host Bus READY# Signal

It will now be described how the invention is implemented in the system of FIG. 2 to generate the host bus HREADY# signal in response to termination of the EISA bus CMD# signal at the end of an EISA read or write cycle. Two primary aspects of the invention are illustrated: synchronization of a destination bus signal based on a predictor signal where the predictor signal is generated asynchronously with the clock on the destination bus, and the insertion of a delay of a number of destination bus clock edges which depends on the indicated frequency of the destination clock signal. Other aspects are also illustrated.

Figure 4:
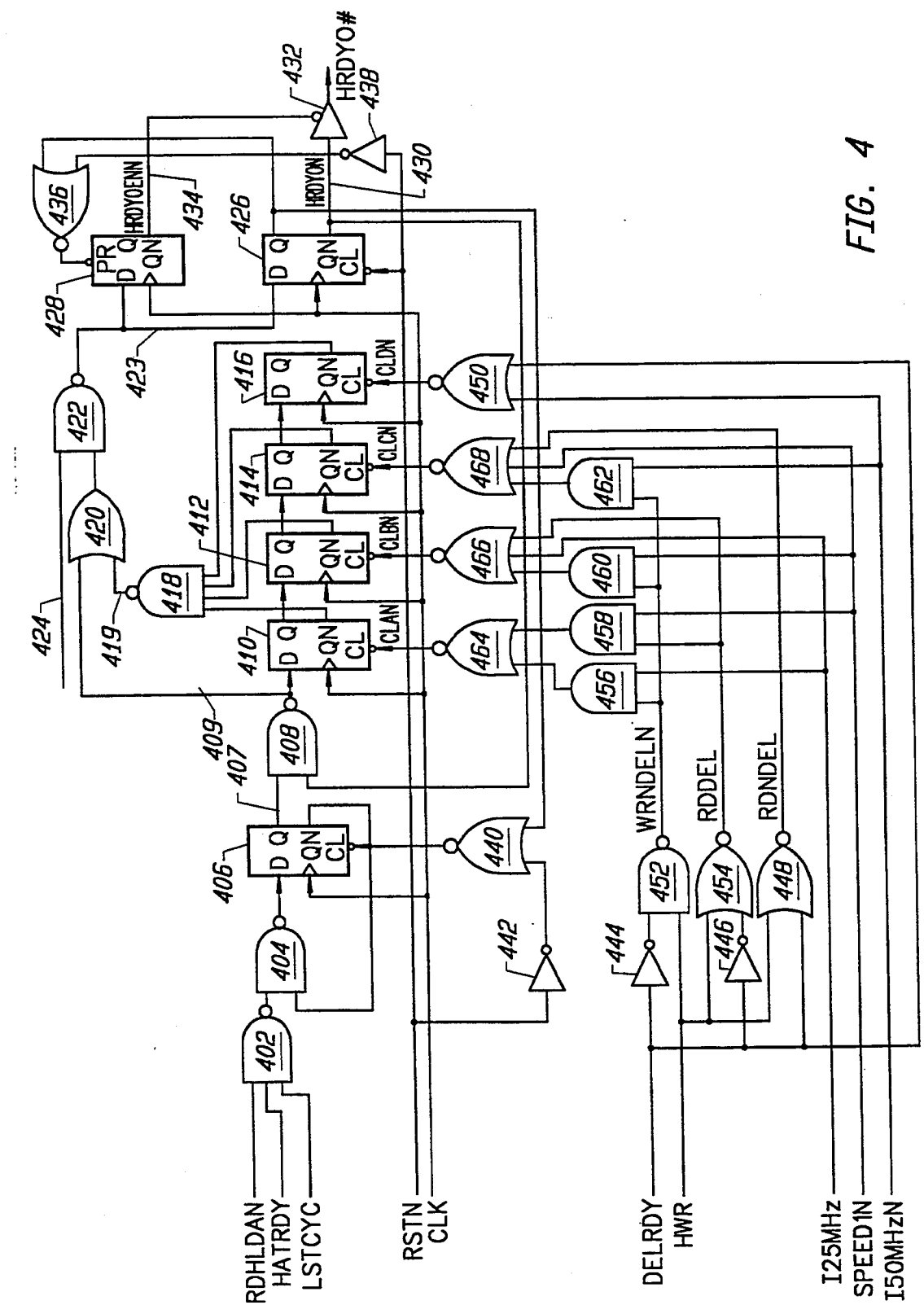
FIG. 4 is a logic diagram of circuitry in the EBC of FIG. 2 which generates a host bus signal HRDYO# at a desired time relative to an I/O bus CMD# signal.

FIG. 4 is a logic diagram of circuitry in EBC 220 which generates the host bus 201 HREADY# signal in response to CMD# as described above. This line is identified in the drawings as the HRDYO# output of EBC 220 (FIGS. 3, 4), and as the RDY# of CPU 212 (FIG. 3).

As shown in FIG. 4, the circuitry includes a 3-input NAND gate 402, the three inputs of which are connected to receive an RDHLDAN signal, an HATRDY signal, and a LSTCYC signal. The RDHLDAN signal indicates that the present cycle is issued by the CPU 212 rather than another master. For the purpose of the present description, it can be assumed to be high at all times relevant. HATRDY is generated by EBC circuitry (not shown) to provide an active high pulse which is half the period of the signal which the EBC 220 receives on its BCLKIN pin. HATRDY is a predictor signal generated in response to the EISA bus EXRDY signal active on a falling edge of BCLK after CMD# became active. The HATRDY signal goes high on the BCLKIN falling edge one-half BCLKIN cycle before the BCLKIN rising edge on which the EISA bus CMD# signal goes high. The LSTCYC signal is an active high signal generated by EBC circuitry (not shown) which indicates that the present EISA bus cycle is the last EISA bus cycle to be performed in response to the access which was requested by the CPU 212. As mentioned above, part of the task of the chipset in the system of FIG. 2 is to perform CPU-requested accesses to EISA slaves which do not have the same data output width as that expected by the CPU. In such situations, the chipset may need to perform several EISA bus cycles to accomplish the CPU-requested access, before the result is returned over the host bus 201 to the CPU 212. The LSTCYC signal shown in FIG. 4 merely indicates that the present EISA bus cycle is the last cycle which is required to complete the access requested by CPU 212.

The output of NAND gate 402 is connected to a first input of 2-input NAND gate 404, the output of which is connected to the D input of a D flip-flop 406. The QN output of flip-flop 406 is connected back to the second input of NAND gate 404. The Q output of flip-flop 406 is connected to a first input of a NAND gate 408, the output of which is connected to the D input of another flip-flop 410. The Q output of flip-flop 410 is connected to the D input of a D flip-flop 412, the Q output of which is connected to the D input of another flip-flop 414, the Q output of which is connected to the D input of yet another D flip-flop 416. The QN outputs of flip-flops 410, 412, 414 and 416 are each connected to a respective input of a 4-input NAND gate 418, the output of which is connected to the first input of 2-input OR gate 420. The second input of 2-input OR gate 420 is connected to receive the output of NAND gate 408.

The output of OR gate 420 is connected to a first input of a 2-input NAND gate 422, the output of which indicates that HRDYO# should be activated. The second input of NAND gate 422 receives on a line 424 a signal from other possible sources of a READY indication which are not relevant to an understanding of the invention. The output of NAND gate 422 is connected to the D input of each of two flip-flops 426 and 428. The QN output of flip-flop 426 forms an HRDYON signal on a line 430, which is connected to the input of a 3-state buffer 432. The QN output of flip-flop 428 forms an HRDYOENN signal on line 434, which is connected to the active low enable input of buffer 432. The output of buffer 432 is coupled to the HRDYO# output of EBC 220.

In addition to being connected to the input of buffer 432, the HRDYON signal on line 430 is also connected back to the second input of NAND gate 408. The Q output of flip-flop 426 is connected to one input of a NOR gate 436, the output of which is connected to an inverting preset input of flip-flop 428. The other input of NOR gate 436 is connected to receive the output of an invertor 438, the input of which is connected to receive an RSTN signal, which is generated by EBC 220 circuitry (not shown) in response to various indicators that the chipset should be reset. The Q output of flip-flop 426 is also connected to one input of a NOR gate 440, the other input of which is connected to receive the output of an invertor 442. The input of invertor 442 is connected to receive the active low RSTN signal. RSTN is also connected to the inverting CLEAR input of flip-flop 426. The clock inputs of flip-flops 406, 410, 412, 414, 416, 426 and 428 are all connected to receive the CLK signal, which is derived from and operates at the same frequency as the signal on the CLKIN pin of EBC 220. The CLK signal is essentially the same as the HCLK signal on line 306 (FIG. 3) on the host bus 201 (FIG. 2).

The circuitry of FIG. 4 further responds to a DELRDY signal, which derives from the external strapping pin DELRDY on the EBC 220. When this pin is tied low externally to the EBC 220, it indicates that HRDYO# should occur at the time that the CPU should terminate the cycle. When the pin is tied high, it indicates that HRDYO# should occur one CLKIN cycle earlier when possible. When DELRDY is tied high, the HRDYO# output of the EBC 220 is similar, but not identical, to the "early READY" output of the Intel 82350 chipset described above.

The circuitry of FIG. 4 is further responsive to an HWR signal, which derives from the signal on the EBC 220 HW/R# input pin. This signal indicates whether a current cycle being requested on the host bus 201 is a read or write cycle, and as shown on FIG. 3, is connected the W/R# output of CPU 212. Although not shown and not important to the invention, the HW/R# input pin of EBC 220 can also be connected to an output of ISP 221. HWR is high to indicate a write access and low to indicate a read access.

The circuitry of FIG. 4 is further responsive to an I25MHZ signal, an I50MHZN signal, and a SPEED1N signal, all of which are decodes from the EBC 220 SPEED(1:0)# strapping pins. SPEED1N, when high, indicates that CLKIN is operating at 25 or 33 MHz, and when low, indicates that CLKIN is operating at 40 or 50 MHz. I25MHZ indicates 25 MHz CLKIN operation, and I50MHZN indicates all strapping options except that for 50 MHz.

The DELRDY signal is connected the input of each of two invertors 444 and 446, as well as to a first input of each of two NOR gates 448 and 450. The outputs of invertors 444 and 446 are connected to respective first inputs of a NAND gate 452 and a NOR gate of 454. The second inputs of both NAND gate 452 and NOR gate 454 are connected to the HWR line, which is also connected to the second input of NOR gate 448. The output of NAND gate 452 forms a WRNDELN signal, which is low only when the current access is a write access and the DELRDY pin is strapped for standard ready indication. The output of NOR gate 454 forms an RDDEL signal, which is high only when the current access is a read access and the DELRDY pin is strapped for early ready indication. The output of NOR gate 448 forms an RDNDEL signal which is high only when a read access is being performed and DELRDY is strapped for standard ready indications.

The WRNDELN line is connected to first inputs of respective AND gates 456, 460 and 462. The second input of AND gate 456 is connected to the I25MHZ signal, and the second input of AND 460 is connected to the SPEED1N signal. The second input of AND gate 462 is connected to the I50MHZN signal.

The RDDEL signal is connected to the first input of an AND gate 458, the second input of which is connected to the SPEED1N line. The outputs of AND gates 456 and 458 are both connected to respective inputs of 2-input NOR gate 464. The output of AND gate 460 is connected to a first input of a 3-input NOR gate 466, and the output of AND gate 462 is connected to a first input of a 3-input NOR gate 468. The second input of NOR gate 466 is connected to the I25MHZ signal, and the third input of NOR gate 466 is connected to the RDDEL signal. The second input of NOR gate 468 is connected to the SPEED1N signal, and the third input of NOR gate 468 is connected to the RDNDEL signal. The second input of NOR gate 450 is connected to the I50MHZN signal. The outputs of NOR gates 464, 466, 468 and 450 are connected to respective inverting clear inputs of D flip-flops 410, 412, 414 and 416.

Before describing the operation of the circuit of FIG. 4, note that the inverting clear inputs of flip-flops 410, 412, 414 and 416 are essentially static signals determined by the external strapping of the EBC 220 DELRDY pin and SPEED(1:0)# pins, and change only in response to the host bus 201 HW/R# signal. Table VII indicates the resulting levels of these clear signals for all combinations of these input values. For convenience, the signals connected to the inverting clear inputs of flip-flops 410, 412, 414 and 416 have been designated respectively CLAN, CLBN, CLCN and CLDN.

TABLE VII

| CLKIN FREQ. (from SPEED(1:0)# | DELRDY | HW/R# | CLAN | CLBN | CLCN | CLDN |
|---|---|---|---|---|---|---|
| 50 MHz (00) | standard (0) | read (0) | 1 | 1 | 0 | 1 |
| 50 MHz (00) | standard (0) | write (1) | 1 | 1 | 1 | 1 |
| 50 MHz (00) | early (1) | read (0) | 1 | 0 | 1 | 0 |
| 50 MHz (00) | early (1) | write (1) | 1 | 1 | 1 | 0 |
| 40 MHz (01) | standard (0) | read (0) | 1 | 1 | 0 | 0 |
| 40 MHz (01) | standard (0) | write (1) | 1 | 1 | 1 | 0 |
| 40 MHz (01) | early (1) | read (0) | 1 | 0 | 0 | 0 |
| 40 MHz (01) | early (1) | write (1) | 1 | 1 | 0 | 0 |
| 33 MHz (10) | standard (0) | read (0) | 1 | 0 | 0 | 0 |
| 33 MHz (10) | standard (0) | write (1) | 1 | 1 | 0 | 0 |
| 33 MHz (10) | early (1) | read (0) | 0 | 0 | 0 | 0 |
| 33 MHz (10) | early (1) | write (1) | 1 | 0 | 0 | 0 |
| 25 MHz (11) | standard (0) | read (0) | 0 | 0 | 0 | 0 |
| 25 MHz (11) | standard (0) | write (1) | 1 | 0 | 0 | 0 |
| 25 MHz (11) | early (1) | read (0) | 0 | 0 | 0 | 0 |
| 25 MHz (11) | early (1) | write (1) | 0 | 0 | 0 | 0 |

As can be seen, flip-flop 416 will be allowed to operate only for write accesses with a 50 MHz CLKIN when standard ready is selected. CLDN=1 for standard ready read accesses as well at 50 MHz, but this signal is essentially a "don't-care". As can be seen, the fact that flip-flop 414 is constantly cleared by CLCN=0 means that a logic 1 will never be clocked into flip-flop 416. In all situations other than standard ready accesses at 50 MHz CLKIN, flip-flop 416 will remain constantly cleared, forcing its QN output high. Similarly, flip-flop 414 will be allowed to operate only for write operations at CLKIN=50 MHz, and for standard ready write operations at CLKIN=40 MHz. As in the above-described situation, flip-flop 414 will be allowed to operate as well for early ready read operations at 50 MHz, but this is a "don't care" since flip-flop 412 will be constantly cleared (CLBN=0). Flip-flop 412 will be allowed to operate for all standard ready cycles at CLKIN=40 or 50 MHz, for all early-ready writes at 40 or 50 MHz, and for standard-ready writes at 33 MHz, and flip-flop 410 will be permitted to operate in all situations except early-ready reads at 33 or 25 MHz, early-ready writes at 25 MHz, and standard-ready reads at 25 MHz.

The operation of the circuit of FIG. 4 will be described with reference to the timing diagram of FIGS. 5A–5C. The timing diagram of FIG. 5A assumes CLK operates at 33 MHz (and the SPEED(1:0)# straps so indicate), and that the BCLK operates at 8.33 MHz. The circuit of FIG. 4 will function correctly whether BCLK is generated synchronously or asynchronously with CLK, as long as the actual CLK frequency is at least four times the actual the BCLK frequency.

Figure 5A:
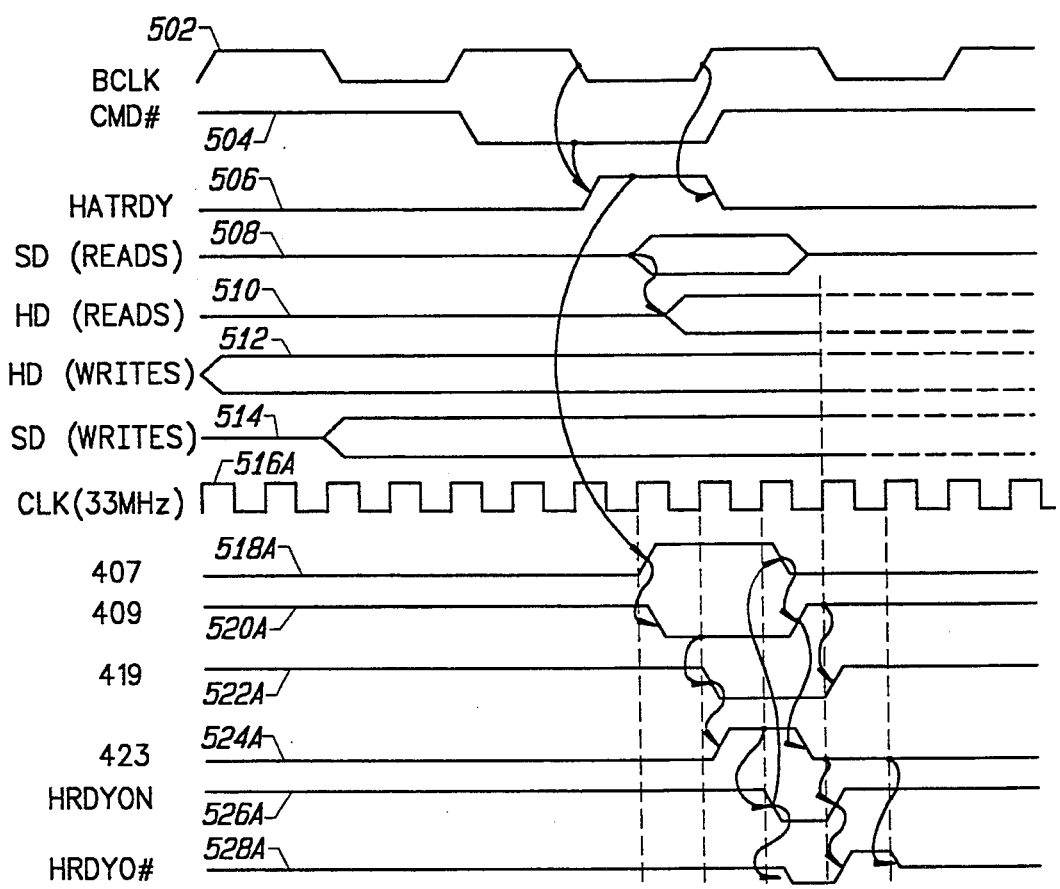
FIGS. 5A, 5B and 5C are timing diagrams illustrating the operation of the circuit of FIG. 4.
Figure 5B:
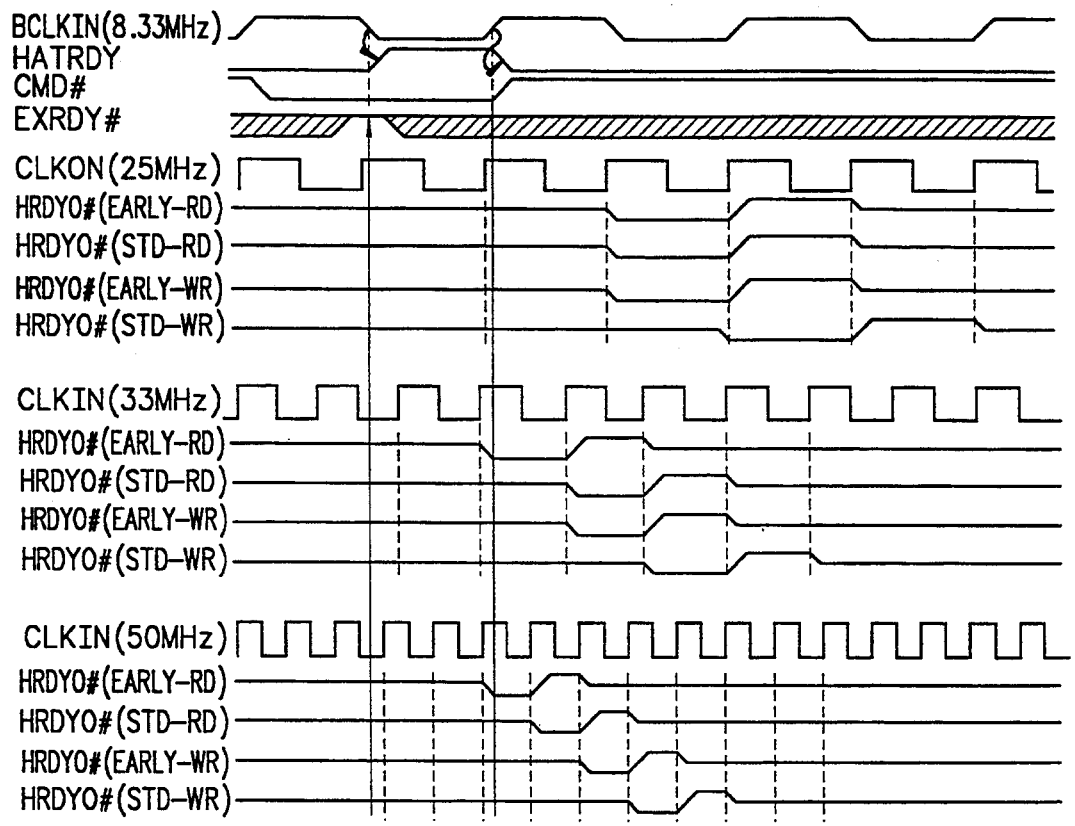
Figure 5C:
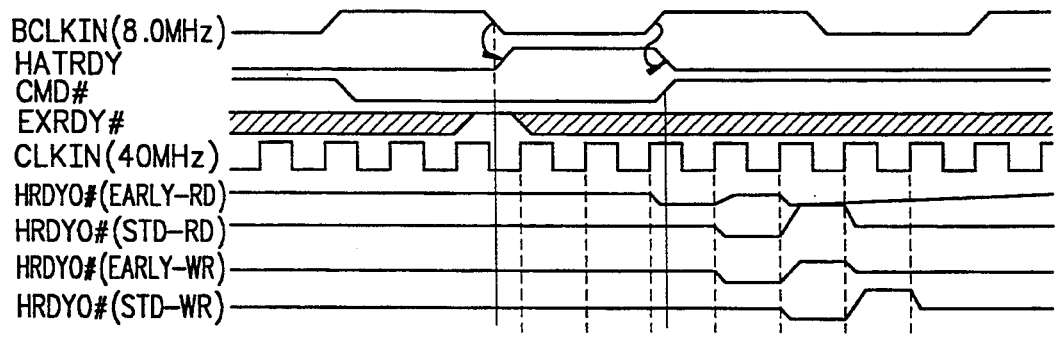

In FIG. 5A, waveform 502 shows the BCLK signal and waveform 504 shows the CMD# signal generated by EBC 220. Waveform 508 indicates, for a read cycle, when the data on the EISA bus SD lines 207 is valid, and waveform 510 indicates when that same data has been buffered onto the host bus HD lines 204. As can be seen, the read data on the SD lines 207 is valid from a time prior to the CMD# rising edge which ends the EISA cycle, to a time shortly thereafter. The read data becomes valid on the HD lines 204 shortly after it is valid on the SD lines 207. It is latched in the chipset and allowed to go invalid shortly after the end of HRDYO#. The CPU 212 will sample the data on HD in response to the occurrence of a CLK rising edge while the HRDYO# signal generated by EBC 220 is active (low). Accordingly, if the external DELRDY strap indicates that standard ready is desired, the circuitry of FIG. 4 will generate the EBC 220 HRDYO# output synchronously with CLK, such that it is active during a rising edge of CLK as soon as possible following deactivation of CMD#. For most CLKINs, that will be the first CLK rising edge following deactivation of CMD#. Some systems include an external one-CLKIN delay between the HRDYO# output of EBC 220 and the RDY# input of the CPU 212, and the early ready strapping option of DELRDY is provided to improve the performance of such systems. Accordingly, if DELRDY is tied high, the circuitry of FIG. 4 will, whenever possible without risking metastability, activate the HRDYO# output of EBC 220 synchronously with the CLK signal one CLK cycle prior to that in which it would be active under the standard ready option.

For writes, waveform 512 indicates when the host bus HD lines contain valid data during the write cycle. Valid data begins shortly after the end of ADS# (not shown) and is held by the CPU until after it samples its RDY# input active on a CLK rising edge. As shown in waveform 514, the write data becomes active on the EISA bus SD lines some time during the BCLK cycle prior to activation of CMD#, and remains valid until after the BCLK falling edge which follows the end of HRDYO#. An EISA bus slave device can sample the SD data in response to the CMD# rising edge, and so the EBC 220 will activate HRDYO# as soon as possible following the end of CMD# while still guaranteeing a minimum time period of 25 nS after the withdrawal of CMD# for the EISA slave device to latch the SD data. And if DELRDY is tied high, the circuitry of FIG. 4 will, whenever possible without risking metastability, activate the HRDYO# output of EBC 220 synchronously with the immediately prior CLK signal.

Referring to FIG. 4, no activity takes place in the circuit unless the present EISA cycle is the last EISA cycle required to satisfy the current CPU access request (LSTCYC=1). In addition, no activity takes place unless the current EISA cycle is responsive to an access requested by the CPU 212 rather than another master. For the purpose of the present description, it can be assumed that the latter condition is indicated by HATRDY going high for one-half BCLK cycle while RDHLDAN is steadily high.

HATRDY is a predictor signal which goes high one-half BCLK cycle prior to the termination of CMD#. It is generated synchronously with BCLKIN by means in the EBC 220 not shown. Generally, as shown in waveforms 502, 504 and 506 of FIG. 5A, it is activated in response to a falling edge of BCLK while CMD# is low and the EXRDY input is high for EISA cycles. Although not relevant to the present EISA cycle description, the EBC circuitry will also activate HATRDY at the end of an ISA read cycle in response to CMD# and CHRDY both sampled active on a BCLK falling edge after the minimum CMD# width is satisfied, and also in response to NOWS#, CMD# and CHRDY all sampled active on a BCLK falling edge whether or not the minimum CMD# width has been satisfied.) HATRDY returns inactive on the BCLK rising edge on which CMD# returns inactive.

In any event, when HATRDY goes high, NAND gate 402 produces a low output signal for one-half BCLK period. Regardless of the value on the other input of NAND gate 404, this forces a logic 1 on the output of NAND gate 404 and the D input of flip-flop 406. This value is clocked into flip-flop 406 in response to the next rising .edge of CLK, which is the first rising edge of CLK following HATRDY active. This is shown in the waveform 581A of FIG. 5A, depicting the waveform on line 407 of FIG. 4. The clocking of a 1 into flip-flop 406 also causes the QN output of flip-flop 406 to generate a 0, which forces NAND gate 404 to continue providing a logic 1 value to the D input of flip-flop 406 at all times thereafter until flip-flop 406 is cleared, regardless of any change in RDHLDAN, HATRDY or LSTCYC.

The QN output of flip-flop 426 (HRDYON) is high at this time, so the 1 on line 407 causes the output line 409 of the NAND gate 408 to go low as shown in waveform 520A in FIG. 5A. Prior to this time, the value on line 409 was high, forcing the output of OR gate 420 to be high, thereby permitting the output 423 of NAND gate 422 to respond exclusively to any other ready indicators provided on line 424. Since the signal on line 409 is now low, the output 423 of NAND gate 422 will now also respond to the output 419 of 4-input NAND gate 418.

Assuming first that the current access is a read access and standard ready is desired, then referring to Table VII, it can be seen that all the flip-flops 412, 414 and 416 are continuously being cleared during this cycle whereas flip-flop 410 is permitted to vary. The QN outputs of flip-flops 412, 414 and 416 are therefore all high. The QN output of flip-flop 410 is low at this point, however, since all the recent CLK pulses clocked a logic 1 into flip-flop 410 from line 409. The output 419 of NAND gate 418 at this time therefore remains high as shown in waveform 522A of FIG. 5A. Similarly, the output of OR gate 420 is high and assuming that the other ready indicators are providing an inactive (high) level on line 424, the output 423 of NAND gate 422 is low as shown in waveform 524A of FIG. 5A.

In response to the next CLK rising edge (the second rising edge following HATRDY active), flip-flop 410 loads in the logic 0 from line 409 and thereby outputs a 1 on its QN output. This causes the output 419 of NAND gate 418 to go low, thus bringing the output of OR gate 420 low and the output 423 of NAND gate 422 high. Accordingly, in response to the third rising edge of CLK following HATRDY, flip-flops 426 and 428 each load in a logic 1. Both the HRDYON signal on line 430 and the HRDYOENN signal on line 434 therefore go low in response to such CLK edge. As indicated in waveform 528A in FIG. 5A, this results in buffer 432 becoming enabled and providing a logic low on the HRDYO# output pin of EBC 220. This occurs on the first CLK rising edge after the rising edge of CMD#. Additionally at this time, when HRDYON goes low, the Q output of flip-flop 426 goes high forcing NOR gate 436 to output a logic 0 and thereby maintain, via the preset input of flip-flop 428, the logic 1 in flip-flop 428.

The logic 1 on the Q output of flip-flop 426 also forces a 0 on the output of NOR gate 440, immediately clearing flip-flop 406. Accordingly, just after HRDYON goes low, the value on line 407 also returns low as indicated in FIG. 5A. Both the low value on line 407 and the low value on HRDYON line 430 cause the output 409 of NAND gate 408 to go high as indicated in FIG. 5, which in turn permits the output 423 of NAND gate 422 to return low. In response to the next rising edge of CLK, which is the fourth rising edge following HATRDY and the second following withdrawal of CMD#, the logic 0 on line 423 is loaded into flip-flop 426 thereby bringing HRDYON high. The logic 0 on line 423 is not at this time loaded into flip-flop 428, since the preset input to that flip-flop is still being activated by the Q output of flip-flop 426. 3-state buffer 432 therefore remains enabled and drives a logic 1 onto the HRDYO# output pin of EBC 220 as shown in waveform 528A of FIG. 5A. The Q output of flip-flop 426 is no longer presetting flip-flop 428 when the fifth rising edge of CLK following HATRDY arrives, so the logic 0 on line 423 is loaded into flip-flop 428 at that time. This brings HRDYOENN line 434 high, and disables 3-state buffer 432 as shown in FIG. 5A. The one CLK-cycle during which buffer 432 drives a logic 1 onto the host bus ready line helps the CPU 212 establish the logic 1 quickly after the termination of the HRDYO# signal.

It can be seen that for a 33 MHz CLK, standard-ready read cycle, the HRDYO# output pin of EBC 220 goes low at the time of the time of the first CLK rising edge following the termination of CMD#. Additionally, synchronization was achieved with low risk of metastability, since the BCLK-synchronous signal, HATRDY, passed through three series flip-flops 406, 410 and 426, all clocked by the host bus 201 CLK signal, before the host bus HRDYO# signal was generated.

At a higher CLK frequency than 33 MHz, it can be appreciated that the HRDYO# signal will be delayed by a larger number of CLK cycles in order for HRDYO# to occur after withdrawal of CMD#. Not only does this ensure accurate timing of HRDYO#, it also counters the increased probability of metastability which would be expected at higher frequencies, by delaying HRDYO# by a greater number of synchronization CLK edges. Similarly, for a 25 MHz CLK, it may be that a delay of a fewer number of CLK cycles will cause HRDYO# to occur after withdrawal of CMD#. Further, where DELRDY has been strapped to request early ready indications, a delay of a fewer number of CLK pulses is appropriate, and where the access is a write access rather than a read access, a delay of a larger number of CLK cycles is appropriate to ensure sufficient hold time of the write data on the EISA bus following withdrawal of CMD#.

All of these conditions are tabulated in Table VII above. By an analysis similar to that set forth above with respect to FIG. 5A, it will be seen that under the conditions for which Table VII generates a logic 0 on CLAN (the clear input of flip-flop 410), the output 419 of NAND gate 418 will remain constantly low, causing the output 423 of NAND gate 422 to respond always to the output 409 of NAND gate 408 (assuming an inactive high level on line 424 from other ready sources). Thus the HATRDY signal is delayed by only two flip-flops 406 and 426 (and two CLK rising edges) before HRDYO# is generated synchronously with a CLK rising edge. Similarly, for those conditions for which Table VII indicates that CLAN and CLBN are high and CLCN is low, the HATRDY signal will pass through four flip-flops 406, 410, 412 and 426 (and four CLK rising edges) before HRDYO# is generated synchronously with CLK. Similarly, in the conditions for which Table VII indicates that CLAN, CLBN and CLCN are high and CLDN is low, HATRDY will pass through five flip-flops 406, 410, 412, 414 and 426 (and five CLK rising edges) before HRDYO# is generated synchronously with a CLK rising edge, and for those conditions under which Table VII indicates that CLAN, CLBN, CLCN and CLDN are all high, HATRDY will pass through six flip-flops 406, 410, 412, 414, 416 and 426 (and six CLK rising edges) before HRDYO# will be generated synchronously with a CLK rising edge. The resulting HRDYO# output waveforms relative to withdrawal of CMD# are shown in FIGS. 5B and 5C.

It can be seen that the circuit of FIG. 4 provides an HRDYO# output signal which is synchronous with the host bus 201 CLK signal, and which, for standard ready strapping, occurs as soon as possible after the withdrawal of CMD#. Additionally, where possible, if DELRDY is strapped to indicate early ready signals, HRDYO# will occur one CLK cycle earlier. The circuit will operate correctly where BCLK is generated completely asynchronously with the host bus 201 CLK signal, thereby eliminating any timing restriction which BCLK must meet following a CLK edge. Additionally, since the circuit uses the predictor signal HATRDY, which is known to occur no more than a certain number of CLK cycles prior to termination of CMD# (depending on the SPEED(1:0)# strapping option), the synchronization process required to minimize any possibility of metastability occurs concurrently with the prediction time. This permits the circuit to generate HRDYO# promptly when desired, rather than having to wait for the synchronization process to complete after the asynchronous CMD# signal occurs.

It will be understood that if desired for a particular application, the number of the CLK cycles to delay the CLK-synchronized output signal may be set in response to the CLK frequency with a granularity of one-half the CLK cycle rather than one full CLK cycle as in the embodiment of FIG. 4. A one-half CLK cycle granularity can be implemented by, for example, providing and inverting clock input on one or more of the delay flip-flops. Additionally, it will be understood that if the CLK frequency is slow enough compared to the length of the metastability window of the particular flip-flops being used for synchronization, the minimum synchronization delay can be shortened to one CLK cycle instead of two by driving the two synchronization flip-flops such as 406 and 426 with opposite polarity clocks rather than with the same clock signal. Further, it will be understood that other means besides the strapping option pins SPEED(1:0)# can be used to indicate the frequency of CLK relative to BCLK; for example, such bits can be provided by a programmable register.

Generation of EISA Bus START# Signal

It will now be described how the invention is implemented in the system of FIG. 2 to generate the EISA bus START# signal in response to the host bus ADS# signal at the start of an EISA cycle. This portion of the apparatus illustrates how START# may be generated asynchronously to BCLK or synchronously to BCLK selectably by the user. If START# is generated asynchronously to BCLK, then the apparatus performs BCLK stretching to ensure that the trailing edge of START# occurs synchronously with a rising edge of BCLK; and if START# is to be generated synchronously with BCLK, then a synchronizing function is performed. In the latter case, an asynchronously generated BCLK can be accommodated. The selection of synchronous or asynchronous START# generation is made by the user via register address C11h bit 2 ("ASYSTREN").

Figure 6:
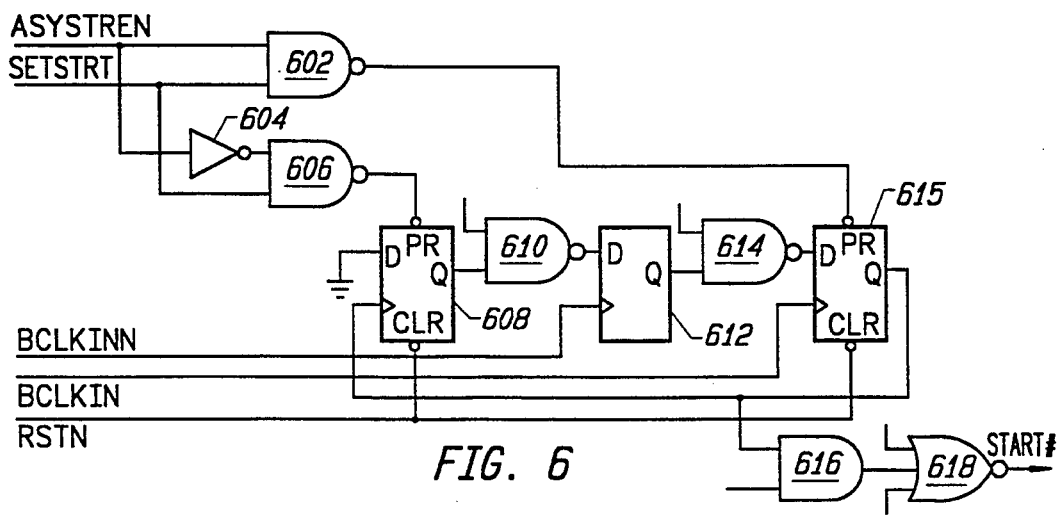
FIGS. 6, 7, 12 and 13 are logic diagrams of circuitry in the EBC of FIG. 2 for generating I/O bus START# signals and BCLK signals at desired times relative to host bus signals.
Figure 12:
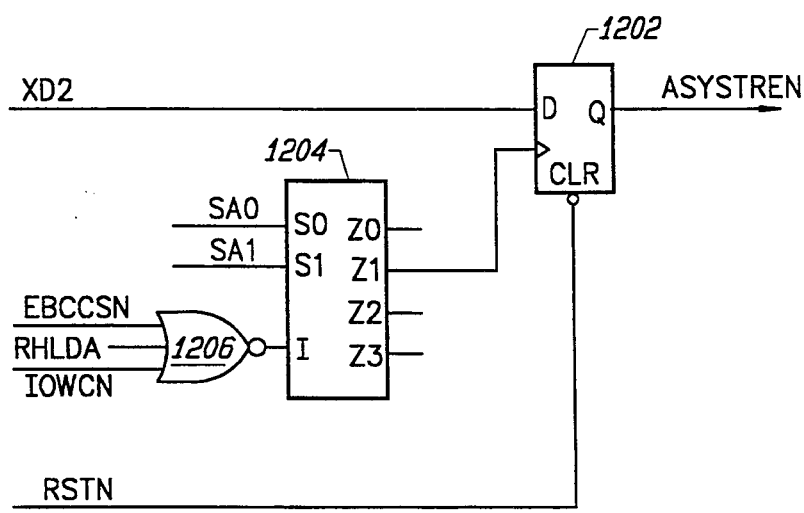
Figure 7:
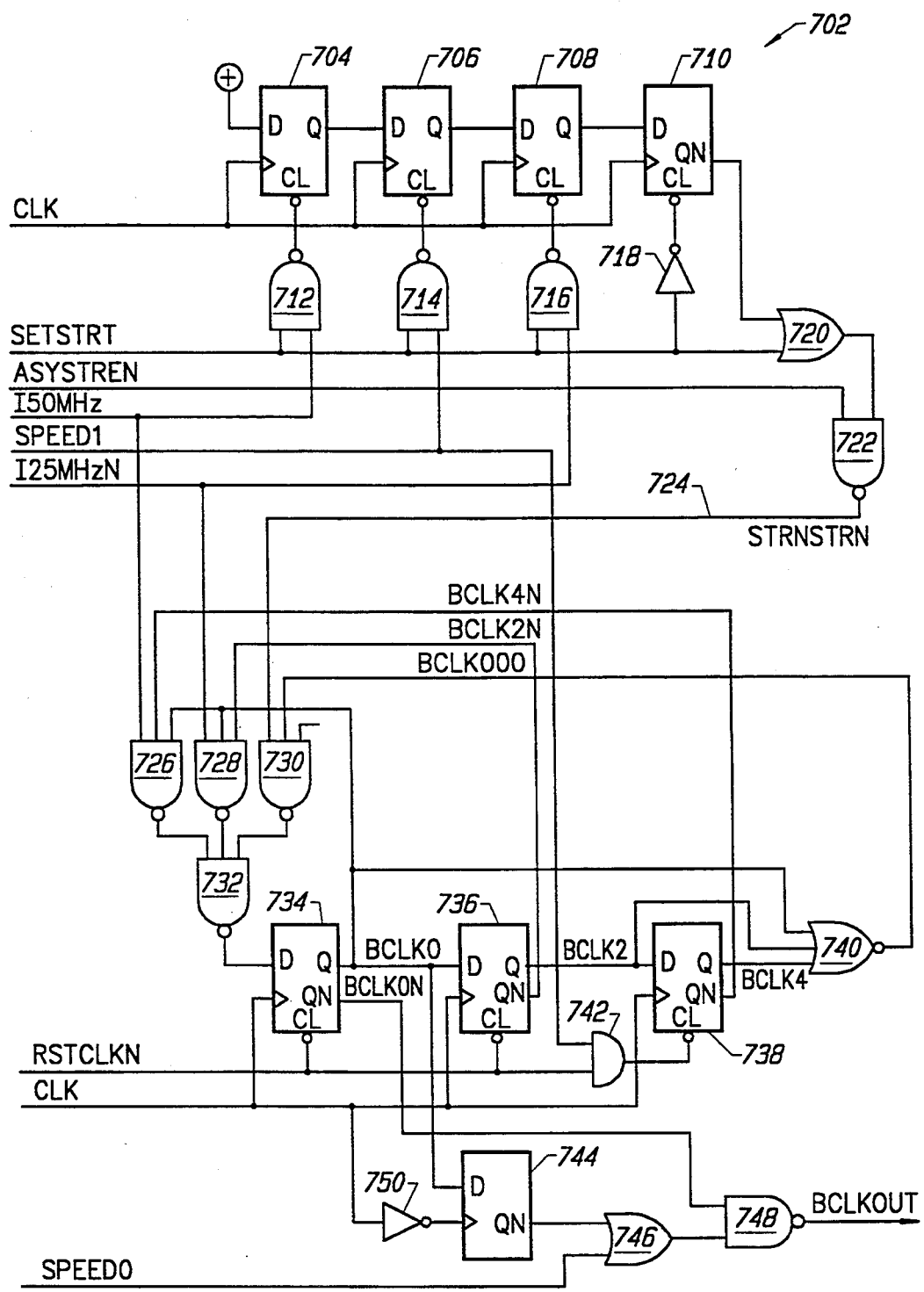
Figure 13:
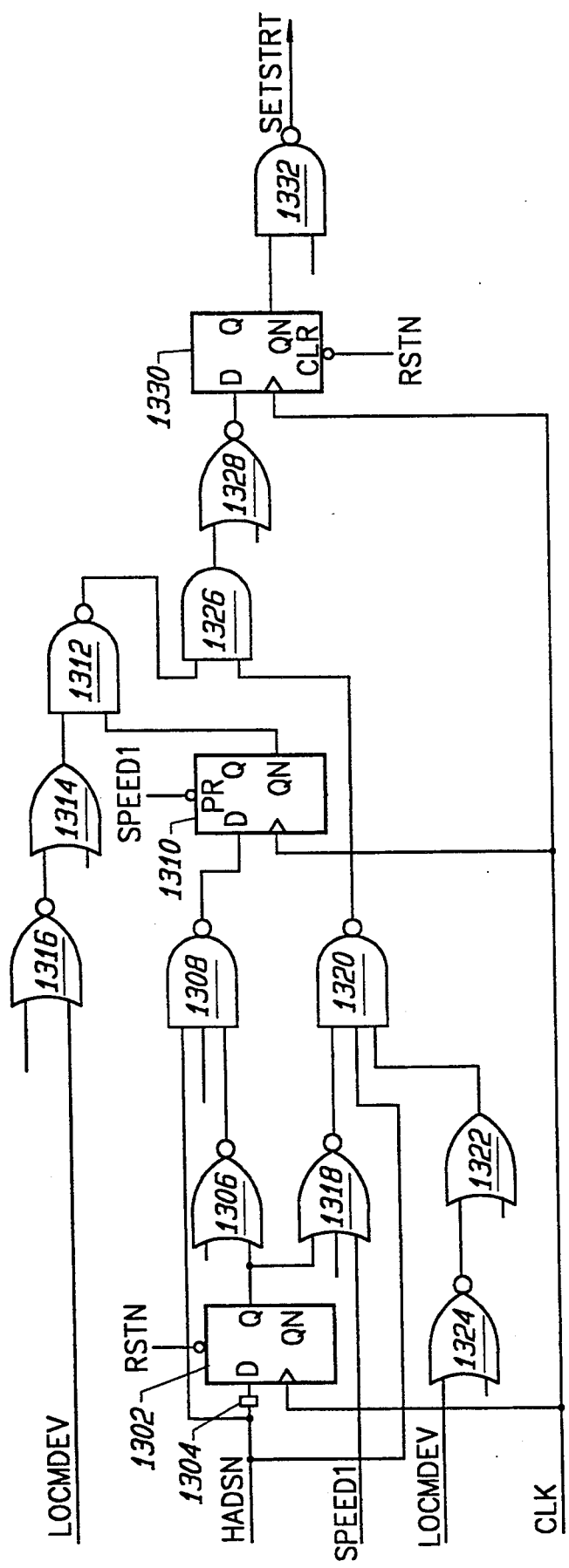

FIG. 6 is a logic diagram of a circuit in the EBC 220 which will generate the EISA bus START# signal at the beginning of an EISA cycle either synchronously or asynchronously to the BCLK at the option of the user. FIG. 7 is a logic diagram of the EBC 220 circuitry which generates the EBC 220 BCLKOUT output signal. FIG. 12 is a logic diagram of the circuit for loading the ASYSTREN register bit used in the circuits of FIGS. 6 and 7, and FIG. 13 is a logic diagram showing how the SETSTRT signal, used in FIGS. 6 and 7, is generated from the host bus HADS# signal. As will be seen, if START# is generated asynchronously to BCLK, the circuit of FIG. 7 will stretch the BCLK output to ensure that the timing specification for START# relative to BCLK is satisfied. If START# is generated synchronously to BCLK, then BCLKOUT is not stretched.

Referring to the circuit of FIG. 12, the ASYSTREN signal is stored in a flip-flop 1202. The D input to the flip-flop 1202 is connected to receive the XD2 data line from the external XD data bus 219 (FIG. 2), and the inverting clear input of the flip-flop 1202 is connected to the RSTN signal. On power-up, RSTN is low, thereby forcing ASYSTREN into an initial inactive state. The EBC 220 will therefore power-up with BCLK stretching disabled, which is a safe setting whether BCLK is generated synchronously or asynchronously. The circuit of FIG. 12 also includes a block 1204 which has S0, S1 and I inputs and Z0, Z1, Z2 and Z3 outputs. Block 1204 passes the signal on the I input to one of the four outputs Z0, Z1, Z2 or Z3, depending on the selection made by the inputs S0 and S1. The S0 input of block 1204 is connected to the EISA bus SA0 line, and the S1 input of block 1204 is connected to the EISA bus SA1 line. The I input of block 1204 is connected to the output of a NOR gate 1206, the three inputs of which are connected to receive EBCCSN, RHLDA and IOWCN. For the purpose of the present description, EBCCSN can be thought of as an active low signal generated by the DBC 216 which indicates merely that the EISA bus address lines SA(15:2) decode to an I/O address within C10h–C13h. It does not go active during DMA cycles. The RHLDA signal is an arbiter signal which, for the purposes of the present description, can be assumed to be constantly low. IOWCN is the EISA bus IOWC# signal, and is driven active by EBC circuitry (not shown) during a host I/O write access. The Z1 output of block 1204 is connected to the clock input of flip-flop 1202. Note that flip-flop 1202 may be implemented instead as a latch.

In operation, after RSTN has gone inactive, the value on XD2 will be loaded into the flip-flop 1202 in response to a rising edge on the Z1 output of block 1204. The Z1 output of block 1204 can go high only when EBCCSN=0, SA1=0, and SA0=1, i.e. when the I/O address on the EISA bus SA lines is C11h. When that is the case, the Z1 output of block 1204 will exhibit a rising edge in response to a falling edge of IOWCN. Accordingly, flip-flop 1202 will load in the value on bit 2 of the XD bus 219, provided by the CPU 212, in response to activation of the EISA bus IOWC# signal. The arrangement shown in FIG. 12 is typical for all the command and configuration registers in the EBC 220.

Referring now to FIG. 13, the HADS# signal is provided as HADSN to the D input of a flip-flop 1302 via a small delay line 1304. The Q output of flip-flop 1302 is connected to one input of a two-input NOR gate 1306, the output of which is connected to an input of a three-input NAND gate 1308. The other input of NOR gate 1306 receives a signal for disabling start generation which, for the purposes of the present description, can be assumed to be a steady logic 0. The second input of NAND gate 1308 is connected to receive another inhibitory signal which, for the purposes of the present description, can be assumed to be a steady logic 1. A third input of NAND gate 1308 is connected to the HADSN input. The output of NAND gate 1308 is connected to the D input of a flip-flop 1310, the QN output of which is connected to one input of a two-input NAND gate 1312. The other input of NAND gate 1312 is connected to the output of an OR gate 1314, one input of which is connected to the output of a two-input NOR gate 1316. The other input of OR gate 1314 is connected to receive a signal for generating SETSTRT in a situation not relevant here. For the purposes of the present description, this signal can be assumed to remain low. One input of NOR gate 1316 is connected to receive an LOCMDEV signal which, when active (high), indicates that a local device on the host bus 201 has claimed the cycle for itself even if the access is to the I/O address space. LOCMDEV is the complement of the EBC HLOCDEV# input signal and, as will be seen, inhibits the generation of SETSTRT when active. The other input of NOR gate 1316 is connected to receive another signal for inhibiting SETSTRT generation, which for the purposes of the present description, can be assumed to remain low at all times relevant.

The Q output of flip-flop 1302 is also connected to one input of a three-input NOR gate 1318, a second input of which is connected to receive the same signal which is provided to the second input of NOR gate 1306. The third input of NOR gate 1318 is connected to receive the SPEED1 signal, which is the complement of the SPEED1N signal referred to above. SPEED1, when active, indicates that the EBC 220 has been strapped for 40 or 50 MHz CLK operation. The output of NOR gate 1318 is connected to the first input of a three-input NAND gate 1320, the second input of which is connected to receive the HADSN signal. The third input of NAND gate 1320 is connected to the output of a two-input OR gate 1322, one input of which is connected to the output of a two-input NOR gate 1324. The second input of OR gate 1322 is connected to the same signal as the second input of OR gate 1314. The two inputs of NOR gate 1324 are connected to receive the LOCMDEV signal and another signal for inhibiting SETSTRT generation, the latter of which can be assumed to remain low for all times relevant to the present description.

The output of NAND gate 1312 and the output of NAND gate 1320 are connected to respective inputs of a two-input AND gate 1326, the output of which is connected to one input of a two-input NOR gate 1328. The other input of NOR gate 1328 is connected to receive a signal which indicates, in circumstances not here relevant, that START generation should be delayed. This signal can be assumed to remain low for all times relevant herein. The output of NOR gate 1328 is connected to the D input of a flip-flop 1330, the QN output of which is connected to one input of a two-input NAND gate 1332. The other input of NAND gate 1332 is connected to receive another signal relevant to the delayed START function, and can be assumed to remain high for all times relevant herein. The clock inputs of flip-flops 1302, 1310 and 1330 are all connected to receive the host bus CLK signal, and the inverting clear input of flip-flop 1330 is connected to receive RSTN. The inverting preset input of flip-flop 1302 is connected to the RSTN signal, and the inverting preset of flip-flop 1310 is connected to the SPEED1 signal. The output of NAND gate 1332 forms the SETSTRT signal used in FIGS. 6 and 7.

As it relates to the present invention, the purpose of the circuitry of FIG. 13 is to generate SETSTRT as soon as possible following HADSN, but still allowing enough time for an external local device to generate LOCMDEV. Accordingly, when the SPEED(1:0)# pins are strapped for 25 or 30 MHz CLK operation, SETSTRT will become active in response to the same CLK rising edge on which HADSN is sampled active. This gives the local device a little less than one CLK period to activate LOCMDEV after it samples HADS# active in response to a CLK rising edge. If the EBC SPEED(1:0)# pins are strapped for 40 or 50 MHz CLK operation, SETSTRT will go active in response to the CLK rising edge following the CLK rising edge on which HADSN is sampled active. This permits a local device a little less than two CLK periods to generate LOCMDEV after it samples HADS# active on a CLK rising edge.

In operation, assuming first that SPEED1 is low, flip-flop 1310 will be constantly preset and its QN output will be low. This will force a logic 1 on the output of NAND gate 1312, thereby permitting the output of AND gate 1326 to follow the output of NAND gate 1320. It is also assumed that CLK has a series of rising edges occurring at respectively sequential times T0, T1, T2, and so on. It is assumed that HADS# has gone active in response to the CLK rising edge at T0, and returns inactive in response to the CLK rising edge at T1. In this situation, flip-flop 1302 will load in a logic 0 in response to the CLK rising edge at T1, and load in the logic one in response to each CLK rising edge thereafter until HADSN goes low in preparation for the next cycle. Therefore, since SPEED1 is low, the output of NOR gate 1318 will go high in response to T1 and will return low in response to T2. Since HADSN has returned high in response to T1, two of the three inputs to NAND gate 1320 will be high during the period from T1 to T2. During that time period, the output of NAND gate 1320 will follow the signal on LOCMDEV. This signal is passed by AND gate 1326 and inverted by NOR gate 1328 and loaded into flip-flop 1330 in inverted form in response to the CLK rising edge at T2. Since the output of NAND gate 1320 returns high after T2, flip-flop 1330 will then load in a logic 0 in response to the CLK rising edge at T3. The QN output of flip-flop 1330 will therefore carry the value of LOCMDEV for the time period between T2 and T3. This signal is inverted by NAND gate 1332 and provided as the SETSTRT signal. Accordingly, when SPEED1=0, if LOCMDEV is still low by time T2, then SETSTRT will go high for one CLK period in response to the CLK rising edge at T2. If LOCMDEV has been activated (brought high) by an external local device prior to T2, then SETSTRT remains low and the START# signal will not be generated.

Assuming now that SPEED1=1, flip-flop 1310 is no longer constantly preset. Instead, SPEED1=1 forces a steady logic 0 on the output of NOR gate 1318, which forces a steady logic 1 on the output of NAND gate 1320. This permits AND gate 1326 to pass the value on the output of NAND gate 1312. As mentioned, flip-flop 1302 will output a logic 0 from time T1 through time T2. This signal is inverted by NOR gate 1306 and NANDed with the HADSN signal by NAND gate 1308, which therefore goes low in response to T1 and returns high in response to T2. Flip-flop 1310 therefore loads in a logic 0 in response to the CLK rising edge at T2 and a logic 1 in response to the CLK rising edge at T3. The QN output of flip-flop 1310 thus goes high from time T2 through time T3. During this time, the output of NAND gate 1312 will follow the LOCMDEV signal. At all other times this output will be high. Thus, from T2 through T3, the output of AND gate 1326 will follow LOCMDEV. This signal is inverted by NOR gate 1328 and loaded into flip-flop 1330, which therefore provides the LOCMDEV value on its QN output from time T3 through time T4. The QN output of flip-flop 1330 will be high at all other times. As mentioned, this signal is then inverted by NAND gate 1332 to provide the SETSTRT signal. Accordingly, when SPEED1=1, if an external local device has not activated LOCMDEV by the time of the CLK rising edge at T3, SETSTRT will go high in response to the CLK rising edge at T3 and return low in response to the CLK rising edge at T4. If an external local device has activated LOCMDEV by the time of the CLK rising edge at T3, then SETSTRT will remain low between T3 and T4, and START# will not be generated.

Thus, the circuit of FIG. 13 permits an external local device a little less than one CLK period after it samples HADS# active to activate the EBC HLOCDEV# input pin if CLK is operating at 25 or 30 MHz. It permits the external device a little less than two CLK periods after it samples HADS# active to assert HLOCDEV# when CLK is operating at 40 or 50 MHz.

Referring now to the circuit of FIG. 6, the signal ASYSTREN is connected to receive the synchronous-/asynchronous START# control register bit in EBC control register index C11h, bit 2. As mentioned in table VI, when this bit is high, the circuit of FIG. 6 does not need to synchronize the beginning of START# with a BCLK edge since a BCLK pulse will be stretched to ensure that START# meets the EISA specification timing requirements relative to the BCLK signal. When ASYSTREN=0, the circuit of FIG. 6 will generate START# synchronously with the BCLKIN signal and the EBC 220 will not alter the BCLKOUT signal. ASYSTREN=0 is preferably used in systems where BCLK is generated asynchronously with the host 201 CLK signal, but ASYSTREN=0 may also be used in systems with synchronously generated BCLKs. It is the default power-up state.

In the circuit of FIG. 6, the ASYSTREN signal from FIG. 12 is connected to a first input of a NAND gate 602 and, via an invertor 604, to a first input of a NAND gate 606. The SETSTRT signal from FIG. 13 is also connected to the second input of each of the NAND gates 602 and 606. The output of NAND gate 606 is connected to an inverting preset input of a D flip-flop 608, the D input of which is connected to ground. The Q output of flip-flop 608 is connected to one input of a 2-input NAND gate 610, the other input of which is connected from other EBC 220 circuitry not shown and not important to an understanding of the invention. The output of NAND gate 610 is connected to the D input of another flip-flop 612. The Q output of flip-flop 612 is connected to one input of a NAND gate 614, the other input of which is connected to EBC 220 circuitry not shown and also not important for an understanding of the invention. For the purposes of the present description, it will be sufficient to assume that the second inputs to NAND gates 610 and 614 are each held high during all times relevant to this description.

The output of NAND gate 614 is connected to the D input of yet another flip-flop 615, the Q output of which is connected back to the CLK input of flip-flop 608. The flip-flop 615 is docked by the signal from the EBC 220 BCLKIN pin, and the flip-flop 612 is docked by the inverse, BCLKINN, of the signal from the BCLKIN pin. The output of NAND gate 602 is connected to an inverting preset input of flip-flop 615. The Q output of flip-flop 615 is also connected to one input of an AND gate 616, the second input of which is connected to other EBC circuitry not shown and not important for an understanding of the invention, The output of AND gate 616 is connected to one input of a NOR gate 618, the output of which is provided to the START# output pin of EBC 220. Second and third inputs of NOR gate 618 receive signals from other EBC 220 circuitry for generating a START# signal according to the requirements for different EISA bus cycle types. For the purposes of the present description, it can be assumed that at all times relevant, the second input of AND gate 616 is held high, and the second and third inputs of NOR gate 618 are held low. The active low clear inputs of flip-flops 608 and 615 are connected to RSTN.

In operation, assume first that ASYSTREN is high. In this case the output of invertor 604 is low, forcing the output of NAND gate 606 to remain high regardless of SETSTRT, When SETSTRT goes high to indicate that START# should be asserted, the output of NAND gate 602 goes low and presets flip-flop 615. The Q output of flip-flop 615 therefore goes high at this time, thereby bringing START# low. SETSTRT, as previously mentioned, is generated synchronously with CLK, SETSTRT going high synchronously with a rising edge of CLK. It remains high for one CLK cycle, and thereafter NAND gate 602 stops presetting flip-flop 615. On the next rising edge of the BCLKIN signal, flip-flop 615 will load in a logic 0 from the output of NAND gate 614 and thereby deactivate START#. Since BCLKOUT is stretched such that its next rising edge after START# goes active occurs at least 120 nS after START# goes active, and given the assumption in this mode that BCLKIN is connected to receive BCLKOUT, the circuitry of FIG. 6 in the ASYSTREN=1 mode will activate START# for the minimum number of CLK cycles which insures that START# will be active for at least 120 nS. As will be seen with reference to FIG. 7, that number of CLK cycles depends on CLK frequency as specified in the strapping options of the SPEED(1:0)# pins.

If ASYSTREN=0, the circuit of FIG. 6 assumes that BCLK (and therefore BCLKIN) is generated asynchronously with CLK. BCLK may actually be generated synchronously with CLK, but this mode of the circuit of FIG. 6 does not rely on that assumption. Since SETSTRT is generated synchronously with CLK and not BCLK, a synchronization function take place in order to generate START# synchronously with BCLK.

For ASYSTREN=0, NAND gate 602 outputs a logic 1 regardless of SETSTRT and therefore has no effect on flip-flop 615. The output of invertor 604 is high, however, so that when SETSTRT goes high, the output of NAND gate 606 goes low and presets flip-flop 608. The Q output of flip-flop 608 therefore goes high, bringing the output of NAND gate 610 low. On the next rising edge of BCLKINN (falling edge of BCLKIN), flip-flop 612 will load in the logic 0 from the output of NAND gate 610. This causes a 0 on the Q output of flip-flop 612, which in turn forces a logic 1 at the output of NAND gate 614. On the next rising edge of BCLKIN, the logic 1 from the output of NAND gate 614 is loaded into the flip-flop 615. The resulting low-to-high transition of the Q output of flip-flop 615 clocks a 0 into flip-flop 608. This causes a logic 1 at the D input of flip-flop 612 which is loaded into flip-flop 612 on the next rising edge of BCLKINN (falling edge of BCLKIN). The logic 1 thereby presented on the Q output of flip-flop 612 causes a logic 0 on the D input of flip-flop 615 which, on the next rising edge of BCLKIN, is loaded into the flip-flop 615. Accordingly, the Q output of flip-flop 615 goes high for a period of one full BCLKIN, from one rising edge of BCLKIN to the next rising edge of BCLKIN, thereby generating the synchronous active low START# signal via AND gate 616 and NOR gate 618. Synchronization of the SETSTRT signal with minimum risk of metastability is provided by the flip-flops 612 and 615, clocked on opposite polarity edges of the BCLKIN signal.

FIG. 7 is a logic diagram of circuitry in EBC 220 for generating BCLKOUT synchronously with CLK. The circuitry of FIG. 7 will, depending on the user selection specified in the ASYSTREN bit of EBC register index C11h, either stretch BCLKOUT to accommodate a fixed length START# pulse, or maintain a constant BCLKOUT division of CLK and assume that the FIG. 6 circuitry performs the appropriate synchronization of the START# signal with BCLK. The BCLKOUT generating circuitry of FIG. 7 includes a shift register 702 made up of four D flip-flops 704, 706, 708 and 710. The D input of flip-flop 704 is connected to receive a logic 1, and its Q output is connected to the D input of flip-flop 706. The Q output of flip-flop 706 is connected to the D input of flip-flop 708, the Q output of which is connected to the D input of flip-flop 710. The clock inputs of each of the flip-flops 704, 706, 708 and 710 are all connected to receive the CLK signal from the EBC 220 CLKIN pin. The inverting clear inputs of flip-flops 704, 706 and 708 are all connected to the outputs of respective NAND gates 712, 714 and 716, and the inverting clear input of flip-flop 710 is connected to the output of an invertor 718. First inputs of each of the NAND gates 712, 714 and 716, as well as the input of invertor 718, are all connected to receive the SETSTRT signal which, as mentioned above with respect to FIG. 6, indicates that START# should be activated. The second input of NAND gate 712 receives an I50MHZ signal, the second input of NAND gate 714 receives a SPEED1 signal, and the second input of NAND gate 716 receives an I25MHZN signal. The latter three signals are decodes from the straps on the external EBC 220 pins SPEED(1:0)#, I50MHZ indicating that the pins are strapped for 50 MHz CLK operation, SPEED1 indicating that the pins are strapped for 40 or 50 MHz operation, and I25MHZN indicating that the pins are strapped for 33, 40 or 50 MHz CLK operation.

The QN output of flip-flop 710 is connected to the first input of an OR gate 720, the other input of which is connected to receive SETSTRT. The output of OR gate 720 is connected to one input of a NAND gate 722, the other input of which is connected to received the ASYSTREN signal, and the output of which forms an STRNSTRN signal on a line 724.

The I50MHZ signal is also connected to the first input of a 3-input NAND gate 726. Similarly, the I25MHZN signal is connected to the first input of a 3-input NAND gate 728, and the STRNSTRN signal on line 724 is connected to the first input of a 3-input NAND gate 730. The outputs of the NAND gates 726, 728 and 730 are connected to respective first, second and third inputs of a NAND gate 732, the output of which is connected to the D input of a flip-flop 734. The Q output of flip-flop 734 forms a BCLK0 signal, which is connected to the D input of a flip-flop 736, and the Q output of flip-flop 736 forms a BCLK2 signal which is connected to the D input of a flip-flop 738. The QN output of flip-flop 734 forms a BCLK0N signal. The QN output of flip-flop 736 forms a BCLK2N signal, and the QN output of flip-flop 738 forms a BCLK4N signal. The BCLK0 signal, the BCLK2 signal and the BCLK4 signal are connected to respective first, second and third inputs of 3-input NOR gate 740, the output of which forms a BCLK000 signal. The second and third inputs of NAND gate 726 are connected to receive the BCLK4N signal and the BCLK0 signal, respectively. The second and third inputs of NAND gate 728 are connected to receive the BCLK0 signal and the BCLK2N signal, respectively, and the second input of NAND gate 730 is connected to receive the BCLK000 signal. The third input of NAND gate 730 is connected to receive another signal from EBC 220 circuitry not shown, which can alter the BCLKOUT signal for reasons other than synchronization with START#. The source of the signal on the third input of NAND gate 730 is unimportant to an understanding of the invention, and for the purposes of the present description, can be assumed to provide a logic 1 at all times relevant. The inverting clear inputs of flip-flops 734 and 736 are both connected to receive an RSTCLKN signal, which is provided only for clearing these clock-generating flip-flops. RSTCLKN can be assumed to remain high at all times relevant to the present description. The inverting clear input of flip-flop 738 is connected to the output of an AND gate 742, the first input of which is connected to receive the SPEED1 signal, and the second input of which is connected to receive the RSTCLKN signal.

The BCLK0 signal is also connected to the D input of a flip-flop 744, the QN output of which is connected to a first input of an OR gate 746. The second input of OR gate 746 is connected to receive an SPEED0 signal, which indicates that the EBC 220 external SPEED(1:0)# pins have been strapped for 33 or 50 MHz CLK operation. The BCLK0N signal is connected with the output of OR gate 746 to respective inputs of a 2-input NAND gate 748, the output of which forms the BCLKOUT signal provided to the external EBC 220 pin of the same name. The clock input of flip-flop 744 is connected to receive the host bus CLK signal via an invertor 750.

The operation of the circuitry of FIG. 7 will be described first assuming that ASYSTREN has been programmed to a logic 0, indicating that START# will be synchronized to BCLKIN and that no BCLKOUT stretching is required by the circuitry of FIG. 7. In this case, the NAND gate 722 forces the STRNSTRN signal on line 724 to remain high regardless of the output of OR gate 720. Also, assume first that the SPEED(1:0)# pins are strapped for 25 MHz CLK operation, meaning that both I50MHZ and I25MHZN are low. In this situation, the logic of NAND gates 726, 728, 730 and 732 merely couples the BCLK000 signal to the D input of flip-flop 734. Also, since SPEED1 is low, AND gate 742 constantly clears flip-flop 738. Further, since SPEED0=0, the output of OR gate 746 will follow the QN output of flip-flop 744.

Figure 8:
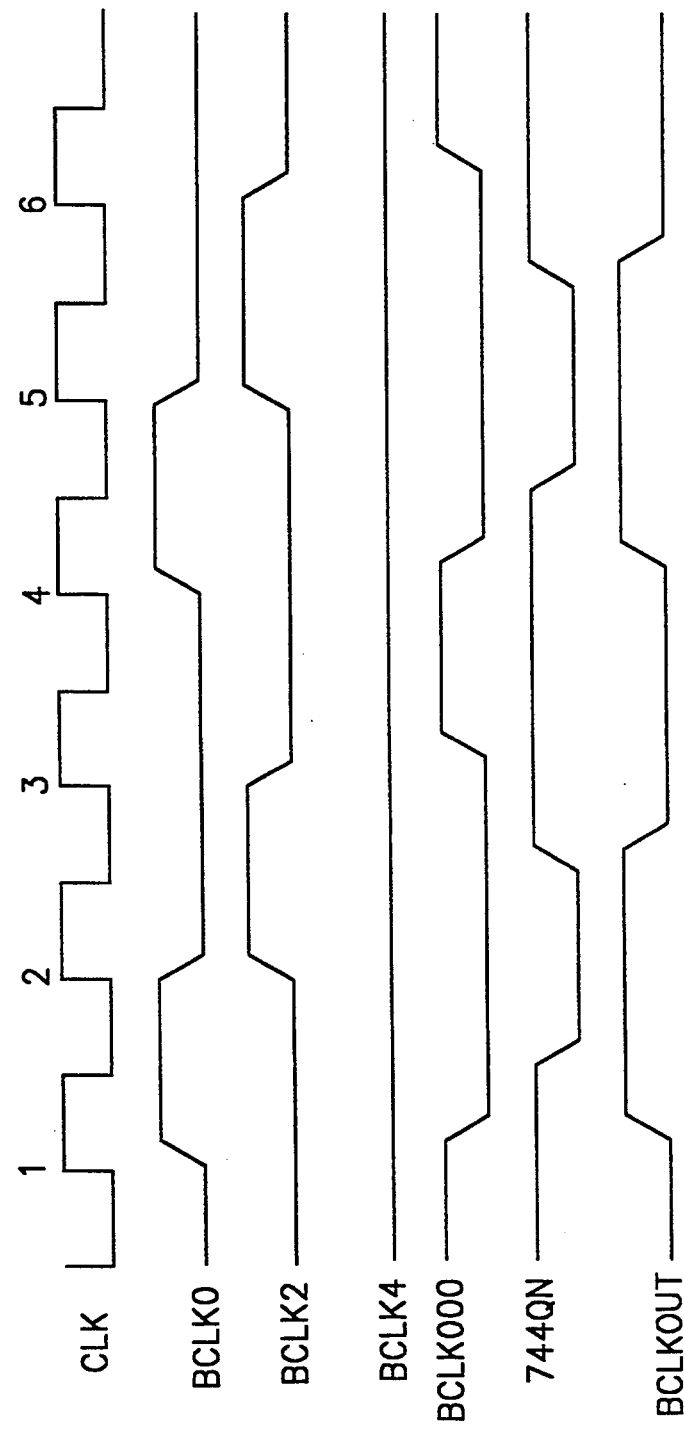
Figure 9A:
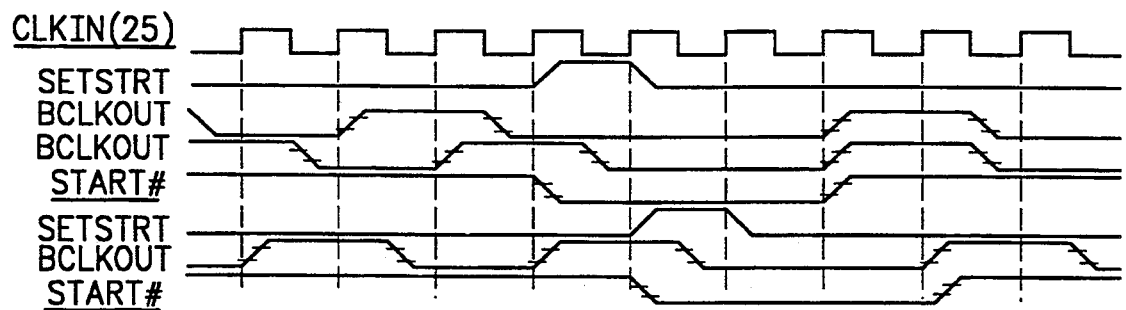
Figure 9B:
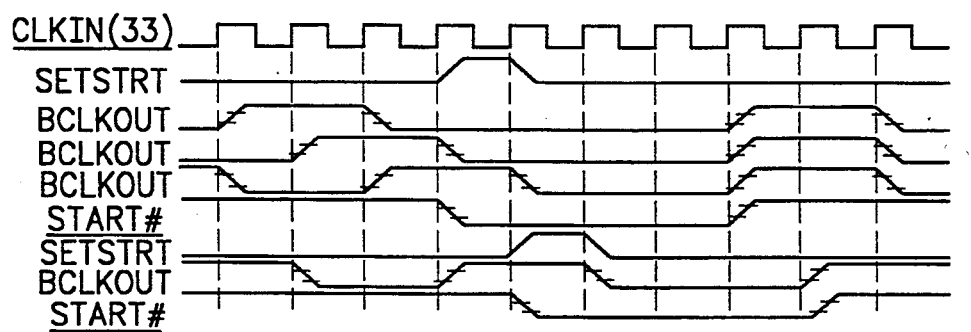
Figure 9C:
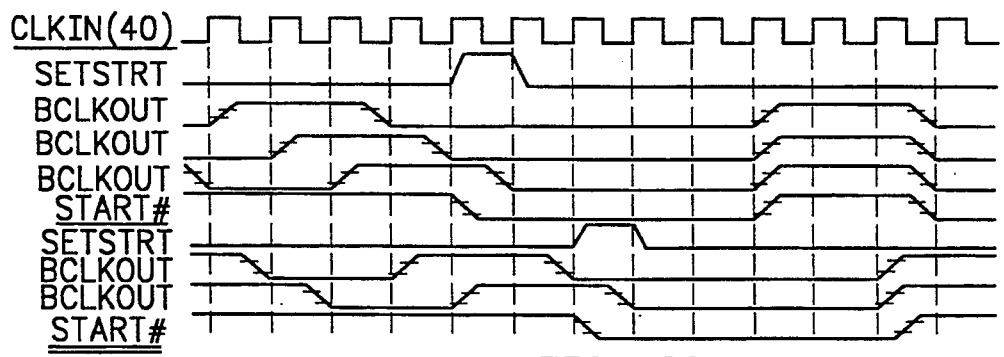
Figure 9D:
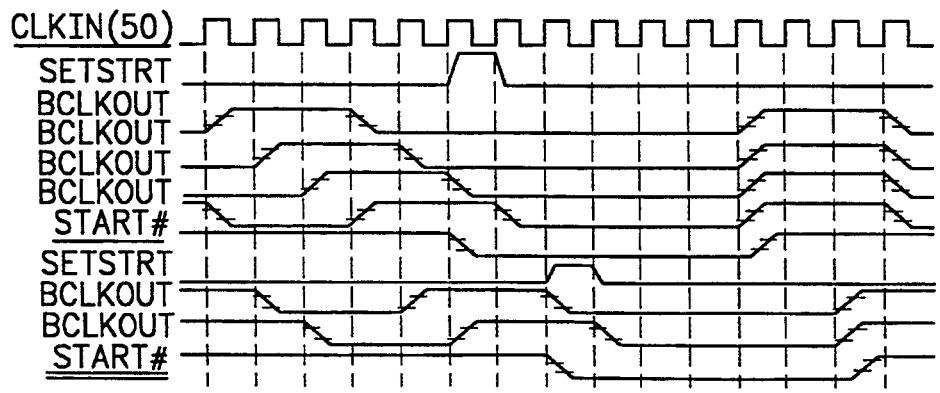

FIG. 8 is a timing diagram showing the waveforms of CLK, BCLK0, BCLK2, BCLK4, BCLK000, the QN output of flip-flop 744, and the BCLKOUT output which results. At the beginning of the period shown in FIG. 8, BCLK0 and BCLK2 are both low. Since BCLK4 is always low when SPEED(1:0)# is strapped for 25 MHz operation, the BCLK000 signal follows the NOR of BCLK0 and BCLK2, which starts out high. On the first rising edge of CLK, the high BCLK000 signal is loaded into flip-flop 734, thereby raising BCLK0 to a high level and lowering BCLK000 to a logic 0. On the second rising edge of CLK, the logic 1 in flip-flop 734 is loaded into flip-flop 736 and flip-flop 734 loads in the 0 from the BCLK000 signal. On the third rising edge of CLK, the flip-flop 736 loads in the 0 from flip-flop 734, and flip-flop 734 retains its 0 output. Since BCLK0 and BCLK2 are both low at this point, the BCLK000 signal now goes high in time for the fourth rising edge of CLK. In response to such fourth rising edge, flip-flop 734 again loads in a 1 from BCLK000, once again bringing BCLK000 low. This brings the circuit back to the same state that it was in after the first CLK rising edge, thereby causing the sequence to repeat. Accordingly, the logic 1 is transferred to flip-flop 736 on the fifth rising edge of CLK; after the sixth rising edge of CLK the outputs of both flip-flops 734 and 736 are again 0; and so on.

The QN output of flip-flop 744 follows the inverse of BCLK0, delayed by one-half CLK cycle. Accordingly, in response to the falling edge of CLK following the first CLK rising edge, the QN output of flip-flop 744 goes low. In response to the falling edge of CLK following the second rising edge of CLK, the QN output of flip-flop 744 goes high. It remains high until the CLK falling edge following the fourth rising edge of CLK, in response to which the QN output of flip-flop 744 again goes low. It goes high again in response to the CLK falling edge following the fifth rising edge of CLK. The BCLKOUT waveform in FIG. 8 depicts the NAND of BCLK0N and the QN output of flip-flop 744. As can be seen, with the SPEED(1:0)# pins strapped to indicate 25 MHz operation, the circuit of FIG. 7 produces a BCLKOUT signal which is a square wave operating at one-third the frequency of CLK.

With SPEED(1:0)# strapped for 33 MHz operation, I50MHZ and SPEED1 are both low and I25MHZ and SPEED0 are both high. The NAND gates 726, 728, 730 and 732 therefore effectively provide to the D input of flip-flop 734 the logical OR of BCLK2N and BCLK000. The output of AND gate 742 continues to clear flip-flop 738, and the SPEED0 signal removes flip-flop 744 from having an effect on BCLKOUT. BCLKOUT will essentially follow BCLK0. By an analysis similar to that set forth above with respect to SPEED(1:0)# strapped for 25 MHz, it will be seen that BCLKOUT will carry a square wave operating at one-fourth the frequency of CLK when SPEED(1:0)# are strapped with 33 MHz. Similarly, it will also be seen that BCLKOUT will carry a square wave of one-fifth the frequency of CLK if SPEED(1:0)# are strapped for 40 MHz CLK operation, and will carry a square wave of one-sixth the frequency of CLK if SPEED(1:0)# are strapped for 50 MHz CLK operation.

If ASYSTREN has been programmed high, indicating that BCLK stretching is enabled, then the STRNSTRN signal on line 724 will be high only when the output of OR gate 720 is low. The effect of the shift register arrangement 702 is to hold the output of OR gate 720 high for two, three, four or five CLK cycles depending on the SPEED(1:0)# strapping options. In particular, when SETSTRT goes high to indicate that a START# signal should be generated, the output of OR gate 720 immediately goes high, forcing STRNSTRN low. Regardless of when SETSTRT returns low, the QN output of flip-flop 710, which also went high immediately in response to SETSTRT going high, maintains the output of OR gate 720 at a logic 1 level at least until the next rising edge of CLK. Since SETSTRT does not return low until after that CLK rising edge, flip-flop 710 maintains its logic 1QN output until at least the second CLK rising edge following the SETSTRT rising edge. At that time, flip-flop 710 loads in the value from flip-flop 708, which will have been cleared in response to SETSTRT only if the SPEED(1:0)# pins are strapped for 25 MHz (I25MHZN=0). Flip-flop 708 will load in the value from flip-flop 706, which will have been cleared in response to SETSTRT only if the SPEED(1:0)# pins are strapped for 40 or 50 MHz operation (SPEED1=1). Similarly, flip-flop 706 will load in the value from flip-flop 704 only if the SPEED(1:0)# pins were strapped for 50 MHz operation (I50MHZ=1). Accordingly, at 25 MHz, STRNSTRN will go low in response to SETSTRT for two CLK cycles if the pins are strapped for 25 MHz CLK operation, will go low for three CLK cycles if the strapping is for 25 or 33 MHz operation, will go low for four CLK cycles if the strapping is for 25, 33 or 40 MHz CLK operation, and will go low for five CLK cycles if the strapping is for 25 MHz, 33 MHz, 40 MHz or 50 MHz CLK operation.

The effect of a 0 logic level on the STRNSTRN line 724 is to delay temporarily the feedback of a logic 1 on BCLK000 through NAND gates 730 and 732 to the D input of flip-flop 734. From a review of the diagram of FIG. 7, it can be seen that this has the effect of permitting the next falling edge of BCLKOUT to occur (if BCLKOUT is not already low when STRNSTRN goes low), but delaying the next rising edge of BCLKOUT until the third CLK rising edge following activation of SETSTRT for a 25 MHz strapping option, the fourth CLK rising edge following activation of SETSTRT for the 33 MHz strapping option, the fifth CLK rising edge following activation of SETSTRT for the 40 MHz strapping option, and the sixth CLK rising edge following activation of SETSTRT for the 50 MHz strapping option. Subsequent edges of BCLKOUT occur at their proper time relative to this falling edge. Referring again to FIG. 6, the BCLK rising edge, thus delayed, clocks a 0 into flip-flop 615 and thereby terminates START# as well.

FIGS. 9A–9D are a set of timing diagrams showing the START# signal and the BCLKOUT signal generated by the circuits of FIGS. 6 and 7 in response to SETSTRT, for ASYSTREN=0 and for the SPEED(1:0)# strapping options indicating 25 MHz, 33 MHz, 40 MHz and 50 MHz operation. Accordingly, it can be seen that the EBC 220 circuitry of FIGS. 6 and 7 will, generate the EISA bus START# signal at the beginning of an EISA cycle either synchronously or asynchronously to BCLK at the option of the user. In the circuits of FIGS. 6 and 7, the selection is provided by the ASYSTREN signal which is programmed into a register by the user, but other means may be provided for indicating the user's selection, for example by a strapping option on an external pin. The power-on default value for ASYSTREN should be 0, since this mode will work whether BCLK is in fact being generated synchronously or asynchronously. Additionally, the circuitry of FIGS. 6 and 7 will stretch BCLKOUT by a number of CLK cycles responsive to the CLK frequency, as indicated on the SPEED(1:0)# pins, if START# is generated asynchronously with BCLK. A wider range of CLK frequencies can therefore be accommodated than the range which was accommodated in the prior art. Alternatively, if START# is generated synchronously with BCLK, then BCLK is not stretched. The circuit of FIG. 6 provides an adequate synchronization delay in this case to minimize any risk of metastability on the EISA bus.

Generation of Host Bus EADS#

It will now be described how the invention is implemented in the system of FIG. 2 to generate the host bus EADS# signal synchronously with CLK in response to a rising edge of BCLK. Delays having a granularity of one-half of a host clock cycle are illustrated, based on a predictor signal constituting a prior edge of BCLK. The number of CLK edges to delay is responsive to the CLK frequency as indicated on the SPEED(1:0)# strapping option. The EADS# embodiment also illustrates how a predictor signal may be used to begin a synchronization function, even though the resulting synchronized signal may later be blocked based on system conditions existing at the time the signal would otherwise be generated.

During an EISA, ISA or DMA master memory write cycle, if information is to be written into a DRAM memory location which is cacheable within the on-chip cache memory in a 486-compatible CPU, the system must inform the CPU of the write in order to invalidate any on-chip cache entry corresponding to the write address. In order to accomplish this, the chipset activates the host bus EADS# signal when the write address is being driven by the master onto the host address lines. During a DMA or EISA master burst write cycle in particular, the address is valid on the EISA bus address lines from prior to a BCLK rising edge to just after the next BCLK falling edge. This address is transmitted onto the host address lines via buffers 230 (FIG. 2) and is valid on the host address lines from shortly after the time it is valid on the EISA bus address lines to shortly after the time that it is no longer valid on the EISA bus address lines. The chipset must activate EADS# such that it is active at the time of a CLK rising edge while the host address lines are valid. Preferably this should occur on the first CLK rising edge following some predetermined maximum address transmission time through the buffers 230, following the BCLK rising edge. The chipset should assert EADS# also toward the end of START# in EISA master cycles or DMA cycles in which an EISA master is writing to a memory location in a 486-based system. It should assert EADS# also when an ISA master is writing to a memory location in a 486-based system, during the period when MWTC# is active, but careful synchronization is not required for this situation.

Figure 10:
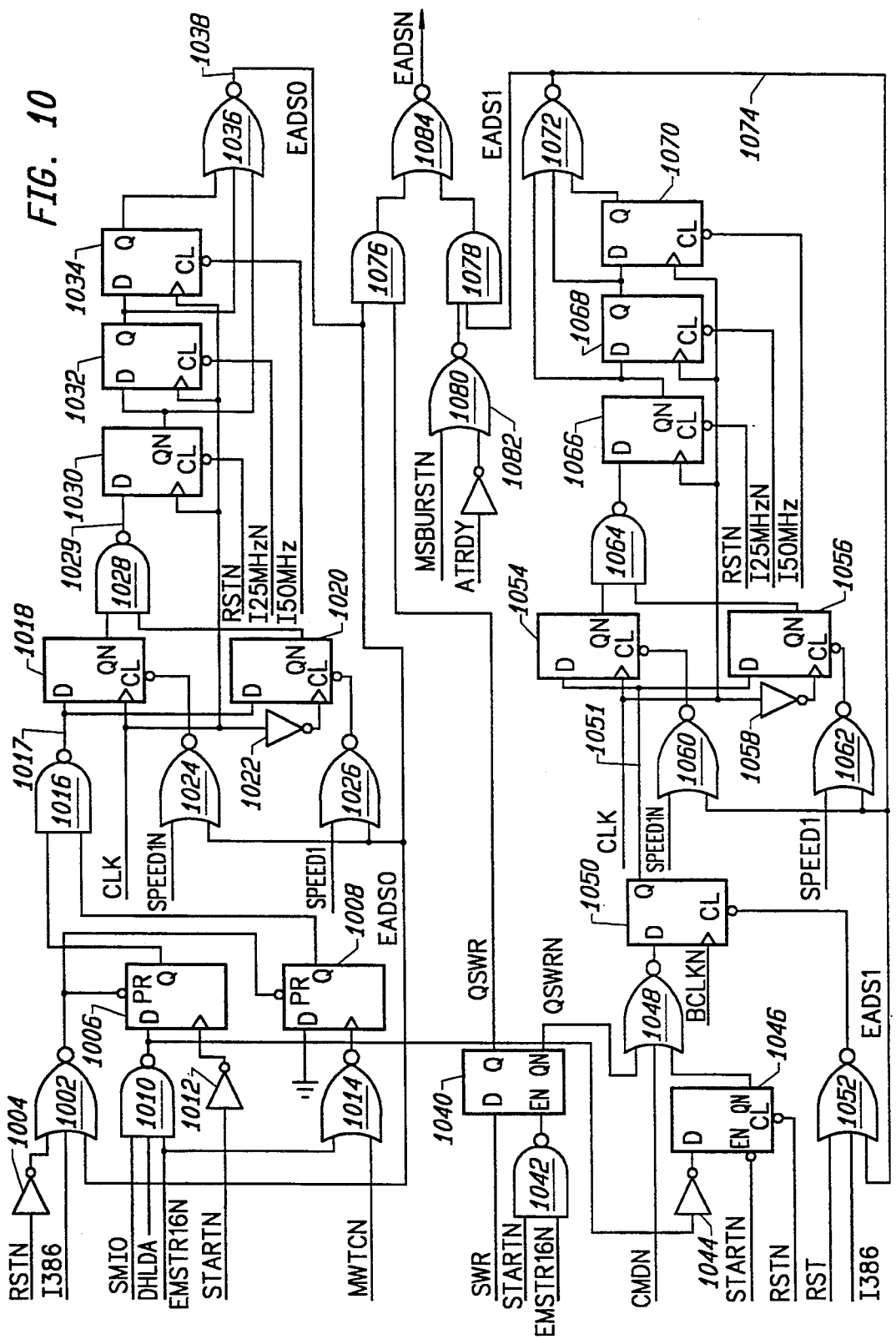
FIG. 10 is a logic diagram of circuitry in the EBC in FIG. 2 which generates a host bus EADS# signal at a desired time relative to I/O bus signals.

FIG. 10 is a logic diagram of circuitry in EBC 220 which generates the EADS# signal. It comprises a 3-input NOR gate 1002, the first input of which is connected to the output of an invertor 1004, the input of which is connected to receive the RSTN signal. The second input of NOR gate 1002 receives an I386 signal which, for 486-compatible systems, is tied low by a strapping option on an EBC 220 pin. The third input of NOR gate 1002 is connected to receive an EADS0 signal described below. The output of NOR gate 1002 is connected to the inverting preset input of each of two D flip-flops 1006 and 1008. The D input of flip-flop 1006 is connected to the output of a 3-input NAND gate 1010, the inputs of which are connected to receive an SMIO signal, a DHLDA signal, and an EMSTR16N signal, respectively. SMIO derives from the SM/IO# pin of EBC 220 and is generated either by circuitry within EBC 220 (not shown) or by an external EISA bus source. When high, it indicates that system memory is being accessed rather than an IO port. DHLDA, when high, indicates that the CPU 212 has acknowledged a hold request and a master other than the CPU 212 is controlling the bus. When DHLDA=1, EMSTR16N is high to indicate that the master is an EISA or DMA master and low to indicate that it is an ISA master. EMSTR16N derives from the EMSTR16# pin of EBC 220.

The clock input of D flip-flop 1006 is connected to the output of an invertor 1012, the input of which is connected to receive the STARTN signal (which has the same polarity as the external EISA bus START# signal.) The D input of flip-flop 1008 is connected to ground, and the clock input of flip-flop 1008 is connected to the output of a NOR gate 1014, one input of which is connected to the EMSTR16N signal. The other input of NOR gate 1014 is connected to receive an MWTCN signal which carries the same polarity as the EBC MWTC# pin. When active, it indicates a memory write access is taking place.

The Q output of each of the flip-flops 1006 and 1008 is connected to respective inputs of a two-input NAND gate 1016, the output of which is connected to the D input of each of two flip-flops 1018 and 1020. The clock input of flip-flop 1018 is connected to receive the host bus CLK signal, which is also inverted by invertor 1022 and provided to the clock input of flip-flop 1020. An inverting clear input of flip-flop 1018 is connected to the output of a NOR gate 1024, a first input of which is connected to receive the SPEED1N signal and a second input of which is connected to receive the EADS0 signal. Similarly, the inverting clear input of flip-flop 1020 is connected to the output of a NOR gate 1026, one input of which is connected to receive the SPEED1 signal and the other input of which is connected to the EADS0 signal. The QN output of each of the flip-flops 1018 and 1020 is connected to the respective input of a two-input NAND gate 1028, the output of which is connected to the D input of a flip-flop 1030. The QN output of flip-flop 1030 is connected to the D input of a flip-flop 1032, the Q output of which is connected to the D input of a flip-flop 1034. The clock inputs of the flip-flops 1030, 1032 and 1034 are all connected to receive the host bus CLK signal. The inverting clear input of flip-flop 1030 is connected to the RSTN signal, the inverting clear input of flip-flop 1032 is connected to the I25MHZN signal, and the inverting clear input of flip-flop 1034 is connected to the I50MHZ signal. The QN output of flip-flop 1030 and the Q output of each of the flip-flops 1032 and 1034 are connected to respective inputs of a three-input NOR gate 1036, the output of which forms, on a line 1038, the EADS0 signal referred to above.

The apparatus of FIG. 10 further includes a transparent latch 1040, the D input of which is connected to receive an SWR signal which carries the complement of the signal on the SW/R# pin. SWR=1 indicates a write access as opposed to a read access. The active high enable input of latch 1040 is connected to the output of a NAND gate 1042, the two inputs of which are connected to the STARTN signal and the EMSTR16N signal. Latch 1040 forms a QSWR signal on its Q output and a QSWRN signal on its QN output.

The output of NAND gate 1010, in addition to being connected to the D input of flip-flop 1006 as set forth above, is also connected via an invertor 1044 to the D input of a transparent latch 1046. The active low enable input of latch 1046 is connected to the STARTN signal, and the inverting clear input of latch 1046 is connected to the RSTN signal. The QN output of latch 1046 is connected to one input of a three-input NOR gate 1048, a second input of which is connected to receive the QSWRN signal. The third input of NOR gate 1048 receives a CMDN signal which follows the EISA bus CMD# signal. The output of NOR gate 1048 is connected to the D input of a flip-flop 1050, the clock input of which is connected to receive the inverse of the EISA bus clock signal BCLKN, and the inverting clear input of which is connected to the output of a NOR gate 1052. One input of NOR gate 1052 is connected to receive an RST signal, a second input is connected to receive the I386 signal, and a third input is connected to receive an EADS1 signal described below.

The Q output of flip-flop 1050 is connected to the D input of each of two flip-flops 1054 and 1056. The host bus CLK signal is connected to the clock input of flip-flop 1054, and is connected via an invertor 1058 to the clock input of flip-flop 1056. The inverting clear input of flip-flop 1054 is connected to the output of a NOR gate 1060, one input of which is connected to the SPEED1N signal and the other input of which is connected to EADS1. Similarly, the inverting clear input of flip-flop 1056 is connected to the output of a NOR gate 1062, one input of which is connected to the SPEED1 signal and the other input of which is connected to EADS1. The QN outputs of flip-flops 1054 and 1056 are connected to respective inputs of a two-input NAND gate 1064, the output of which is connected to the D input of a flip-flop 1066. The QN output of flip-flop 1056 is connected to the D input of a flip-flop 1068, the Q output of which is connected to the D input of a flip-flop 1070. The clock inputs of the flip-flops 1066, 1068 and 1070 are all connected to receive the host bus CLK signal. The inverting clear input of flip-flop 1066 is connected to the RSTN signal, the inverting clear input of flip-flop 1068 is connected to the I25MHZN signal, and the inverting clear input of flip-flop 1070 receives the I50MHZ signal. The QN output of flip-flop 1066 and the Q outputs of flip-flops 1068 and 1070 are connected to respective inputs of a three-input NOR gate 1072, the output of which forms the EADS1 signal referred to above, on a line 1074.

The EADS0 signal on line 1038, in addition to being connected as described above, is also connected to one input of a two-input AND gate 1076, the other input of which is connected to receive QSWR. Similarly, the EADS1 signal on line 1074, in addition to being connected as described above, is also connected to one input of a two-input AND gate 1078. The other input of AND gate 1078 is connected to the output of a NOR gate 1080, one input of which is connected to an MSBURSTN signal, which follows the EISA bus MSBURST# signal via the EBC 220 pin of the same name, and the other input of which is connected to an internal EBC 220 ATRDY signal via an invertor 1082. The MSBURSTN signal is asserted by the EBC 220 during DMA burst cycles and by the EISA master during EISA master burst cycles. The ATRDY signal goes active (high) with HATRDY, but remains active for a full BCLK period rather than one-half BCLK period. The outputs of AND gates 1076 and 1078 are connected to respective inputs of a NOR gate 1084, the output of which forms an EADSN signal which is coupled to the EBC 220 EADS# pin.

The circuitry of FIG. 10 activates EADS# in each of the three situations described above (EISA, ISA and DMA master memory write accesses). Careful timing of EADS# during ISA master write cycles is not required, but it is included in the circuit of FIG. 10 for simplicity of design. As an overview, EADS# activation during START# is handled initially by flip-flop 1006 and EADS# generation in the ISA case is handled initially by flip-flop 1008. The outputs of these flip-flops are combined by NAND gate 1016, and flip-flops 1018, 1020, 1030, 1032 and 1034 provide the appropriate timing delays for the ultimate assertion of EADS#. Similarly, EADS# generation during a DMA or EISA burst is handled initially by latches 1040 and 1046 and by flip-flop 1050, and flip-flops 1054, 1056, 1066, 1068 and 1070 provide the appropriate delay timing. The outputs of the two portions of the circuit are provided on lines EADS0 and EADS1 which are combined by gates 1076, 1078 and 1084 to generate the ultimate EADS# signal. The portion of the circuitry which handles the START# and ISA cases begin operation before it is known that the access is in fact a write as opposed to a read, and this information is added in by the gates 1076 and 1084 only after EADS0 is generated. Similarly, the portion of the circuitry which handles the DMA or EISA burst case begins its operation before it is actually known that the access is in fact a burst as opposed to a single-cycle access. That information is only added in by gates 1080, 1078 and 1084 after EADS1 is generated.

Figure 11A:
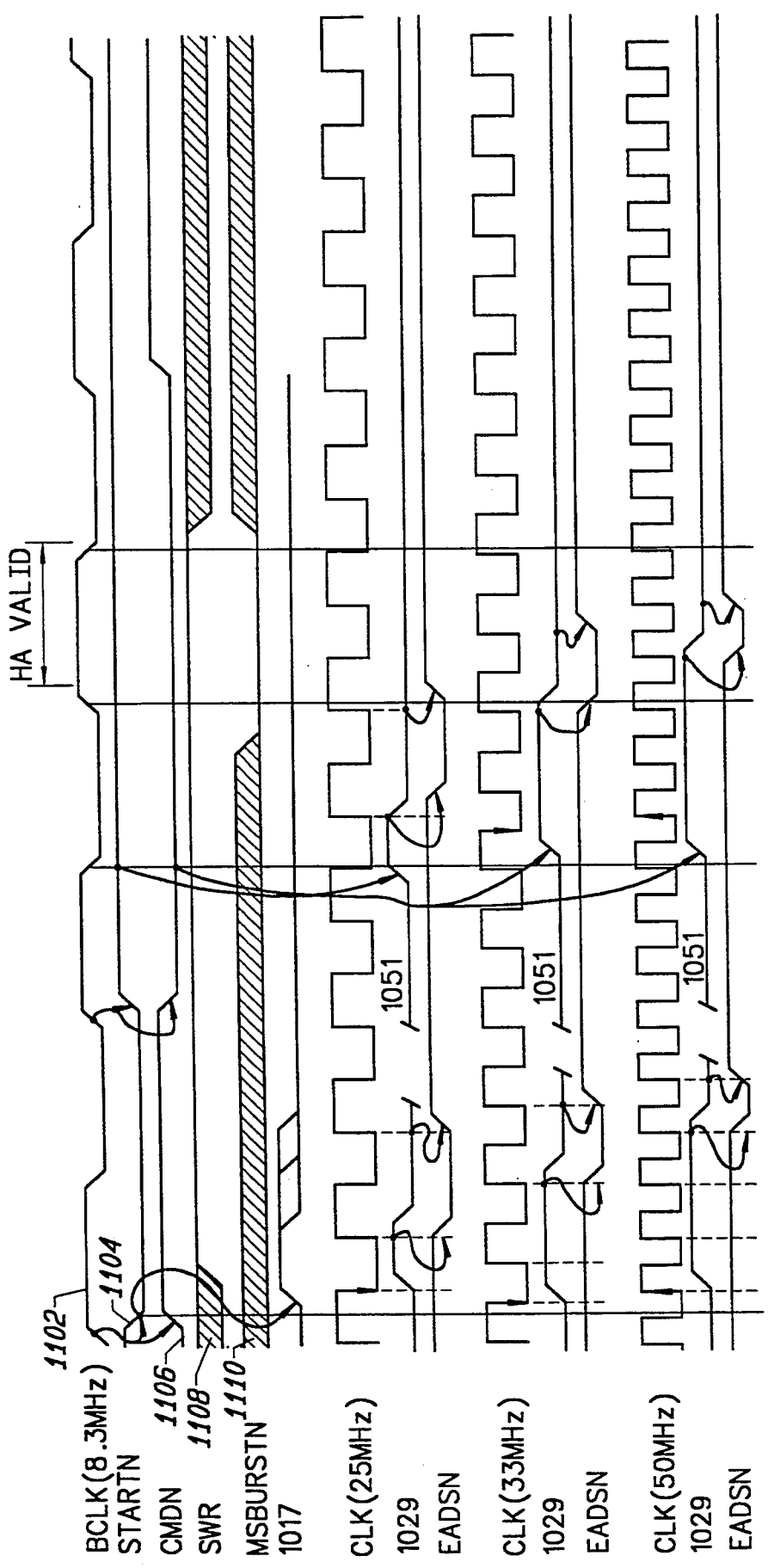
FIGS. 11A and 11B are timing diagrams illustrating the operation of the circuitry of FIG. 10.
Figure 11B:
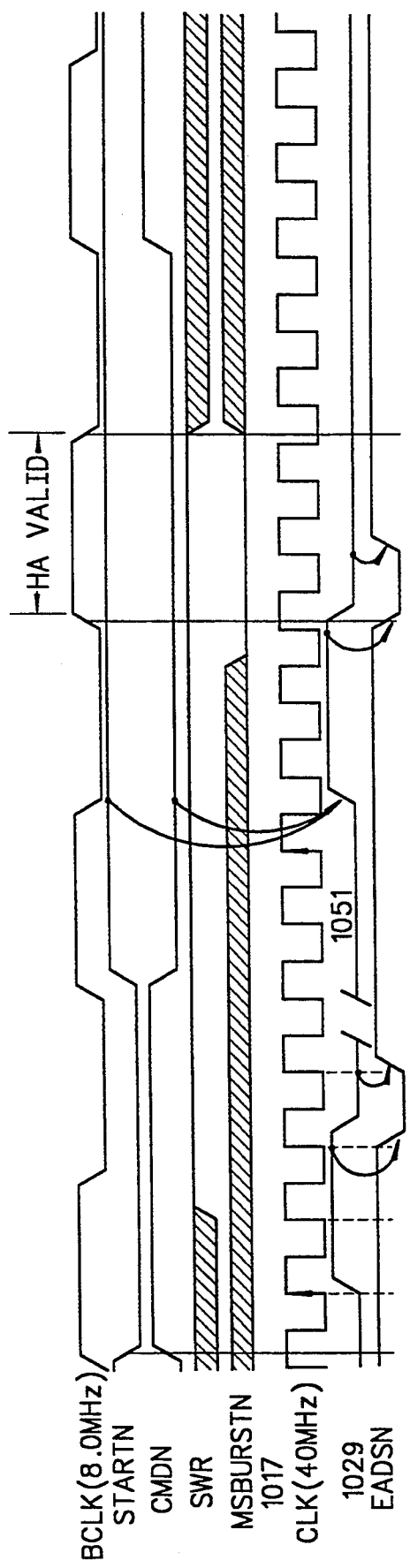

FIGS. 11A and 11B show the waveforms for various signals in the circuit of FIG. 10 in order to illustrate how the circuit operates in an EISA master write cycle which is followed by a single burst cycle, for the four SPEED(1:0)# CLK frequency strapping options. The BCLK signal is shown in waveform 1102, the STARTN signal is shown in waveform 1104, and the CMDN signal is shown in waveform 1106. As shown in these waveforms, the cycle begins when, in response to a BCLK rising edge, STARTN becomes active. STARTN remains active until, in response to the next BCLK rising edge, STARTN returns inactive and CMDN becomes active. The waveforms of FIGS. 11A and 11B assume that BCLK is generated synchronously with CLK, but as will be seen, the circuit of FIG. 10 does not rely on that arrangement. Also, the waveforms of FIGS. 11A and 11B assume that STARTN did not need to be stretched. As shown further in FIG. 11A, the EISA bus SW/R# signal does not become valid until some time in the middle of STARTN, as shown in waveform 1108, and becomes invalid shortly after the second BCLK falling edge following activation of CMDN. MSBURSTN does not become active until shortly before the first BCLK rising edge after CMDN becomes active, and becomes inactive with the BCLK falling edge just before CMDN becomes inactive. The address is valid on the host bus address lines from shortly before STARTN becomes active to shortly after the first BCLK falling edge after CMDN becomes active. The next address of the burst becomes valid on the host bus address lines from about the next BCLK rising edge to shortly after the immediately following BCLK falling edge. EADS# must be asserted so that it can be sampled active in response to a CLK rising edge which occurs during each of the time periods when the host bus address lines contain valid information.

Referring to FIG. 10, RSTN is high and I386 is low at all times relevant. EADS0 was recently high in the previous cycle, thereby presetting flip-flops 1006 and 1008, but is low at the beginning of the time period shown in FIG. 11A. Since the output of flip-flop 1008 is high from having been recently preset, the output 1017 of NAND gate 1016 goes high shortly after STARTN goes low as shown in FIG. 11A. This signal is provided to the D inputs of both of the flip-flops 1018 and 1020.

Since an input of NOR gate 1024 is connected to the SPEED1N signal, which when high indicates a 25 or 33 MHz strapping option, flip-flop 1018 will remain continuously cleared when the EBC 220 is strapped for 25 or 33 MHz operation. Similarly, since an input of NOR gate 1026 is connected to the SPEED1 signal, which when high indicates 40 or 50 MHz operation, flip-flop 1020 is continuously cleared when the EBC 220 is strapped for 40 or 50 MHz CLK operation. Since flip-flop 1018 triggers on the rising edge of CLK and flip-flop 1020 triggers on the falling edge of CLK due to invertor 1022, it will be seen that the EADS0 circuitry will begin counting CLK rising edges in response to the first CLK rising edge following STARTN active (for the 25 or 33 MHz strapping options), or in response to the first CLK falling edge (for the 40 or 50 MHz strapping options). The output 1029 of NAND gate 1028 is shown in each of the waveforms 1029 in FIGS. 11A and 11B for each of the basic CLK frequencies. Accordingly, it can be seen that the signal on line 1029 in response to the first CLK falling edge following STARTN active for CLK frequencies of 25 MHz and 33 MHz, and in response to the first CLK rising edge following STARTN active for CLK frequencies of 40 MHz and 50 MHz.

For 25 MHz operation, both of the flip-flops 1032 and 1034 will be continuously cleared. Accordingly, the Q outputs of each of these flip-flops will remain high. The QN output of flip-flop 1030 is also initially high at this time, so EADS0 is low. Since flip-flop 1030 is triggered on CLK rising edges, the logic 0 on line 1029 will be clocked into flip-flop 1030 on the next CLK rising edge, thereby bringing EADS0 low on the first CLK rising edge which follows the first CLK falling edge which follows activation of STARTN. QSWR at this time is following SWR, since STARTN=0 enables SWR to pass through latch 1040 transparently to form QSWR. Once SWR goes high to indicate a write access, AND gate 1076 and NOR gate 1084 will activate EADSN as shown in FIGS. 11A and 11B. Accordingly, although the circuitry of FIG. 10 begins the synchronization process in response to STARTN active, SWR need not go high to indicate a write until much later, i.e. until shortly before the CLK rising edge on which the CPU 212 is to sample EADS# active. For 25 MHz operation, that is the second CLK rising edge following the first CLK falling edge following STARTN active. Should the cycle in fact be a read cycle, QSWR will be 0 and EADSN will not be activated at all.

For 33 MHz operation, flip-flop 1032 is not cleared, but flip-flop 1034 is. In this case, it will be seen that EADS0, and therefore EADSN (if SWR=1), will become active in response to the second CLK rising edge following the first CLK falling edge following STARTN active. For 40 MHz operation, again only flip-flop 1034 is constantly cleared. The result differs from 33 MHz, however, since the signal on line 1029 responds to a CLK rising edge rather than a CLK falling edge. Accordingly, as shown in FIG. 11B, EADS0 and (if SWR=1) EADSN will become active in response to the second CLK rising edge following the first CLK rising edge following STARTN active. (Stated another way, EADS0 and (if SWR=1) EADSN will become active in response to the third CLK rising edge following STARTN active).

For 50 MHz operation, neither of the flip-flops 1032 or 1034 are constantly cleared and therefore, as shown in FIG. 11A, EADS0 and (if SWR=1) EADSN will become active in response to the fourth CLK rising edge following STARTN active.

Once EADS0 becomes active, the output of NOR gate 1002 goes low and thereby presets flip-flop 1006. The output of whichever NOR gate 1024 or 1026 is high at this time is also brought low, thereby clearing whichever of the flip-flops 1018 and 1020 is active. The signal on line 1029 thus goes low in response to EADS0 going high. This loads a 0 into flip-flop 1030 on the CLK rising edge immediately after EADSN became active, thus bringing the QN output of flip-flop 1030 high and forcing EADS low and EADSN back to it inactive high state. Regardless of the SPEED(1:0)# strapping option, therefore, EADSN goes inactive in response to the first CLK rising edge after it becomes active, i.e., the same CLK rising edge on which it is sampled by the CPU 212.

As can be seen, the EADS0 portion of the circuit of FIG. 10 activates EADS# in time for one CLK rising edge at a time which is guaranteed, since the timing is dependent upon the CLK frequency, to occur while a valid address is present on the host bus address lines. EADS# is generated synchronously with the CLK signal in response to START#, which is permitted to occur asynchronously with CLK. A synchronization delay of one CLK falling edge and one CLK rising edge is inserted by flip-flops 1020 and 1030 when the EBC 220 is strapped for 25 MHz operation, and a synchronization delay of one CLK falling edge and two CLK rising edges is inserted by flip-flops 1020, 1030 and 1032 when the EBC 220 is strapped for 33 MHz operation. Similarly, a synchronization delay of three CLK rising edges is inserted by flip-flops 1018, 1030 and 1032 when the EBC 220 is strapped for 40 MHz CLK operation, and a synchronization delay of four CLK rising edges is inserted by flip-flops 1018, 1030, 1032 and 1034 when the EBC 220 is strapped for 50 MHz CLK operation.

When STARTN went low at the beginning of the cycle, the logic 1 from invertor 1044 was latched into latch 1046. As shown in FIGS. 11A and 11B, after the next BCLK rising edge, CMDN goes low. Once SWR settles at SWR=1 (for a write cycle), QSWRN will be low as well. This brings the output of NOR gate 1048 high, causing flip-flop 1050 to load in a logic one in response to the first BCLK falling edge following CMDN active. This is shown on lines 1051 in FIGS. 11A and 11B, The circuitry which generates EADS1 in response to the signal on line 1051 is identical to the circuitry already described which generates EADS0 in response to the signal on line 1017. Since the operation is the same, it will not be described again here. It will be appreciated, however, as shown in the waveforms of FIGS. 11A and 11B, that EADS1 and therefore EADS# will become active in response to the first CLK rising edge following the first CLK falling edge following the first BCLK falling edge after CMDN becomes active, if the EBC 220 is strapped for 25 MHz operation. Activation of EADS# is delayed by one more CLK rising edge if the EBC 220 is strapped for 33 MHz operation. If the EBC 220 is strapped for 40 MHz operation, then EADS1 and therefore EADS# will become active in response to the third CLK rising edge following the first BCLK falling edge following CMDN active, and EADS1 and EADS# are delayed one additional CLK rising edge if EBC 220 is strapped for 50 MHz operation. In all cases, EADS# is returned to its inactive (low) state in response to the immediately following CLK rising edge.

Accordingly, with the predictor signal being a BCLK falling edge while CMDN is active, an adequate synchronization delay is inserted by the circuitry of FIG. 10 to ensure that EADS# will be active during a CLK rising edge which occurs during the next BCLK high time (when the information on the host address lines is guaranteed to be valid). BCLK (and hence the predicator signal) can be completely asynchronous to CLK since flip-flops 1054, 1056, 1066, 1068 and/or 1070 insert an adequate number of CLK edge transitions prior to the initiation of EADS# in order to minimize the risk of metastability. Furthermore, the number of edges inserted varies as a function of the CLK frequency strapping option on the EBC 220 SPEED(1:0)# pins, in order to ensure that EADS# occurs within the proper time frame for each of the selectable CLK frequencies.

It should be noted that for 25 MHz CLK operation, the CLK rising edge on which the CPU samples EADS# can occur very close to the time that the HA lines will begin carrying valid address information. In order to ensure that the CPU address input setup requirements are met, for 25 MHz operation only, it is required that the CLK to BCLK delay not exceed 35 nS. This restriction is considerably easier to satisfy than the 15 nS restriction imposed by the prior art. Also, it should be noted that for a CLK frequency of 20 MHz, there is insufficient granularity in the selection of CLK rising edges (for EISA master or DMA burst memory write cycles only) to ensure that any particular CLK rising edge will occur while the HA lines carry valid information. In that situation ony, therefore, the CPU's FLUSH# input is activated.

EADS# generation in an ISA master cycle is similar to that in a START# case, except that the process is initiated when EMSTR16N and MWTCN both go low. This loads a 0 into flip-flop 1008, thereby bringing the signal on line 1017 high. The remainder of the operation of the circuit of FIG. 10 for generating EADS# is the same as for the START# case.

The invention has been described with respect to particular embodiments thereof and it will be understood that numerous variations are possible within its scope.

I claim:

1. Bus synchronization apparatus for use with a destination bus including a destination bus clock signal having a sequence of alternating polarity destination bus clock edges, for generating a desired bus event synchronously with said destination bus clock signal no earlier than a predetermined time relative to the occurrence of an originating event occurring asynchronously with said destination bus clock signal, comprising:

detecting means for detecting a predictor event occurring before a first one of said destination bus clock edges, said predictor event occurring asynchronously with said destination bus clock signal and being known to occur no more than p of said destination bus clock edges prior to said originating event, p>0; and generating means for generating said desired bus event in response to one of said destination bus clock edges occurring no earlier than the p'th one of said destination bus clock edges following said first one of said destination bus clock edges.

2. Apparatus according to claim 1, wherein said detecting means comprises means for sampling for said predictor event in response to each of said destination bus clock edges, at least until said predictor event is detected.

3. Apparatus according to claim 1, wherein said detecting means comprises means for sampling for said predictor event in response to each of said destination bus clock edges which has a predetermined polarity, at least until said predictor event is detected.

4. Apparatus according to claim 3, wherein p is an even integer.

5. Apparatus according to claim 1, wherein said generating means generates said desired bus event in response to said p'th one of said destination bus clock edges following said first one of said destination bus clock edges.

6. Apparatus according to claim 1, wherein said detecting means comprises a means for sampling for said predictor event in response to each of said destination bus clock edges which has a predetermined polarity, at least until said predictor event is detected, wherein said generating means generates said desired bus event in response to said p'th one of said destination bus clock edges, and wherein p is an even integer.

7. Apparatus according to claim 1, wherein p≧2 to minimize metastability.

8. Apparatus according to claim 1, for use further with an originating bus including an originating bus clock signal, said originating event and said predictor event both occurring synchronously with said originating bus clock signal, further comprising means for generating said originating bus clock signal asynchronously with said destination bus clock signal.

9. Apparatus according to claim 8, wherein said originating bus and destination bus clock signals each have a frequency, where p is such that said frequency of said destination bus clock signal is at least p times said frequency of said originating bus clock signal, and less than p+1 times said frequency of said originating bus clock signal.

10. Apparatus according to claim 1, for use further with an originating bus including an originating bus clock signal, said originating event and said predictor event both occurring synchronously with said originating bus clock signal, further comprising means for generating said originating bus clock signal, selectably synchronously or asynchronously with said destination bus clock signal.

11. Apparatus according to claim 10, wherein said originating bus and destination bus clock signals each have a frequency, where p is such that said frequency of said destination bus clock signal is p times said frequency of said originating bus clock signal, if said originating bus clock signal is generated synchronously, and at least p and less than p+1 times said frequency of said originating bus clock signal if said originating bus clock signal is generated asynchronously, with said destination bus clock signal.

12. Apparatus according to claim 1, further comprising means for choosing p from a predetermined set of integers in response to a user setting of said bus synchronization apparatus.

13. Apparatus according to claim 12, wherein said predetermined set of integers are all greater than or equal to 2.

14. Apparatus according to claim 1, further comprising means for choosing p from a predetermined set of even integers in response to a user setting of said bus synchronization apparatus.

15. Apparatus according to claim 6, further comprising means for choosing p from a predetermined set of even integers in response to a user setting of said bus synchronization apparatus.

16. Apparatus according to claim 1, said destination bus clock signal having a frequency, for use further with an originating bus including an originating bus clock signal having a frequency, said originating event and said predictor event both occurring synchronously with said originating bus clock signal, further comprising:

specifying means enabling a user of said bus synchronization apparatus to specify said frequency of said destination bus clock signal relative to said originating bus clock signal; and means for choosing p from a predetermined set of integers in response to said specifying means.

17. Apparatus according to claim 16, further comprising:

a clock generator which generates a synchronous clock output signal synchronously with said destination bus clock signal, said synchronous clock output signal being usable or not at the option of a user; and an input for receiving the originating bus clock signal actually used.

18. Apparatus according to claim 17, wherein said clock generator comprises a frequency divider which divides said destination bus clock signal by a value responsive to said specifying means to generate said synchronous clock signal.

19. Apparatus according to claim 17, further comprising means for stretching a cycle of said synchronous clock signal in response to a predetermined system condition.

20. Apparatus according to claim 1, for use with a CPU coupled to said destination bus, said CPU having an input (RDY#) which indicates to said CPU to terminate a destination bus access cycle when said CPU samples said input (RDY#) active in response to an edge of said destination bus clock signal, said desired bus event comprising activation of said CPU input, wherein said originating event comprises withdrawal of a first I/O bus signal (CMD#) which indicates the end of an I/O bus access cycle performed in response to said destination bus access cycle, and wherein said predictor event comprises a second I/O bus signal (EXRDY) sampled active in response to an edge of an I/O bus clock signal, said second I/O bus signal (EXRDY) indicating that said I/O bus access cycle can terminate in response to the immediately following edge of said I/O bus clock signal.

21. Apparatus according to claim 1, for use with a CPU coupled to said destination bus, said CPU having an internal cache memory, a plurality of address leads and a first input (EADS#) which, when sampled active on an edge of said destination bus clock signal, indicates to said CPU to invalidate any entry in said internal cache memory which is then mapped to an address indicated on said CPU address leads, and for use further with an external I/O bus master, wherein said desired bus event comprises activation of said first CPU input (EADS#), wherein said originating event comprises a third edge of an I/O bus clock signal, which third edge occurs while a memory write address from said I/O bus master is valid on said CPU address leads, and wherein said predictor event comprises a first I/O bus signal (CMD#) sampled active in response to a first edge of said I/O bus clock signal preceding said third edge by two edges of said I/O bus clock signal.

22. Apparatus according to claim 1, further comprising means for blocking the generation of said desired bus event by said generating means in response to the detection of a second required event not occurring within a predetermined time span which is subsequent to said first one of said destination bus clock edges.

23. Apparatus according to claim 22, for use with a CPU coupled to said destination bus, said CPU having an internal cache memory, a plurality of address leads and a first input (EADS#) which, when sampled active on an edge of said destination bus clock signal, indicates to said CPU to invalidate any entry in said internal cache memory which is then mapped to an address indicated on said CPU address leads, and for use further with an external I/O bus master, wherein said desired bus event comprises activation of said first CPU input (EADS#), wherein said originating event comprises a third edge of an I/O bus clock signal, which third edge occurs while a memory write address from said I/O bus master is valid on said CPU address leads, wherein said predictor event comprises a first I/O bus signal (CMD#) sampled active in response to a first edge of said I/O bus clock signal preceding said third edge by two edges of said I/O bus clock signal, and wherein said second required event comprises a second I/O bus signal (MSBURST#) being active while said generating means would otherwise generate said desired bus event.

24. Bus synchronization apparatus for use with a destination bus including a destination bus clock signal having a frequency and having a sequence of alternating polarity destination bus clock edges, for generating a desired bus event synchronously with said destination bus clock signal in response to an originating event, comprising:
 specifying means enabling a user of said bus synchronization apparatus to specify a value indicating said frequency of said destination bus clock signal; and
 generating means for generating said desired bus event in response to the p'th one of said destination bus clock edges occurring after said originating event, p being responsive to said specifying means.

25. Apparatus according to claim 24, for use with a bus signal, wherein said originating bus event is defined as said bus signal being in a predetermined state no later than a first one of said destination bus clock edges.

26. Apparatus according to claim 24, for use with a bus signal, wherein said originating bus event is defined as said bus signal being in a predetermined state no later than a first one of said destination bus clock edges which has a predetermined polarity.

27. Apparatus according to claim 26, wherein said predetermined polarity is responsive to said means for specifying said frequency of said destination bus clock signal.

28. Apparatus according to claim 26, further comprising means for choosing p from a predetermined set of even integers in response to said specifying means.

29. Apparatus according to claim 25, further comprising means for choosing p from a predetermined set of integers greater than or equal to two in response to said specifying means.

30. Apparatus according to claim 24, wherein said originating event occurs asynchronously with said destination bus clock signal.

31. Apparatus according to claim 25, for use further with an originating bus including an originating bus clock signal, said originating event occurring synchronously with said originating bus clock signal, further comprising means for generating said originating bus clock signal asynchronously with said destination bus clock signal.

32. Apparatus according to claim 25, for use further with an originating bus including an originating bus clock signal, said originating event occurring synchronously with said originating bus clock signal, further comprising means for generating said originating bus clock signal synchronously with said destination bus clock signal.

33. Apparatus according to claim 25, for use further with an originating bus including an originating bus clock signal, said originating event occurring synchronously with said originating bus clock signal, further comprising means for generating said originating bus clock signal selectably synchronously or asynchronously with said destination bus clock signal.

34. Apparatus according to claim 24, further comprising:
 a clock generator which generates a synchronous clock output signal synchronously with said destination bus clock signal, said synchronous clock output signal being usable or not at the option of a user; and
 an input for receiving the originating bus clock signal actually used.

35. Apparatus according to claim 34, wherein said clock generator comprises a frequency divider which divides said destination bus clock signal by a value responsive to said specifying means to generate said synchronous clock output signal.

36. Apparatus according to claim 24, further for generating said desired bus event no earlier than a predetermined time relative to the occurence of an additional event occurring asynchronously with said destination bus clock signal, said additional event being known to occur no more than p of said destination bus clock edges after said originating event, said originating event being a predictor for said additional event.

37. Bus synchronization apparatus for use with an originating bus including an originating bus clock signal having a frequency, and with a destination bus including a destination bus clock signal having a sequence of alternating polarity clock edges, for generating a desired event in response to an originating event which occurs synchronously with said originating bus clock signal, said destination bus clock signal having a lower frequency than said originating bus clock frequency, comprising:

a clock generator which generates a clock output signal synchronously with said originating bus clock signal, said clock output signal being usable or not at the option of the user;

an input for receiving the destination bus clock signal actually used;

first means, operative in a first mode of operation, for generating said desired event synchronously with said originating bus clock signal and stretching a cycle of said clock output signal such that said desired event is further synchronous with said clock output signal; and second means, operative in a second mode of operation, for generating said desired bus event synchronously with said destination bus clock signal received over said input.

38. Apparatus according to claim 37, wherein said second means comprises means for generating said desired bus event in response to the second clock edge of said destination bus clock signal following occurrence of said originating event.

39. Apparatus according to claim 37, wherein said second means comprises means for generating said desired event in response to the second clock edge of said destination bus clock signal which has a predetermined polarity, following occurrence of said originating event.

40. Apparatus according to claim 37, wherein said apparatus operates in said first mode or said second mode selectably at the option of a user.

41. Apparatus according to claim 37, wherein said apparatus operates in said first mode if said destination bus clock signal is generated synchronously with said originating bus clock signal and destination bus clock stretching is enabled, and operates in said second mode if said destination bus clock signal is generated asynchronously with said originating bus clock signal or if destination bus clock stretching is disabled.

42. A method for generating a desired bus event synchronously with a destination bus clock signal no earlier than a predetermined time relative to the occurrence of an originating event occurring asynchronously with said destination bus clock signal, comprising the steps of:

detecting a predictor event occurring before a first destination bus clock edge, said predictor event occurring asynchronously with said destination bus clock signal and being known to occur no more than p destination bus clock edges prior to said originating event, p>0; and generating said desired bus event in response to a destination bus clock edge occurring no earlier than the p'th destination bus clock edge following said first destination bus clock edge.

43. A method according to claim 42, wherein said step of detecting comprises the step of sampling for said predictor event in response to each destination bus clock edge, at least until said predictor event is detected.

44. A method according to claim 42, wherein said step of detecting comprises the step of sampling for said predictor event in response to each destination bus clock edge which has a predetermined polarity, at least until said predictor event is detected.

45. A method according to claim 44, wherein p is an even integer.

46. A method according to claim 42, wherein said step of generating comprises the step of generating said desired bus event in response to said p'th destination bus clock edge following said first destination bus clock edge.

47. A method according to claim 42, wherein said step of detecting comprises the steps of sampling for said predictor event in response to each destination bus clock edge which has a predetermined polarity, at least until said predictor event is detected, wherein said step of generating comprises the step of generating said desired bus event in response to said p'th destination bus clock edge, and wherein p is an even integer.

48. A method according to claim 42, wherein $p \geq 2$.

49. A method according to claim 42, wherein said originating event and said predictor event both occur synchronously with an originating bus clock signal, further comprising the step of generating said originating bus clock signal asynchronously with said destination bus clock signal.

50. A method according to claim 49, wherein said originating bus and destination bus clock signals each have a frequency, where p is such that said frequency of said destination bus clock signal is at least p times said frequency of said originating bus clock signal, and less than p+1 times said frequency of said originating bus clock signal.

51. A method according to claim 42, wherein said originating event and said predictor event both occur synchronously with an originating bus clock signal, further comprising the step of generating said originating bus clock signal, selectably synchronously or asynchronously with said destination bus clock signal.

52. A method according to claim 51, wherein said originating bus and destination bus clock signals each have a frequency, where p is such that said frequency of said destination bus clock signal is p times said frequency of said originating bus clock signal, if said originating bus clock signal is generated synchronously, and at least p and less than p+1 times said frequency of said originating bus clock signal if said originating bus clock signal is generated asynchronously, with said destination bus clock signal.

53. A method according to claim 42, further comprising the step of choosing p from a predetermined set of integers in response to a user setting.

54. A method according to claim 53, wherein said predetermined set of integers are all greater than or equal to 2.

55. A method according to claim 42, further comprising the step of choosing p from a predetermined set of even integers in response to a user setting.

56. A method according to claim 47, further comprising the step of choosing p from a predetermined set of even integers in response to a user setting.

57. A method according to claim 42, said destination bus clock signal having a frequency, said originating event and said predictor event both occurring synchronously with an originating bus clock signal, further comprising the steps of:

specifying said frequency of said destination bus clock signal relative to a frequency of said originating bus clock signal; and choosing p from a predetermined set of integers in response to said step of specifying.

58. A method according to claim 57, further comprising the steps of:

generating a synchronous clock output signal synchronously with said destination bus clock signal, said synchronous clock output signal being usable or not at the option of a user; and receiving the originating bus clock signal actually used.

59. A method according to claim 58, wherein said step of generating a synchronous clock output comprises the step of dividing said destination bus clock signal by a value responsive to said step of specifying to generate said synchronous clock signal.

60. A method according to claim 58, further comprising the step of stretching a cycle of said synchronous clock signal in response to a predetermined system condition.

61. A method according to claim 42, for use with a CPU coupled to a destination bus, said CPU having an input (RDY#) which indicates to said CPU to terminate a destination bus access cycle when said CPU samples said input (RDY#) active in response to an edge of said destination bus clock signal, said desired bus event comprising activation of said CPU input, wherein said originating event comprises withdrawal of a first I/O bus signal (CMD#) which indicates the end of an I/O bus access cycle performed in response to said destination bus access cycle, and wherein said predictor event comprises a second I/O bus signal (EXRDY) sampled active in response to an edge of an I/O bus clock signal, said second I/O bus signal (EXRDY) indicating that said I/O bus access cycle can terminate in response to the immediately following edge of said I/O bus clock signal.

62. A method according to claim 42, for use with a CPU coupled to a destination bus, said CPU having an internal cache memory, a plurality of address leads and a first input (EADS#) which, when sampled active on an edge of said destination bus clock signal, indicates to said CPU to invalidate any entry in said internal cache memory which is then mapped to an address indicated on said CPU address leads, and for use further with an external I/O bus master, wherein said desired bus event comprises activation of said first CPU input (EADS#), wherein said originating event comprises a third edge of an I/O bus clock signal, which third edge occurs while a memory write address from said I/O bus master is valid on said CPU address leads, and wherein said predictor event comprises a first I/O bus signal (CMD#) sampled active in response to a first edge of said I/O bus clock signal preceding said third edge by two edges of said I/O bus clock signal.

63. A method according to claim 42, further comprising the step of blocking said step of generating, in response to the detection of a second required event not occurring within a predetermined time span which is subsequent to said first destination bus clock edge.

64. A method according to claim 63, for use with a CPU coupled to said destination bus, said CPU having an internal cache memory, a plurality of address leads and a first input (EADS#) which, when sampled active on an edge of said destination bus clock signal, indicates to said CPU to invalidate any entry in said internal cache memory which is then mapped to an address indicated on said CPU address leads, and for use further with an external I/O bus master, wherein said desired bus event comprises activation of said first CPU input (EADS#), wherein said originating event comprises a third edge of an I/O bus clock signal, which third edge occurs while a memory write address from said I/O bus master is valid on said CPU address leads, wherein said predictor event comprises a first I/O bus signal (CMD#) sampled active in response to a first edge of said I/O bus clock signal preceding said third edge by two edges of said I/O bus clock signal, and wherein said second required event comprises a second I/O bus signal (MSBURST#) being active while said generating means would otherwise generate said desired bus event.

65. A method for generating a desired bus event synchronously with a destination bus clock signal in response to an originating event, comprising the steps of:

specifying a value indicating a frequency of said destination bus clock signal; and generating said desired bus event in response to the p'th destination bus clock edge occurring after said originating event, p being responsive to said value specified in said step of specifying.

66. A method according to claim 65, wherein said originating bus event is defined as a bus signal being in a predetermined state no later than a first destination bus clock edge.

67. A method according to claim 65, wherein said originating bus event is defined as a bus signal being in a predetermined state no later than a first destination bus clock edge which has a predetermined polarity.

68. A method according to claim 67, wherein said predetermined polarity is responsive to said value specified in said step of specifying.

69. A method according to claim 67, further comprising the step of choosing p from a predetermined set of even integers in response to said value specified in said step of specifying.

70. A method according to claim 66, further comprising the step of choosing p from a predetermined set of integers greater than or equal to two in response to said value specified in said step of specifying.

71. A method according to claim 65, wherein said originating event occurs asynchronously with said destination bus clock signal.

72. A method according to claim 66, wherein said originating event occurs synchronously with an originating bus clock signal, further comprising the step of generating said originating bus clock signal asynchronously with said destination bus clock signal.

73. A method according to claim 66, wherein said originating event occurs synchronously with an originating bus clock signal, further comprising the step of generating said originating bus clock signal synchronously with said destination bus clock signal.

74. A method according to claim 66, wherein said originating event occurs synchronously with an originating bus clock signal, further comprising the step of generating said originating bus clock signal selectably synchronously or asynchronously with said destination bus clock signal.

75. A method according to claim 65, further comprising the steps of:

generating a synchronous clock output signal synchronously with said destination bus clock signal, said synchronous clock output signal being usable or not at the option of a user to form an originating bus clock signal; and receiving the originating bus clock signal actually used.

76. A method according to claim 75, wherein said step of generating a synchronous clock output signal comprises the step of dividing said destination bus clock signal by a value responsive to said value specified in said step of specifying.

77. A method according to claim 65, further for generating said desired bus event no earlier than a predetermined time relative to the occurrence of an additional event occurring asynchronously with said destination bus clock signal, said additional event being known to occur no more than p of said destination bus clock edges after said originating event, said originating event being a predictor for said additional event.

78. A method for generating a desired event in response to an originating event which occurs synchronously with an originating bus clock signal, said originating bus clock signal having a frequency lower than the frequency of a destination bus clock signal, comprising the steps of:

generating a clock output signal synchronously with said originating bus clock signal, said clock output signal being usable or not at the option of the user;

receiving the destination bus clock signal actually used;

if a first mode of operation is selected, generating said desired event synchronously with said originating bus clock signal and stretching a cycle of said clock output signal such that said desired event is further synchronous with said clock output signal; and if a second mode of operation is selected, generating said desired bus event synchronously with said destination bus clock signal received in said step of receiving.

79. A method according to claim 78, wherein said step of generating said desired bus event in said second mode comprises the step of generating said desired bus event in response to the second clock edge of said destination bus clock signal following occurrence of said originating event.

80. A method according to claim 78, wherein said step of generating said desired bus event in said second mode comprises the step of generating said desired event in response to the second clock edge of said destination bus clock signal which has a predetermined polarity, following occurrence of said originating event.

81. A method according to claim 78, further comprising the step of selecting said first mode or said second mode.

82. A method according to claim 78, further comprising the step of selecting said first mode if said destination bus clock signal is generated synchronously with said originating bus clock signal and destination bus clock stretching is enabled, and the step of selecting said second mode if said destination bus clock signal is generated asynchronously with said originating bus clock signal or if destination bus clock stretching is disabled.

* * * * *